United States Patent
Yu et al.

(10) Patent No.: US 8,595,662 B1
(45) Date of Patent: Nov. 26, 2013

(54) METHODS, SYSTEMS, AND ARTICLES OF MANUFACTURE FOR IMPLEMENTING A PHYSICAL DESIGN OF AN ELECTRONIC CIRCUIT WITH AUTOMATIC SNAPPING

(75) Inventors: Henry Yu, Palo Alto, CA (US); Joshua Baudhuin, Portland, OR (US); Timothy Rosek, Gibsonia, PA (US); Hui Xu, Wexford, PA (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 13/445,832

(22) Filed: Apr. 12, 2012

Related U.S. Application Data

(60) Provisional application No. 61/582,211, filed on Dec. 30, 2011.

(51) Int. Cl.
*G06F 17/50* (2006.01)

(52) U.S. Cl.
USPC .......................................... 716/110

(58) Field of Classification Search
USPC ................................ 716/100, 110
See application file for complete search history.

(56) References Cited

U.S. PATENT DOCUMENTS

| | | |
|---|---|---|
| 8,028,259 B2 | 9/2011 | Vogel |
| 8,176,445 B1 | 5/2012 | Qian |
| 8,381,153 B2 | 2/2013 | Chiang et al. |
| 8,397,194 B2 | 3/2013 | Uppaluri et al. |
| 8,516,404 B1 | 8/2013 | Cao et al. |
| 2003/0229860 A1 | 12/2003 | Li |
| 2004/0068708 A1 | 4/2004 | Sivaraman et al. |
| 2005/0221201 A1 | 10/2005 | Ellis |
| 2005/0268258 A1 | 12/2005 | Decker |
| 2006/0200789 A1 | 9/2006 | Rittman |
| 2006/0259882 A1 | 11/2006 | Lin et al. |
| 2007/0148794 A1 | 6/2007 | Cha et al. |
| 2008/0005713 A1 | 1/2008 | Singh et al. |
| 2008/0178140 A1 | 7/2008 | Lin et al. |
| 2008/0184183 A1 | 7/2008 | Kobayashi |
| 2008/0250361 A1 | 10/2008 | Bae et al. |
| 2009/0037852 A1 | 2/2009 | Kobayashi et al. |
| 2009/0083689 A1 | 3/2009 | Ringe et al. |
| 2009/0150850 A1 | 6/2009 | Sinha et al. |
| 2009/0254814 A1 * | 10/2009 | Lai et al. ...................... 715/244 |
| 2009/0276735 A1 | 11/2009 | Kramer et al. |

(Continued)

OTHER PUBLICATIONS

Non-Final Office Action dated Apr. 5, 2013 for U.S. Appl. No. 13/445,847.
Non-Final Office Action dated Jan. 16, 2013 for U.S. Appl. No. 13/445,860.
Non-Final Office Action dated Jan. 16, 2013 for U.S. Appl. No. 13/445,874.

(Continued)

*Primary Examiner* — Suchin Parihar
(74) *Attorney, Agent, or Firm* — Vista IP Law Group, LLP

(57) ABSTRACT

Disclosed are methods and systems for providing a constraint-driven environment for implementing a physical design of an electronic circuit with automatic snapping. In some embodiments, the method identifies or creates an incomplete layout. The method identifies an object and constraints for the object. The method then identifies an approximate position for the object in the layout and automatically snaps the object to a drop location based on the approximate position while complying with relevant constraint(s). The method may further align an object with another object with some spacing in between in some embodiments. The method may also perform automatic layer-to-layer snapping between two sets of objects such as cell instances, each having at least one object on multiple layers.

35 Claims, 35 Drawing Sheets

(56) References Cited

U.S. PATENT DOCUMENTS

| | | |
|---|---|---|
| 2009/0313596 A1 | 12/2009 | Lippmann et al. |
| 2010/0162151 A1* | 6/2010 | Class et al. .................... 715/765 |
| 2010/0229140 A1* | 9/2010 | Strolenberg et al. .............. 716/9 |
| 2010/0257498 A1* | 10/2010 | Alpert et al. ....................... 716/6 |
| 2011/0219341 A1 | 9/2011 | Cao et al. |
| 2012/0023468 A1 | 1/2012 | Fischer et al. |
| 2012/0023470 A1 | 1/2012 | Nakagawa |
| 2012/0023471 A1 | 1/2012 | Fischer et al. |
| 2012/0185811 A1 | 7/2012 | Ramachandran et al. |
| 2012/0254818 A1 | 10/2012 | Liu et al. |
| 2013/0031521 A1 | 1/2013 | Teoh |
| 2013/0086542 A1 | 4/2013 | Teoh et al. |

OTHER PUBLICATIONS

Amendment After Non-Final Rejection dated Jul. 5, 2013, for U.S. Appl. No. 13/445,847.
Final Office Action dated Jun. 14, 2013, for U.S. Appl. No. 13/445,860.
Amendment After Non-Final Rejection dated Apr. 16, 2013, for U.S. Appl. No. 13/445,860.
Non-Final Office Action dated Jun. 5, 2013, for U.S. Appl. No. 13/445,874.
Amendment After Non-Final Rejection dated Apr. 16, 2013, for U.S. Appl. No. 13/445,874.
Notice of Allowance dated Sep. 19, 2013 for U.S. Appl. No. 13/445,874.

* cited by examiner

METHODS, SYSTEMS, AND ARTICLES OF MANUFACTURE FOR IMPLEMENTING A PHYSICAL DESIGN OF AN ELECTRONIC CIRCUIT WITH AUTOMATIC SNAPPING

CROSS-REFERENCE TO RELATED APPLICATION(S)

This application claims the benefit of U.S. Provisional Patent App. Ser. No. 61/582,211, filed on Dec. 30, 2011 and entitled "METHODS, SYSTEMS, AND ARTICLES OF MANUFACTURE FOR IMPLEMENTING A PHYSICAL DESIGN OF AN ELECTRONIC CIRCUIT WITH AUTOMATIC SNAPPING". The content of the U.S. Provisional Patent Application is hereby expressly incorporated by reference in its entirety for all purposes. This application is cross-related to U.S. patent application Ser. No. 13/445,847, filed concurrently with the title "METHODS, SYSTEMS, AND ARTICLES OF MANUFACTURE FOR IMPLEMENTING INTERACTIVE COLORING OF PHYSICAL DESIGN COMPONENTS IN A PHYSICAL ELECTRONIC DESIGN WITH MULTIPLE-PATTERNING TECHNIQUES AWARENESS", and U.S. patent application Ser. No. 13/445,860, filed concurrently with the title "METHODS, SYSTEMS, AND ARTICLES OF MANUFACTURE FOR IMPLEMENTING INTERACTIVE, REAL-TIME CHECKING OR VERIFICATION OF COMPLEX CONSTRAINTS", and U.S. patent application Ser. No. 13/445,874, filed concurrently with the title "METHODS, SYSTEMS, AND ARTICLES OF MANUFACTURE FOR IMPLEMENTING ELECTRONIC DESIGNS WITH CONNECTIVITY AND CONSTRAINT AWARENESS". The content of these applications is hereby expressly incorporated by reference in its entirety.

BACKGROUND

Conventional electronic design process proceeds sequentially through a schematic design stage to determine the schematic design of an electronic design, a physical design stage to construct the layout of the electronic design, and a verification stage at which various verification processes, such as design rule checking and physical verification, are performed to determine whether the electronic design complies with certain set of constraints, design rules, requirements, or goals (collectively constraints.) Nonetheless, any violations identified during the verification stage may require a costly and often time-consuming process to resolve such violations. For example, a layout designer may have to return to the physical design to move certain objects or to reroute certain interconnects in order to satisfy a spacing constraint and re-submit the revised electronic design to the verification modules or design rule check engines to determine whether the revised electronic design satisfies the prescribed constraints or constraints. As a result, the electronic design process may involve an iterative process where designers loop among various stages of the process, hoping that the electronic design may be finally signed off for tapeout. In addition, a layout designer often does not know whether any portion of the layout violates certain constraints until the layout is complete and ready for verification. The advent of more complex constraints simply exacerbates the problems.

The recent advances in very deep sub-micron (VDSM) integrated circuits (ICs) have exacerbated the issues in the physical design methodology process of electronic circuits. For example, most conventional electronic circuit design tools focus on post-layout verification of the power grid or interconnects when the entire chip design is complete and detailed information about the parasitics of the physical designs and the currents drawn by the transistors are known. In these conventional approaches, the conventional circuit synthesis step is followed by layout synthesis and each step is carried out independent of the other. This is again followed by a physical or formal verification step upon the completion of the entire physical layout to check whether the desired performance goals have been achieved after layout generation and extraction. These steps are carried out iteratively in the conventional approaches till the desired performance goals are met.

Nonetheless, such an iterative approach wastes significant amount of resources because various physical design tools, such as the placement tool, the router, etc., and various schematic design tools, such as the schematic editor, the schematic level simulator(s), etc., are unaware of the electrical parasitics associated with the physical data of the design and the electrical characteristics associated with the electrical parasitics. In addition, a designer may wish to edit or create some objects in a layout. For example, the designer may add one or more objects to a layout or may modify the placement of some objects in the layout. Nonetheless, the designer usually does not know whether such creation or placement of objects gives rise to any constraint violations until the performance of some physical verification or design rule checking after the layout is complete.

Thus, there exists a need for providing a method, a system, and an article of manufacture for implementing a physical design of an electronic design with automatic snapping.

SUMMARY

What is disclosed encompasses a computer-implemented method and a system for implementing physical design with multi-patterning lithography techniques. In some embodiments, the method first identifies or creates a physical design of an electronic circuit. It shall be noted that the method needs only a partial, incomplete layout which includes only one net, a part of a single net, or even two geometric objects to perform its intended functions. The method may then identify a first object for a modification process. In some embodiments, the term "modifying" broadly encompasses creating the first object at an intended location, placing, translating, rotating, or mirroring the first object, changing the location of the first object in the layout, or changing the size or object of the first object in the layout. The method may then identify a set of constraints for the first object.

In some embodiments, the set of constraints may involve complex constraints. For example, the method may identify a set of spacing constraints such as spacing rules coupled with parallel run-lengths in certain directions or corner-to-corner spacing requirements. A constraint may include, for example, a constraint involving multiple objects and multiple geometric characteristics of each of these multiple objects (e.g., corner-to-corner constraints), and a constraint involving multiple nets (e.g., a net-to-net constraint), a net-based constraint (e.g., a spacing constraint between two or more nets), a constraint based on voltages, or a constraint defined by a list of permissible values, rather than a single value (e.g., a spacing rule defined by a table of values based on, for example, parallel run-lengths). The method may then identify one or more approximate locations for placing the first object in the physical design. For example, the method may capture the current location of the first object at any given instant in the layout and use this current location as an approximate location for the first object while the first object is being moved around in the layout. The method may then automatically snap the first object to a drop location based on the one or more approximate locations.

For example, a user may intend to place an object in a layout by moving the object around in the physical design with a pointing device. The method identifies the relevant constraints for the object and examines the relative position of the first object in relation to one or more existing objects in the physical design. As the user is moving the object around, the method may in nearly real-time determine one or more drop locations for the first object based at least in part upon the relevant constraints and automatically snaps the object to a drop location. In some cases where there exist multiple possible drop locations for the object, the method may also provide the options, hints, or recommendations to the user to facilitate the determination of a drop location from the multiple possible drop locations. In some embodiments, the method not only snaps the object to a drop location but also determines the color of the object automatically based on the drop location and the relevant constraint(s) for the object.

In some embodiments, the method may identify one or more target objects for the first object and perform a single-scenario or a multi-scenario what-if analysis before any violations of constraints actually occur. In these embodiments, the method or the system may use one or more textual indicators, one or more graphical indicators, or a combination thereof around the identified one or more target objects to provide indications of the requirements of the constraints. In some of these embodiments, the method may establish a scenario between the first object and each of the one or more target objects to perform a what-if analysis to determine how the electronic design is going to behave in some situations. Embodiments with multiple scenarios include a layout with, for example, multiple sources (dynamic objects), multiple targets, or a combination thereof. In these embodiments, a scenario may be established between a source (a dynamic object) and a target. In some of these embodiments where there exist multiple sources that are subject to a modification process and where a primary object has been designated, a scenario may also be established between the primary object and a target. An example of a what if analysis comprises the situation where the method or system may determines the outcome of associating or re-associating a source or a primary object with a first mask identification and a target object with the first or a second mask identification in view of some relevant constraint(s). This example constitutes a single what-if analysis. In some embodiments, the method or the system may perform the same analysis for scenarios between each of one or more sources or one or more primary objects and each of one or more target objects.

In some embodiments under certain circumstances, the method or the system may also use one or more textual indicators, one or more graphical indicators, or a combination thereof around the dynamic object to provide indications of the requirements of the constraints. In some embodiments where there exist multiple hierarchical levels in the electronic design, the method or the system may identify a geometric object at any hierarchical level in the design as the target object. In some embodiments where the design may include multiple instances of the same master cell or block, the method or the system may identify any single instance or one or more sub-components thereof as the target objects and perform the intended functions. In some embodiments where multiple target objects have been identified, the method or the system may further identify a primary geometric object and perform the multi-scenario what-if analyses according to the identified primary geometric object.

In some embodiments where there exist multiple sets of constraints for a dynamic object undergoing the modification process, the method or the system may identify one set from the multiple sets of constraints and enforces the one set of constraints for at least a portion of the electronic design. In various embodiments, a dynamic object comprises a preexisting object that is currently being edited or modified or a new object that is being created. In some embodiments, a "dynamic object" may also be called a "source", and these two terms are thus used interchangeably in these embodiments. For example, the method or the system may identify and enforce a set of constraints that require all the objects be placed on the same mask. In some embodiments, the method or the system may merge multiple geometric objects in the physical design and provide one or more unified textual indications, one or more unified graphical indications, or a combination thereof for the merged geometric object relative to a dynamic object that undergoes the modification process. In some embodiments, the method or the system may also identify a first edge from a first geometric object and a second edge from a second geometric object and aligns the first object to the second object or vice versa. In some embodiments, the method or the system also applies to geometric objects that comprise one or more interconnects.

In some embodiments, the method may comprise a process of identifying a first object in a layout for a modification process that is to modify the first object in the layout and the process of identifying a first set of one or more constraints for the first object. The method may further comprise the process of identifying a first approximate position of the first object in the layout and the process of determining a drop position for the first object in the layout based at least in part upon the first approximate position and the first set of one or more constraints. In some embodiments, the method may further comprise the process of identifying the layout, in which the layout comprises at least a partial, incomplete physical design of the electronic circuit and the process of performing the modification process on the first object. A modification process may, in some embodiments, comprise at least one of translating the first object to a different location in the layout, rotating the first object to a different orientation, mirroring the first object in the layout, resizing the first object, altering a shape of the first object, and altering a configuration of the first object.

In some embodiments, the method may optionally comprise the process of identifying a first part of the first object, the process of identifying a second part of a second object in the layout, and the process of aligning the first part of the first object with the second part of the second object with a spacing between the first part and the second part. In some embodiments, the method may optionally comprise the process of identifying one or more target objects in the layout, the process of determining whether a result of the modification process satisfies a constraint, wherein the constraint comprises at least one of the first set of one or more constraints or at least one of one or more other constraints by using at least the one or more target objects, and the process of displaying a result of the action of determining whether the result of the modification process satisfies the constraint before a performance of the modification process on the object.

In some of these embodiments, the method may further comprise the process of identifying a primary object from the one or more target objects or from one or more other objects in the layout, in which the action of determining whether the result of the modification process satisfies the constraint is performed by further using the primary object. In some embodiments where a plurality of sources are involved, a primary object may comprise one of the sources to represent the plurality of sources. In these embodiments, the method or system need not process each source. The action of determining whether the result of the modification process satisfies the constraint is performed before the performance of the modification process in some embodiments. In some embodiments, the method may further optionally comprise the process of determining a mask identification for the first object, in which at least a part of the layout is subject to a multiple-patterning lithography process that is to be used to manufacture the electronic circuit. In some embodiments, the method may further optionally include the process of determining whether the relevant constraint is satisfied during performance of the modification and before the modification process is complete and the process of displaying the result of the act of determining whether the relevant constraint is satisfied during the performance of the modification process and before the modification process is complete.

Some embodiments are directed to a method for layer-to-layer snapping or alignment. In some embodiments, the method comprises the process of identifying a first plurality of objects including a first object on a first layer and a second object on a second layer in a layout, the process of identifying a second plurality of objects including a third object on the first layer and a fourth object on the second layer, the process of identifying a first approximate position for the first plurality of objects arising from a modification process performed on the first plurality of objects, and the process of determining a drop location for the first plurality of objects based at least in part upon the first approximate position by referencing at least one of the first layer or the second layer. In some embodiments, the method may further optionally comprise the process of performing the modification process on the first plurality of objects based at least in part upon the drop position, in which the modification process operates on the first plurality of objects as a whole without operating on the first object or the second object individually.

In some embodiments, the method may also comprise the process of determining a first relative position between the first object and the third object on the first layer, the process of determining a second relative position between the second object and the fourth object on the second layer, the process of associating a first priority level with the first relative position and a second priority level with the second relative position, and the process of determining whether the first priority level or the second priority level is to be used for the action of determining the drop location. In some of these embodiments, the action of determining the first relative position may comprise the process of identifying a first position or a first reference point of the first object and a third position or a third reference point of the third object in the layout, wherein the first reference point is used to determine the first position of the first object in the layout, and the third reference point is used to determine the third position of the third object in the layout. In addition, the method may further comprise the process of determining the first relative position between the first object and the third object based at least in part upon the first position and the third position.

In some embodiments, the action of determining the second relative position may comprise the process of identifying a second position or a second reference point of the second object and a fourth position or a fourth reference point of the fourth object in the layout, wherein the second reference point is used to determine the second position of the second object in the layout, and the fourth reference point is used to determine the fourth position of the fourth object in the layout. In these embodiments, the method may further comprise the process of determining the second relative position between the second object and the fourth object based at least in part upon the second position and the fourth position. In some embodiments, the action of identifying the first approximate position may comprise the process of identifying a data capturing process, the process of identifying a data capturing criterion, the process of identifying a characteristic of the modification process, and the process of identifying a position of the first plurality of objects in the layout as the first approximate position based at least in part upon the data capturing criterion and the characteristic of the modification process.

In some embodiments, the action of determining whether the first priority level or the second priority level is to be used may comprise the process of identifying or determining a first metric comprising at least one of a first cost, a first objective function, and a first impact of the first priority level, the process of identifying or determining a second metric comprising at least one of a second cost, a second objective function, or a second impact of the second priority level, the process of analyzing the first metric and the second metric to improve one or more aspects of the layout, and the process of determining whether the first priority level or the second priority level is to be used in determining the drop location based at least in part on a result of the act of analyzing the first metric and the second metric.

In some embodiments, the action of performing the modification process may comprise the process of applying one or more operations from the modification process to the first plurality of objects, the process of identifying one or more triggers from a call-back mechanism, the process of associating the one or more triggers with one or more priority levels, the process of invoking at least some of the one or more triggers during a performance of the modification process based at least in part upon the one or more priority levels, and the process of storing a result of the modification process in a scratch pad.

In some embodiments, the method may also optionally comprise the process of determining whether a constraint is satisfied before completion of a performance of the modification process, and the process of presenting a result of the act of determining whether the constraint is satisfied before the completion of the performance of the modification process.

Some embodiments are directed at a hardware system that may be invoked to perform any of the methods, processes, or sub-processes disclosed herein. The hardware system may include at least one processor or at least one processor core, which executes one or more threads of execution to perform any of the methods, processes, or sub-processes disclosed herein in some embodiments. The hardware system may further include one or more forms of non-transitory machine-readable storage media or devices to temporarily or persistently store various types of data or information. Some exemplary modules or components of the hardware system may be found in the System Architecture Overview section below.

Some embodiments are directed at an article of manufacture that includes a non-transitory machine-accessible storage medium having stored thereupon a sequence of instructions which, when executed by at least one processor or at least one processor core, causes the at least one processor or the at least one processor core to perform any of the methods, processes, or sub-processes disclosed herein. Some exemplary forms of the non-transitory machine-readable storage media may also be found in the System Architecture Overview section below.

BRIEF DESCRIPTION OF THE DRAWINGS

The drawings illustrate the design and utility of various embodiments of the present invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are directed to a methods, systems, and articles of manufacture for implementing electronic circuit designs with electro-migration awareness in a single embodiment or in some embodiments. Other objects, features, and advantages of the invention are described in the detailed description, figures, and claims.

Various embodiments will now be described in detail with reference to the drawings, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

Disclosed are a computer-implemented method and a system for implementing physical design with multi-patterning lithography techniques. In some embodiments, the method first identifies or creates a physical design of an electronic circuit. It shall be noted that the method needs only a partial, incomplete layout which includes only one net, a part of a single net, or even two geometric objects to perform its intended functions. The method may then identify a first object for a modification process. In some embodiments, the term "modifying" broadly encompasses creating the first object at an intended location, placing, translating, rotating, or mirroring the first object, changing the location of the first object in the layout, or changing the size or object of the first object in the layout.

The method may then identify a set of constraints for the first object. In some embodiments, the set of constraints may involve complex constraints. For example, the method may identify a set of spacing constraints or constraints such as spacing rules coupled with parallel run-lengths in certain directions or corner-to-corner spacing requirements. The method may then identify one or more approximate locations for placing the first object in the physical design. For example, the method may capture the current location of the first object at any given instant in the layout and use this current location as an approximate location for the first object while the first object is being moved around in the layout. The method may then automatically snap the first object to a drop location based on the one or more approximate locations.

Figure 1:
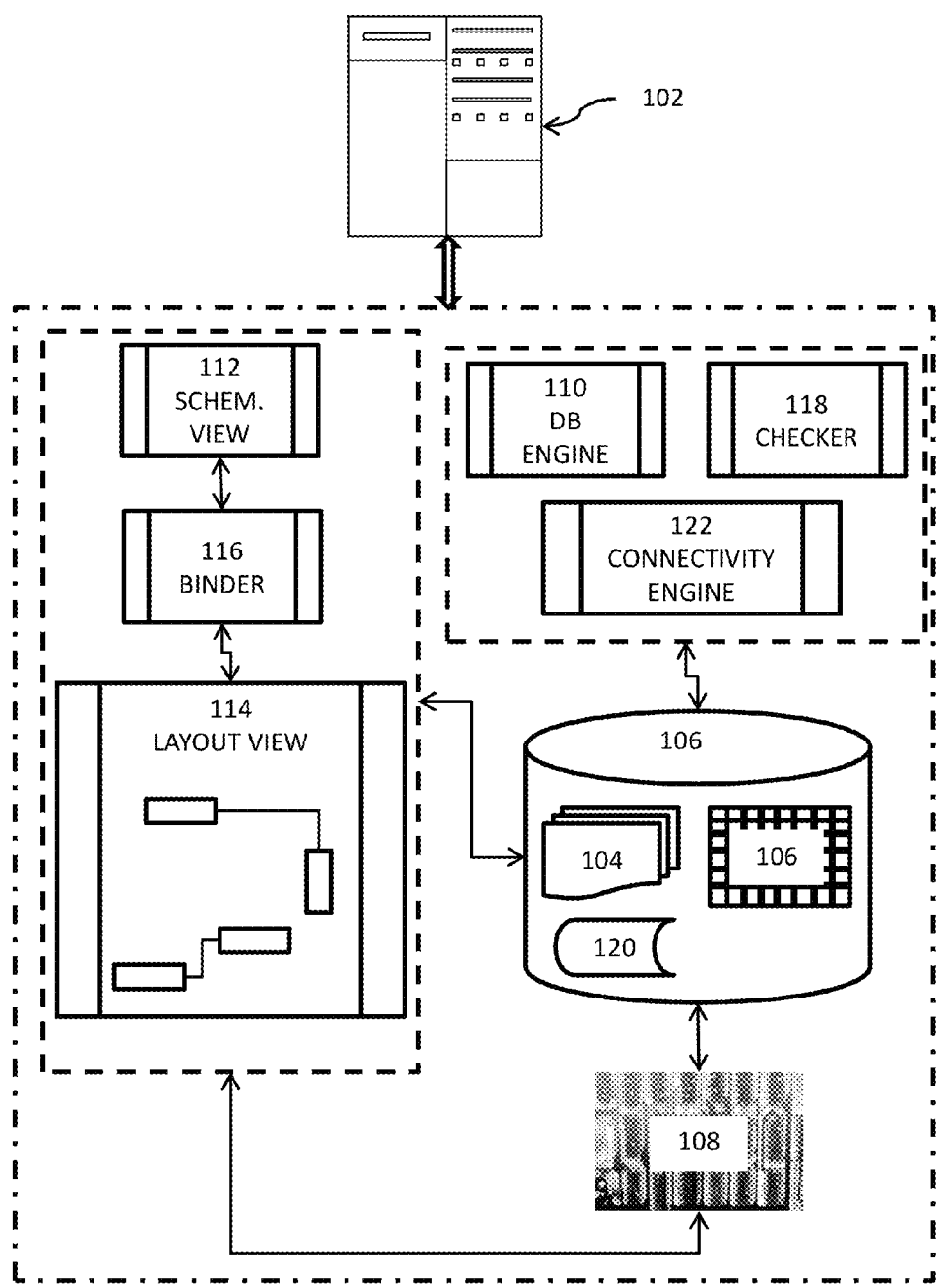
FIG. 1 illustrates a high level block diagram for implementing a physical design of an electronic circuit with automatic snapping in some embodiments.

FIG. 1 illustrates a high level block diagram for implementing interactive, real-time checking or verification of constraints in some embodiments. In one or more embodiments, a designer may use one or more computing systems 102 to perform various processes or to invoke various hardware modules to create or manipulate an electronic design. The one or more computing systems 102 may comprise various electronic design tools such as, but not limited to, a schematic editor, a schematic simulator, a physical design tool, a physical design analysis engine, etc. The one or more computing system 102 may further initiate or interact with a schematic view 112 and a layout view 114 of an electronic design in some embodiments. In some embodiments, the layout view of an electronic design includes a partial, incomplete physical design that contains only a smaller portion of the physical design.

For example, the partial, incomplete physical design may contain only a single object that represent a single electronic design component, a net, or a portion thereof. The layout view 114 and the schematic view 112 may be bound together to allow communication of data or information between the two views of the electronic design with a binder mapping process or module 116. The one or more computing system 102 may also initiate or interact with a database engine 110 to, for example, perform or undo one or more transaction or maintaining one or more log records (e.g., undo logs, redo logs, state logs, etc.) in some embodiments. The one or more computing system 102 may also initiate or interact with a checker 118, such as a physical verification process or module or a design rule checking process or module in some embodiments.

The one or more computing system 102 may also initiate or interact with a connectivity engine 122 which performs the functions of, for example, receiving, updating, removing, or adding connectivity information, or maintaining other data or information about the connectivity information. Various embodiments use the connectivity information to keep track of which net a design component belongs to in an electronic circuit design. More details about the connectivity information and the connectivity engine is described in U.S. patent application Ser. No. 13/445,874, filed concurrently with the title "METHODS, SYSTEMS, AND ARTICLES OF MANUFACTURE FOR IMPLEMENTING ELECTRONIC DESIGNS WITH CONNECTIVITY AND CONSTRAINT AWARENESS". The content of this application is hereby expressly incorporated by reference in its entirety. The one or more computing system 102, the processes or modules 110, 118, and 122, and the session for the schematic view design 112, the session for the layout view design 114, or the binder mapping process or module 116 may also initiate or interact with a non-volatile, non-transitory computer accessible medium 106 and a volatile, non-transitory computer accessible medium 108 to read data or information from or write data or information to these non-transitory computer accessible media.

In some embodiments, the non-volatile, non-transitory computer accessible medium 106 may store thereupon data or information that comprises, for example but not limited to, one or more rule decks 104 for various design rules, constraints, requirements, or goals (collectively constraint or constraints), one or more data structures 106 (e.g., database tables, lists, tables, trees, graphs, etc.), connectivity information, standard or custom libraries, or any other data 120 that are needed or desired for the performance of various processes disclosed herein. In some embodiments, the non-transitory volatile computer accessible medium 108 may store thereupon data or information that comprises, for example but not limited to, temporary data, uncommitted transaction data, temporary values of one or more variables or states of various processes or modules, etc. The one or more computing system 102 may also invoke a user interface to interact with a display apparatus (not shown) to provide interactive or nearly real-time feedback to a user.

Figure 2:
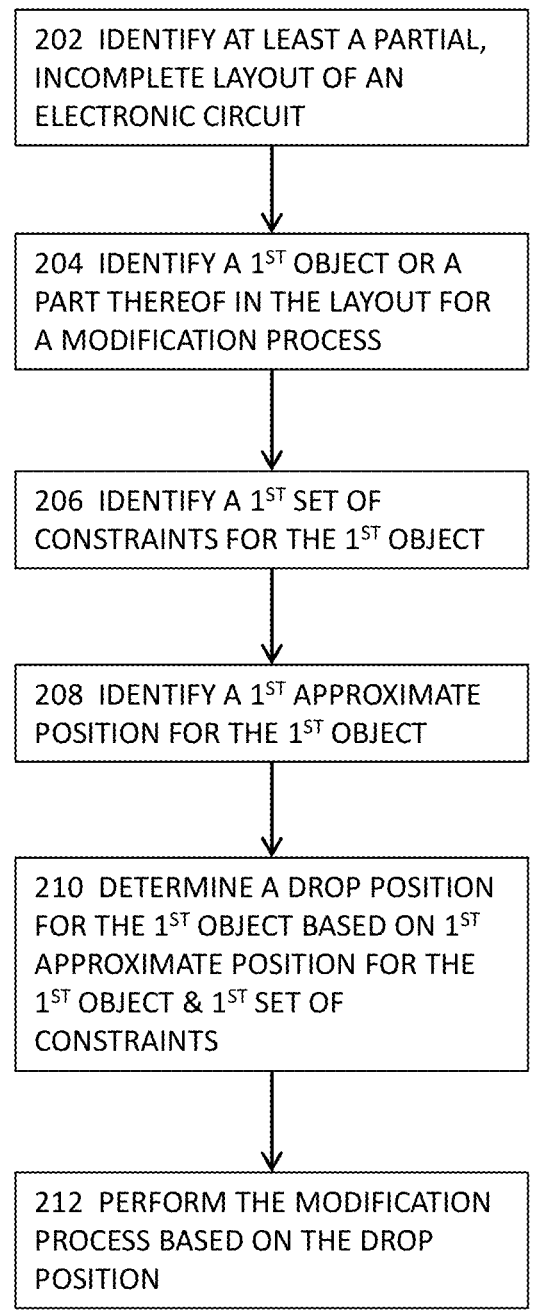
FIG. 2 illustrates a high level flow diagram for a method or a system for implementing a physical design of an electronic circuit with automatic snapping in some embodiments.

FIG. 2 illustrates a high level flow diagram for a method or a system for implementing a physical design of an electronic circuit with automatic snapping in some embodiments. In one or more embodiments, the method or system for implementing a physical design of an electronic circuit with automatic snapping may comprise the respective process or module 202 of identifying a layout of an electronic design. In some embodiments, the layout may include only a partial, incomplete physical design of the electronic design with, for example, a plurality of objects or a single net or a part of a single net. In some embodiments, the method or system for implementing a physical design of an electronic circuit with automatic snapping may comprise the respective process or module 204 of identifying a first object or a part thereof in the layout for a modification process.

An object in the layout may comprise, for example but not limited to, a geometric object, an interconnect, a net, etc. A part of an object may include, for example, an edge or side of at least a portion of an object. In some embodiments, the method or system uses a part of an object to align the object to another object in the layout. In some embodiments, a modification process comprises translating, rotating, mirroring, resizing, or deforming an object design in the layout. In some embodiments, the method or system for implementing a physical design of an electronic circuit with automatic snapping may comprise the respective process or module 206 of identifying a first set of one or more constraints that are related to or may be applied to the first object. In some embodiments where the method or system requires or desires the knowledge of one or more other objects other than the first object, the method or the system may further identifying the one or more other constraints that are related to or applied to these one or more other objects, and use a combination of the one or more constraints for the first object and the one or more other constraints for these one or more other objects.

In some embodiments, the set of one or more constraints comprises, for example but not limited to, a complex constraint involving multiple objects (e.g., geometric objects, interconnects, nets, etc.), a net-based constraint (e.g., a net-to-net spacing constraint), a multi-valued constraint (e.g., a voltage-based constraint that imposes different, for instance, different spacing values for different operating voltages or a spacing constraint depending upon parallel run-lengths between two adjacent objects) whose values are defined by a data structure (e.g., a table) instead of a single value, or a corner-to-corner constraint between two adjacent objects in addition to the spacing constraint between these two object, etc. An example of a net-based constraint may comprise, for example, the permissible spacing between a clock net and a power net. In some embodiments where a net-based spacing constraint is involved, the method or system examines the minimum spacing between a first net and a second net and determines whether the first net and the second net satisfy the net-based spacing constraint. In some embodiments, a voltage-based constraint, which imposes, for example, different spacing values based on different operating voltages may be considered a part of a sub-set of net-based constraints because the operating voltages may depend upon the knowledge of the relevant net or connectivity information.

In some embodiments, the method or system for implementing a physical design of an electronic circuit with automatic snapping may comprise the respective process or module 208 of identifying a first approximate position for the first object. For example, the first approximate position may comprise the location or orientation in which the method or system attempts to place an object in the layout. In some embodiments, the first approximate position comprises one or more intermediate positions of the first object in the layout during the performance of the modification process. In some embodiments, the method or system for implementing a physical design of an electronic circuit with automatic snapping may comprise the respective process or module 210 of determining a drop position for the first object based on the first approximate position.

In some embodiments, the drop position comprises the location or orientation in which the method or system actually places an object in the layout. In some embodiments, the drop position is within certain proximity of the approximate position and comprises a node that has been analyzed to result in a clean electronic design with an identical or substantially similar object at its location with an orientation. In these embodiments, the method or system may automatically snap the object to the drop position when a modification process on the object attempts to place the object in the approximate position. In some embodiments, the method or system may present a plurality of options for snapping to a designer and allow the designer to select from the plurality of options to snap a first object to a second object. The method or system may then snap the first object to the second object according to the designer's selection in these embodiments. In some of these embodiments, the method or system may also snap the first object to the second object according to the designer's selection even with the possibility that such snapping may result in a constraint violation.

In some embodiments, the method or system for implementing a physical design of an electronic circuit with automatic snapping may comprise the respective process or module 212 of performing the modification process on the object based at least in part upon the drop position.

In some embodiments, the method or system may determine multiple drop positions for the first object and may further offer a list of these multiple positions to, for example, designer to choose the final drop position. In some of these embodiments, the method or system may also provide some feedback interactively or in nearly real-time for some estimated consequences (e.g., compliance or violation of some constraint(s), or impacts on electrical data, parasitic effects, yield, or performance, etc.) for at least some of these multiple drop locations by invoking various other tools such as the extraction tools, constraint checking or verification tools, timing engines, design for manufacturing tools, or some physical or schematic simulation tools, etc. More details about the process or module 218A will be provided in the description of FIG. 8 below.

Figure 2A:
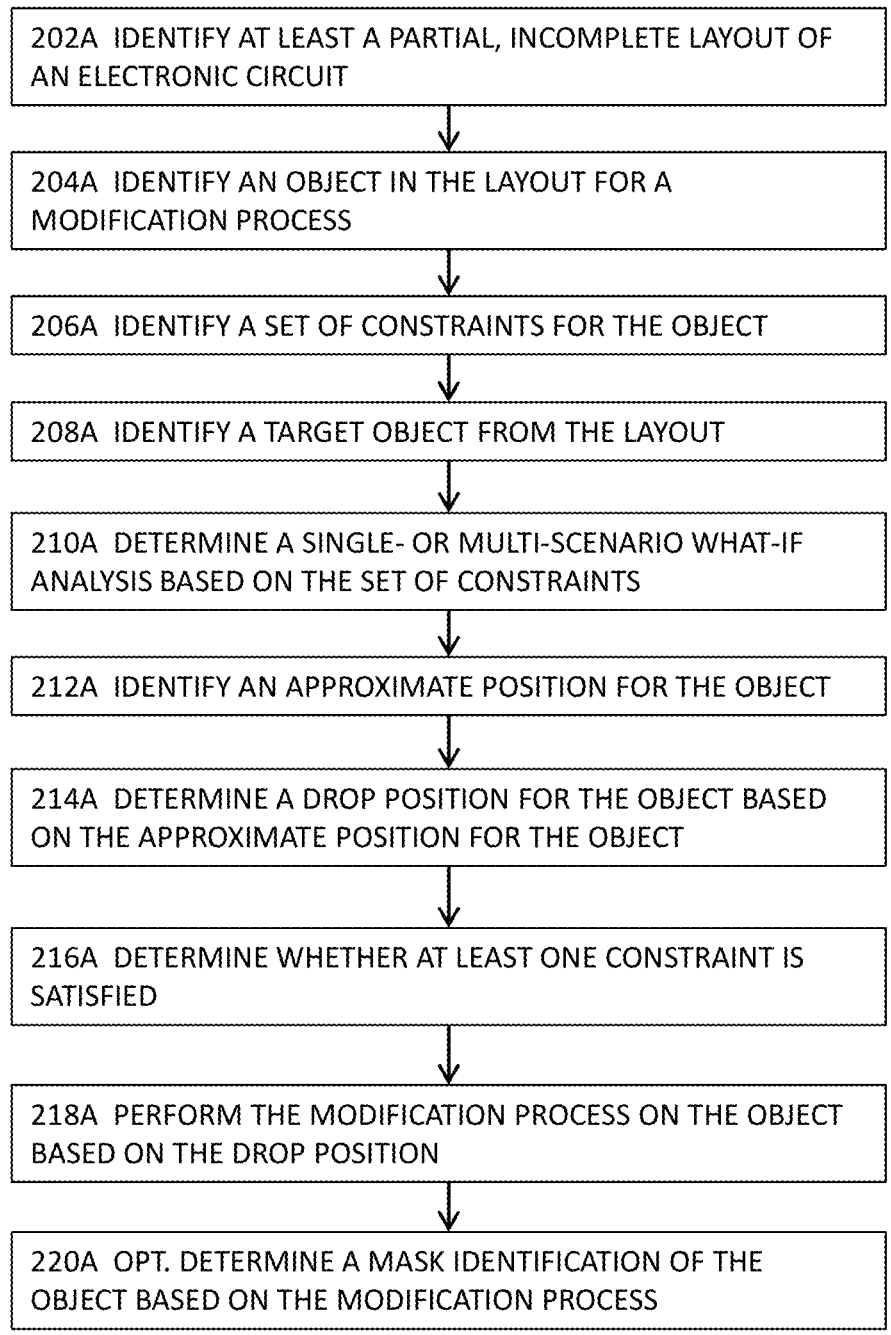
FIG. 2A illustrates a more detailed flow diagram for a method or a system for implementing a physical design of an electronic circuit with automatic snapping in some embodiments.

FIG. 2A illustrates a more detailed flow diagram for a method or a system for implementing a physical design of an electronic circuit with automatic snapping in some embodiments. In some embodiments, the method or system for implementing a physical design of an electronic circuit with automatic snapping may comprise the respective process or module 202A of identifying a layout of an electronic circuit. In some embodiments, the layout comprises a partial, incomplete physical design of the electronic circuit. In some embodiments, the method or system for implementing a physical design of an electronic circuit with automatic snapping may comprise the respective process or module 204A of identifying an object in the layout for a modification process. In these embodiments, the object is subject to the modification process.

In some embodiments, the method or system for implementing a physical design of an electronic circuit with automatic snapping may comprise the respective process or module 206A of identifying a set of one or more constraints in the layout that may apply to or may be associated with the object. In some embodiments, the method or system for implementing a physical design of an electronic circuit with automatic snapping may comprise the respective process or module 208A of identifying one or more target objects, primary objects, or a combination thereof from the remaining one or more objects other than the object in the layout. In these embodiments, the method or the system may identify or may receive the identification of the one or more target objects, the one or more primary objects, or a combination thereof from, for example, a designer. In some embodiments where a plurality of sources are involved, a primary object may comprise one of the sources to represent the plurality of sources.

For example, when the method or system identifies a cell instance of multiple objects as sources in some embodiments, the method or system may identify or designate one source from the multiple sources in the cell instance as the primary object. In these embodiments, the method or system may use the identified or designated source to generate one or more scenarios for what-if analyses. In this example, the method or system may identify designate one of the plurality of sources as a primary object and performs various processes (e.g., automatic snapping) described herein to position the plurality of sources based on the positioning of the primary object. A practical example comprises the case where the method or system identifies and designates or allows a user to identify and designate a n-type well in a CMOS (complementary-metal-oxide-semiconductor) device as a primary object and snaps the primary object to, for example, an IC power supply pin ($V_{DD}$) for the CMOS device. In various embodiments, the method or system may identify and designate or allow a user to identify and designate an object or a part thereof (e.g., an edge) in a set of objects (e.g., an instance of a cell) and performing various processes or actions on the primary object to position the entire set of objects.

Moreover, the method or the system may perform various functions or processes to analyze the object and the target object(s), the primary object(s), or a combination thereof. For example, the method or the system may identifying two neighboring objects as the target objects while attempting to place an object of interest in the vicinity of the target objects. In this example, the method or the system focuses solely on or analyzes with higher priority the target objects and the object of interest. In some embodiments, the method or system uses a primary object as a tiebreaker in an event that the attempted modification of the object may not satisfy the requirements of a plurality of target objects.

For example, if the method or system identifies two target objects to check certain constraints against, and if the method or system arrives at a situation where each of several options for the modification process gives rise to a constraint violation so no solution exists that will result in a DRC clean design for a dynamic object subject to a modification process, the method or the system may further identify one of the two targets or another object as a tie breaker and check the relevant constraints against the primary object to determine how to apply the modification process to the dynamic object. In some embodiments, a target object or a primary object may be identified or designated at any time in some embodiments.

For example, the method or system allows a designer to designate any object as a target at any time by using, for example but not limited to, a point device, a menu command, a hot key or a combination of key strokes, a bind key, etc. A designer may even identify or designate one or more objects as targets when one or more constraints are being checked in some embodiments. In some embodiments, the method or system for implementing a physical design of an electronic circuit with automatic snapping may comprise the respective process or module 210A of determining a single- or multi-scenario what-if analysis based at least in part upon the set of one or more constraints. In some embodiments, the single- or multi-scenario what-if analysis includes one or more analyses with one (for single-scenario) or more scenarios (for multi-scenario) where the object is positioned based on the one or more constraints in the layout before the one or more scenarios actually occur.

For example, the multi-scenario what-if analysis may include the analysis to predict what may occur if an object is placed relative to a target object in a layout according to a table-based constraint that requires different minimum spacing values for different operating voltages. The method or the system may, in the background, uses a database transaction to implement the operations of a single scenario of the multiple scenarios, obtain the results, and then undo the transaction to restore the electronic design to its original state as if the single scenario had never occurred. In this example, the method or the system may perform such single- or multi-scenario analysis and interactively or in nearly real-time present the analysis results to a designer via a user interface before any of the single or multiple scenarios analysis actually occur.

In some embodiments, the method or system for implementing a physical design of an electronic circuit with automatic snapping may comprise the respective process or module 212A of identifying an approximate position for the object in the layout. In some embodiments, the method or system may identify a plurality of approximate positions for the object in the layout. An approximate position of an object includes the location or orientation of the object in the layout at a certain time point. For example, a modification process may capture the use's attempt to place an object in a certain position in the layout with a, for example, point device, or with some commands from a script. In this example, the approximate position of the object includes the location or orientation where the user attempts to place or orient the object in the layout.

As another example where a designer drags an object through a portion of a layout in an attempt to place or orient the object, the method or system may capture multiple locations or orientations of the object along the trajectory along which the designer drags the object. In some embodiments, the method or system for implementing a physical design of an electronic circuit with automatic snapping may comprise the respective process or module 214A of determining a drop position for the object based on the approximate position for the object. In these embodiments, the drop position comprises the location or orientation that the method or the system determines to finally place or orient the object in the layout. More details about the process or module 214A will be provided in some subsequent paragraphs below with reference to FIG. 6.

In some embodiments, the method or system for implementing a physical design of an electronic circuit with automatic snapping may comprise the respective process or module 216A of determining whether at least one relevant constraint of the set of one or more constraints is satisfied. More details about how to determine whether at least one relevant constraint is satisfied are provided in U.S. patent application Ser. No. 13/445,860 entitled "METHODS, SYSTEMS, AND ARTICLES OF MANUFACTURE OF IMPLEMENTING INTERACTIVE, REAL-TIME CHECKING OR VERIFICATION OF COMPLEX CONSTRAINTS" and filed concurrently, the content of which is hereby incorporated by reference in its entirety for all purposes. In some embodiments, the method or system for implementing a physical design of an electronic circuit with automatic snapping may comprise the respective process or module 218A of performing the modification process on the object based at least in part upon the position.

Some details about the process or module 218A are provided in the description of FIG. 2 above. More details about the process or module 218A will be provided in the description of FIG. 8 below. In some embodiments, the method or system for implementing a physical design of an electronic circuit with automatic snapping may optionally comprise the respective process or module 220A of determining a mask identification of the object based at least in part upon the results of the modification process. More details about the mask identification of the object are described in how to determine whether at least one relevant constraint is satisfied are provided in U.S. patent application Ser. No. 13/445,847, filed concurrently with the title "METHODS, SYSTEMS, AND ARTICLES OF MANUFACTURE FOR IMPLEMENTING INTERACTIVE COLORING OF PHYSICAL DESIGN COMPONENTS IN A PHYSICAL DESIGN WITH MULTIPLE-PATTERNING TECHNIQUES AWARENESS", the content of which is hereby incorporated by reference in its entirety for all purposes.

Figure 3:
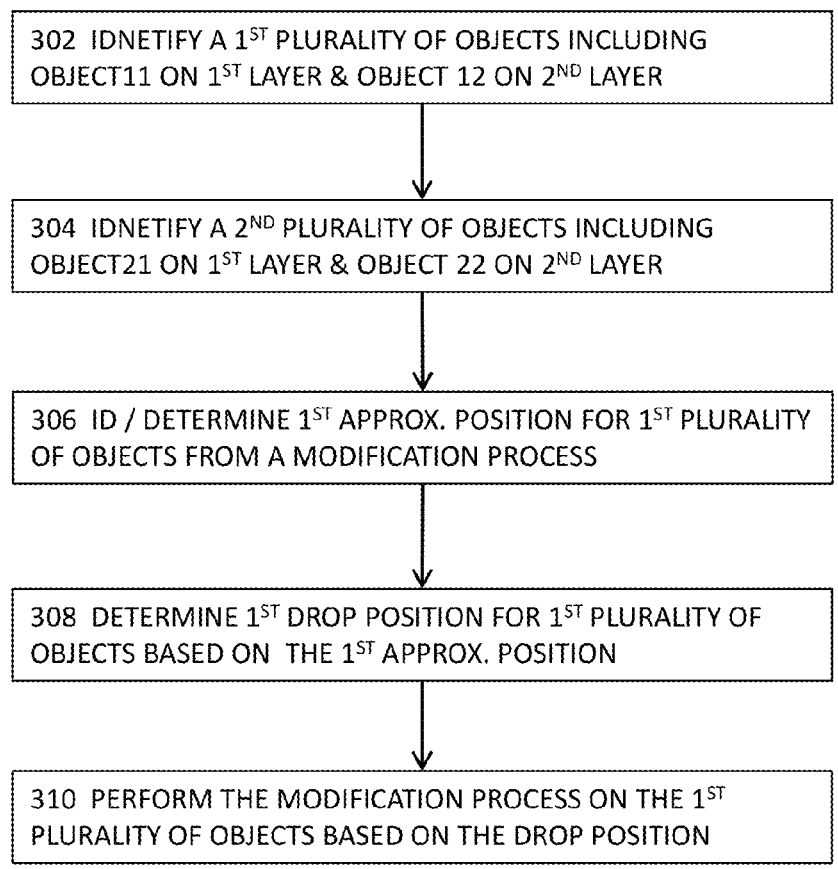
FIG. 3 illustrates a high level flow diagram for implementing a physical design of an electronic circuit with automatic snapping in some embodiments.

FIG. 3 illustrates a high level flow diagram for implementing a physical design of an electronic circuit with automatic snapping in some embodiments. In some embodiments, the method or system for implementing a physical design with automatic snapping may comprise the respective process or module 302 of identifying a plurality of objects that include Object11 on the first layer and Object12 on a second layer of a layout of an electronic design. In some embodiments, the layout comprises at least two layers—a first layer and the second layer. In these embodiments, the first plurality of objects may jointly comprise an instance of a cell or a group of multiple individual component designs that will be manipulated together.

In some embodiments, the method or system for implementing a physical design with automatic snapping may comprise the respective process or module 304 of identifying a second plurality of objects that include Object21 on the first layer and Object22 on the second layer of the layout. In these embodiments, the second plurality of objects may, for example, jointly comprise an instance of a cell or a group of multiple individual component designs that will be manipulated together. In some embodiments, the method or system for implementing a physical design with automatic snapping may comprise the respective process or module 306 of identifying or determining a first approximate position for the first plurality of objects arising out of a modification process.

For example, a designer may attempt to place a cell instance including Object11 and Object12 in the layout in these embodiments. In some embodiments, the method or system for implementing a physical design with automatic snapping may comprise the respective process or module 308 of determining a first drop location for the first plurality of objects based at least in part upon the first approximate position. In addition, the method or system may determine the drop position for the first plurality of objects based further in part upon one or more constraints in some embodiments. In the previous example, after identifying or determining the first approximate position, the method or the system may determine the drop position to finally place or orient the cell instance in the layout by examining one or more nodes in certain vicinity of the first approximate position, and selecting or recommending one of the one or more nodes as the drop position.

In some embodiments, the method or system for implementing a physical design with automatic snapping may comprise the respective process or module 310 of performing the modification process on the first plurality of objects based at least in part upon the drop position. In various embodiments illustrated in FIG. 3, the method or system performs layer-to-layer snapping by positioning one set of objects in multiple layers relative to another set of object in the same multiple layers while observing the layering structure of the two sets of objects. More details about the layer-to-layer snapping are described in greater details in the subsequent description of FIG. 3A.

Figure 3A:
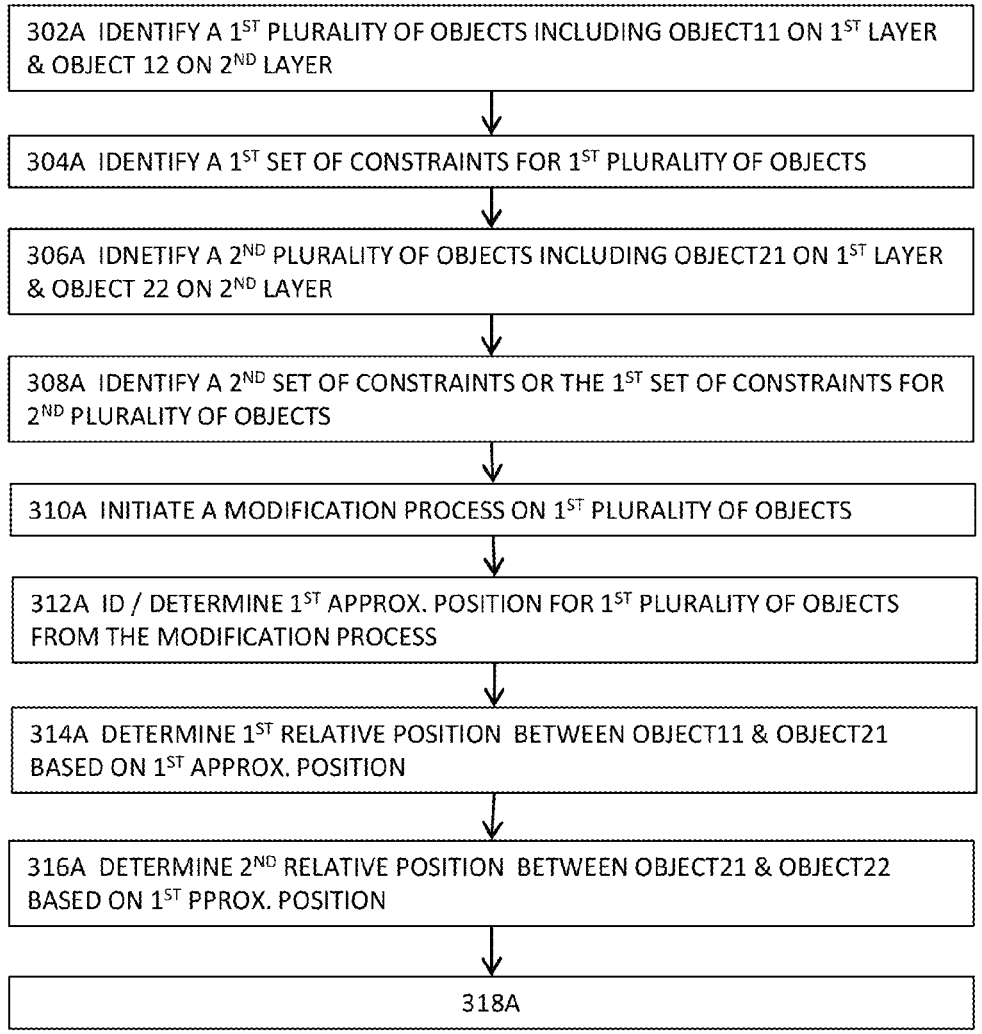
FIG. 3A illustrates more detailed flow diagram for implementing a physical design of an electronic circuit with automatic snapping in some embodiments.
Figure 3A:
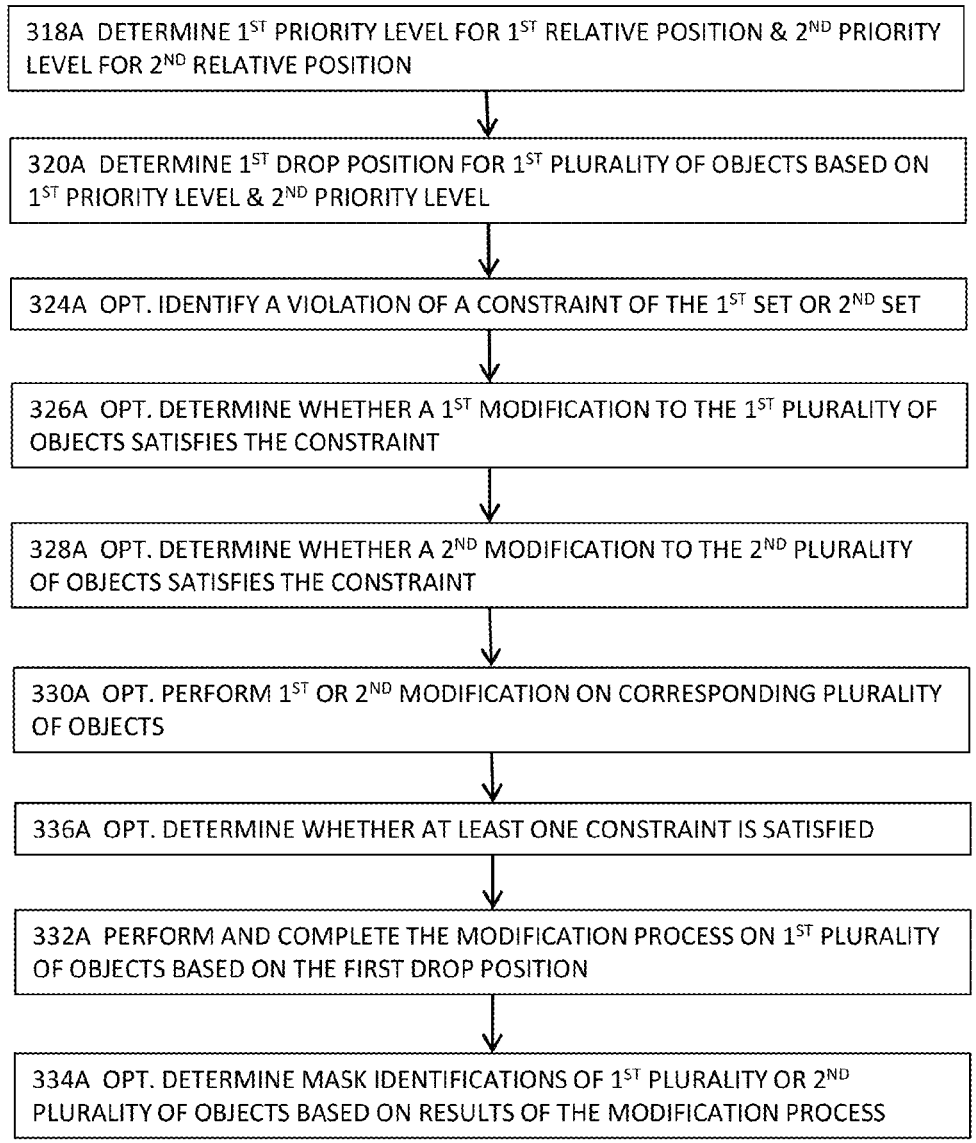

FIG. 3A illustrates more detailed flow diagram for implementing a physical design of an electronic circuit with automatic snapping in some embodiments. In some embodiments, the method or system for implementing a physical design with automatic snapping may comprise the respective process or module 302A of identifying a first plurality of objects that include Object11 on the first layer and Object12 on the second layer of a layout of electronic design. In some embodiments, the method or system for implementing a physical design with automatic snapping may comprise the respective process or module 304A of identifying a first set of one or more constraints that are related to or may be applied to the first plurality of objects.

In some embodiments, the method or system for implementing a physical design with automatic snapping may comprise the respective process or module 306A of identifying a second plurality of objects that include Object21 on the first layer and Object22 on the second layer. In some embodiments, the method or system for implementing a physical design with automatic snapping may comprise the respective process or module 308A of identifying a second set of one or more constraints that may be related to or may be applied to the second plurality of objects. In some embodiments, the method or system for implementing a physical design with automatic snapping may comprise the respective process or module 310A of initiating a modification process that is to be performed on a first plurality of objects. In these embodiments, the modification process operates on the first plurality of objects as a whole, rather than manipulating an individual object with the first plurality of objects.

In some embodiments, the method or system for implementing a physical design with automatic snapping may comprise the respective process or module 312A of identifying or determining a first approximate position for the first plurality of objects as a result of some operations of the modification process on the first plurality of objects. In some embodiments, the method or the system may identify or determine multiple first approximate positions for the first plurality of objects. More details about the process or module 312A will be provided in the description for FIG. 4. In some embodiments, the method or system for implementing a physical design with automatic snapping may comprise the respective process or module 314A of determining a first relative position between Object11 and Object21 on the first layer of the layout based at least in part upon the first approximate position. More details about the process or module 314A will be provided in the description for FIG. 5A.

In some embodiments, the method or system for implementing a physical design with automatic snapping may comprise the respective process or module 316A of determining a second relative position between Object21 and Object22 on the second layer of the layout based at least in part upon the first approximate position. More details about 316A will be provided in the description of FIG. 5B below. In some embodiments, the method or system for implementing a physical design with automatic snapping may comprise the respective process or module 318A of determining a first priority level for the first relative position and a second priority level for the second relative position.

For example, the first relative position and the second relative position, when used to determine how to position the first plurality of objects relative to the second plurality of objects, may compete for a position that best fits the respective set one or more constraints. In this example, the method or the system may assign different priority levels to different relative positions based on, for example, a cost analysis or an objective function to improve the electronic design. In some embodiments, the method or system for implementing a physical design with automatic snapping may comprise the respective process or module 320A of determining a first drop location for the first plurality of objects based at least in part upon the first priority level and the second priority level. For example, the method or system may determine to snap the first plurality of objects to the second plurality of objects by aligning Object11 with Object21 even though such an alignment may result in some violation of one or more constraints governing Object12 or Object22 if the method or the system identifies or determines a higher priority level for the first relative position between Object11 and Object21.

In some embodiments, the method or system for implementing a physical design with automatic snapping may optionally comprise the respective process or module 324A of identifying a violation of a constraint of the first set, the second set, or other constraints. In some embodiments, 324A is performed before the actual positioning of the first plurality of objects in the layout, and the method or system may thus provide an interactive or nearly real-time feedback to a designer as to whether certain constraint is satisfied if the first plurality of objects is to be positioned at the first drop position. In some embodiments, the method or system for implementing a physical design with automatic snapping may optionally comprise the respective process or module 326A of determining whether a first modification to the first plurality of objects satisfies the constraint that may be violated if the first plurality of objects is to be positioned at the first drop position. In these example, the method or the system considers the possibility of modifying the positioning, size(s), or object(s) of one or more objects within the first plurality of objects in order to determine whether the result satisfies the constraint that may be violated if the first plurality of objects is to be positioned at the first drop position without modification.

In some embodiments where the first plurality of objects constitutes a cell instance, the first modification may result in the creation of a new class of objects due to one or more changes arising out of the first modification. In some embodiments, the method or system for implementing a physical design with automatic snapping may optionally comprise the respective process or module 328A of determining whether a second modification to the second plurality of objects satisfies the constraint that may be violated if the first plurality of objects is to be positioned at the first drop position. In these example, the method or the system considers the possibility of modifying the positioning, size(s), or object(s) of one or more objects within the second plurality of objects in order to determine whether the result satisfies the constraint that may be violated if the first plurality of objects is to be positioned at the first drop position without the second modification to the one or more objects in the second plurality of objects.

In some embodiments where the second plurality of objects constitutes a cell instance, the second modification may result in the creation of a new class of objects due to one or more changes arising out of the second modification. In some embodiments, the method or system for implementing a physical design with automatic snapping may optionally comprise the respective process or module 330A of performing the first modification or the second modification on their corresponding plurality of objects. In some embodiments where both the first modification and the second modification resolve the predicted violation of a constraint, the method or the system may determine which modification to apply based at least in part upon, for example, a cost analysis or an objective function aiming at improving one or more aspects of the electronic design. In some embodiments, the method or system may ignore both the first and the second modification despite the predicted violation of a constraint with positioning the first plurality of objects at the first drop position.

In these embodiments, the method or the system may also base the decision at least in part upon, for example, a cost analysis or an objective function. In some embodiments, the method or system for implementing a physical design with automatic snapping may optionally comprise the respective process or module 332A of determining at least one constraint is satisfied. In some embodiments, the at least one constraint comprises a constraint other than the first set of the second set of one or more constraints. In some embodiments, the method or system for implementing a physical design with automatic snapping may optionally comprise the respective process or module 332A of performing and completing the modification process on the first plurality of objects based at least in part upon the first drop position.

In some embodiments, the method or system for implementing a physical design with automatic snapping may optionally comprise the respective process or module 334A of determining one or more mask identification of at least some objects of the first plurality of objects or at least some objects of the second plurality of objects based at least in part upon the results of the modification process. For example, the position of the first plurality of objects at the first drop position by aligning Object11 with Object21 on the first layer while observing certain constraints governing one or both objects may result in an actual violation of a constraint between Object12 and Object22 on the second layer so these two objects may no longer be printed on the same mask. In this example, the method or the system may thus assign or reassign one of the two objects to another mask if the electronic design requires multiple-pattern lithography processes for manufacturing.

Figure 4:
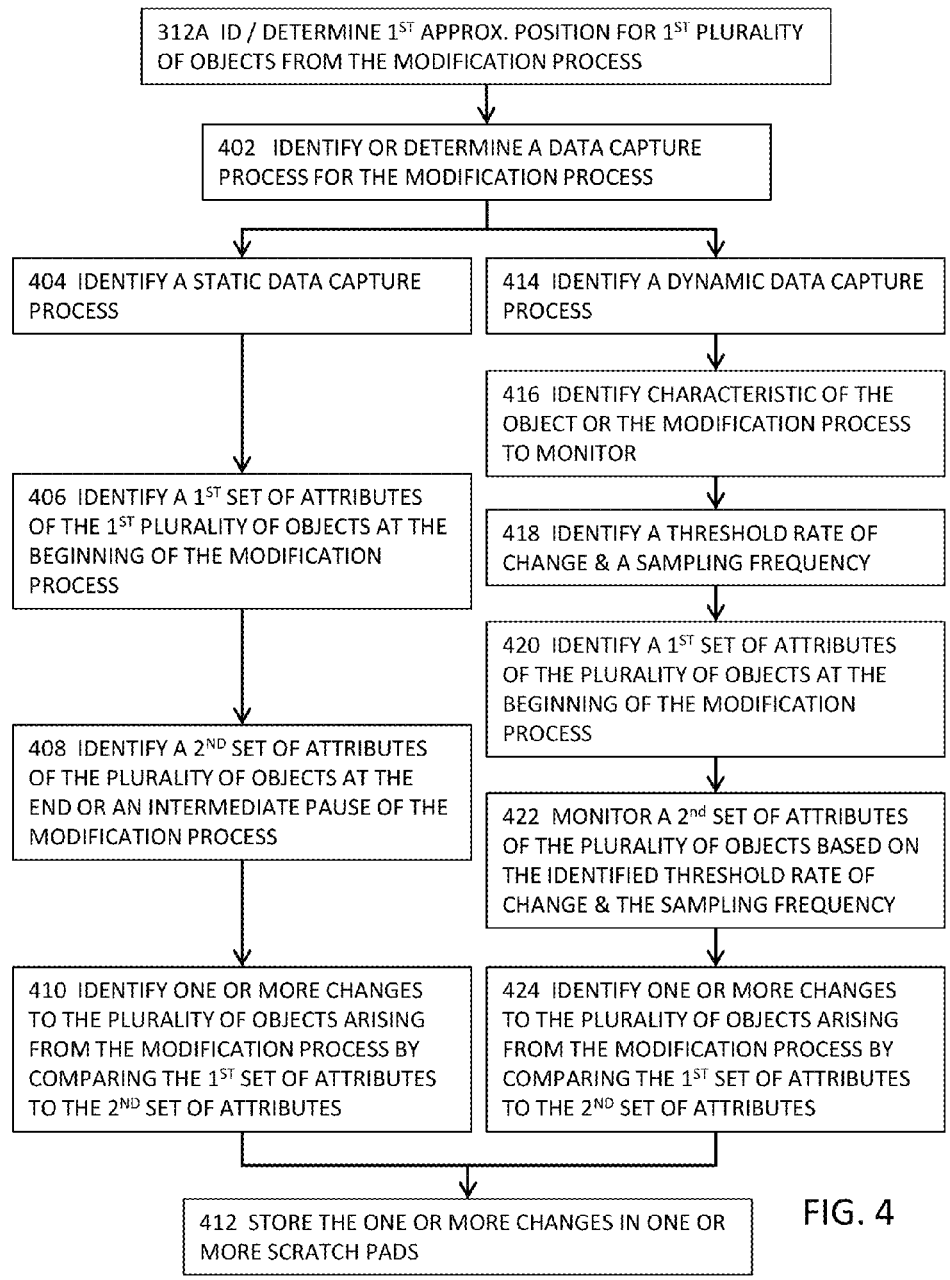
FIG. 4 illustrates more details about the process or module 312A illustrated in FIG. 3A in some embodiments.

FIG. 4 illustrates more details about the process or module 312A illustrated in FIG. 3A for identifying or determining a first approximate position for the first plurality of objects in some embodiments. In some embodiments, the process or module 312A may comprise the respective process or module 402 of identifying or determining a data capturing or acquisition process for the modification process. In some embodiments, the process or module 402 for identifying or determining a data capturing or acquisition process or module comprises the sub-process or sub-module 404 for identifying a static data capturing process or module. In these embodiments, the process or module 402 may further comprise the sub-process or sub-module 406 for identifying a first set of attributes of the object at the beginning of the modification process.

For example, the process or module 406 may identify the initial location of the object at the beginning of a moving process that moves the object from the initial location to a final location. In this example, the first set of attributes of the object may comprise the coordinates of the initial location in the physical design space. In these embodiments, the process or module 402 may further comprise the sub-process or sub-module 408 for identifying a second set of attributes of the object at the end or one or more intermediate pauses of the modification process. In the above example, the process or module 408 may identify the final location (or one or more intermediate locations of the object when the object temporarily stops at these intermediate locations) of the object.

In this example, the second set of attributes comprise the coordinates of the final location of the object in the physical design space. In these embodiments, the process or module 402 may further comprise the sub-process or sub-module 410 for identifying one or more changes to the object that arise from the modification process. In these embodiments, the sub-process or sub-module 410 may identify the one or more changes by comparing the first set of attributes with the second set of attributes. In the above example, the one or more changes includes the changes in the coordinates of the object.

In the alternative, the process or module 402 for identifying or determining a data capturing or acquisition process or module comprises the sub-process or sub-module 414 for identifying a dynamic data capturing process in some embodiments. In some embodiments, the process or module 402 for identifying or determining a data capturing or acquisition process or module comprises the sub-process or sub-module 416 for identifying one or more characteristics of the object or the modification process for monitoring purposes. In some embodiments, the one or more characteristics may comprise the rate of change of the object by the modification process. In some embodiments where the modification process includes moving the object, the one or more characteristics comprise the speed at which the object is being moved.

In some embodiments, the process or module 402 for identifying or determining a data capturing or acquisition process or module optionally comprises the sub-process or sub-module 418 for identifying a threshold rate of change or a sampling frequency for acquiring or capturing the data about the object. The sub-process or sub-module 418 may, for example, acquire data every fixed period of time based on the sampling frequency in some embodiments. In some embodiments, the sub-process or sub-module 418 ignores all the locations when the rate of change of the object exceeds the threshold rate of change. In the previous example, the sub-process or sub-module 418 ignores all the locations of the object when the object is being moved if the threshold rate of change is set to zero. If the threshold rate of change comprises a non-zero value, the sub-process or sub-module 418 ignores all the locations of the object when the object is being moved at a speed higher than the threshold rate of change.

In some embodiments, the process or module 402 for identifying or determining a data capturing or acquisition process or module comprises the sub-process or sub-module 420 for identifying a first set of attributes of the object at the beginning of the modification process. In the previous example, the sub-process or sub-module 420 may identify the initial location of the object at the beginning of the modification process that adjusts the placement of the object. The first set of attributes may comprise, for example but not limited to, a location, size, length, width, orientation, object, configuration, etc. of the object at a point in the modification process in some embodiments. In some embodiments where the object is being created for the first time in the physical design, the process or module 402 may identify the location of the object where the object is first introduced into the physical design.

In some embodiments, the process or module 402 for identifying or determining a data capturing or acquisition process or module comprises the sub-process or sub-module 422 for identifying a second set of attributes for the object based at least in part upon the threshold rate of change or the sampling frequency. The second set of attributes may comprise, for example but not limited to, a location, size, length, width, orientation, object, configuration, etc. of the object at a point in the modification process in some embodiments. In some embodiments, the process or module 402 for identifying or determining a data capturing or acquisition process or module comprises the sub-process or sub-module 424 for identifying one or more changes to the object that arise out of the modification process. In some embodiments, the sub-process or sub-module 422 identifies the one or more changes to the object by comparing the first set of attributes with the second set of attributes. In both approaches, the process or module 402 may then proceed to 412 to store the one or more changes in one or more scratch pads.

Figure 5A:
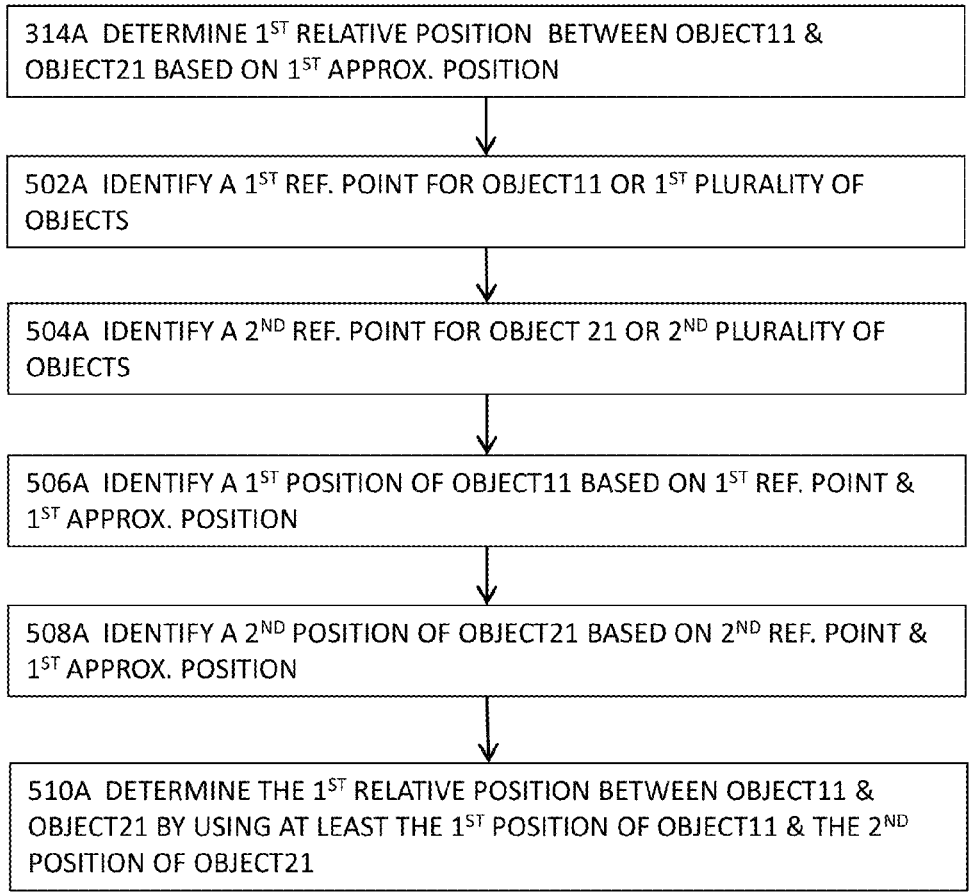
FIG. 5A illustrates more details about the process or module 314A illustrated in FIG. 3A in some embodiments.

FIG. 5A illustrates more details about the process or module 314A illustrated in FIG. 3A in some embodiments. In some embodiments, the process or module 314A may comprise the respective process or module 502A of identifying a first reference point for Object11 or for the first plurality of objects. In some embodiments, the method or the system uses the first reference point together with an approximate location of the first plurality of objects to determine the position of objects in the first plurality of objects where the objects are defined relative to the first plurality of objects in a local space defined by the first plurality of objects. A reference point may include, for example but not limited to, the geometric center of the plurality of objects or any points in space that may be used to discern the actual location or orientation of each of the plurality of objects.

In some embodiments where the objects in the first plurality of objects are defined with absolute coordinates in the global space, the method or system may use the absolute coordinates in the global space for each object and thus skip 502A entirely. In some embodiments, the process or module 314A may comprise the respective process or module 504A of identifying a second reference point for Object21 or for the second plurality of objects. The same about the relative and absolute coordinates for the first reference point and the first plurality of objects also applies to the second reference point and the second plurality of objects. In some embodiments, the process or module 314A may comprise the respective process or module 506A of identifying a first position of Object11 based on the first reference point and the first approximate position or based on the global coordinates of Object11.

In some embodiments, the process or module 314A may comprise the respective process or module 508A of identifying a second position of Object21 based on the second reference point and the first approximate position or based on the absolute coordinates of Object21. In some embodiments where only the first plurality of objects is subject to a modification process, and the second plurality of objects remain static in the layout, the method or the system needs only identify the position of Object21 once. In some embodiments, the process or module 314A may comprise the respective process or module 510A of determining the first relative position between Object11 and Object21 on the first layer by using at least the first position of Object11 and the second position of Objec21.

Figure 5B:
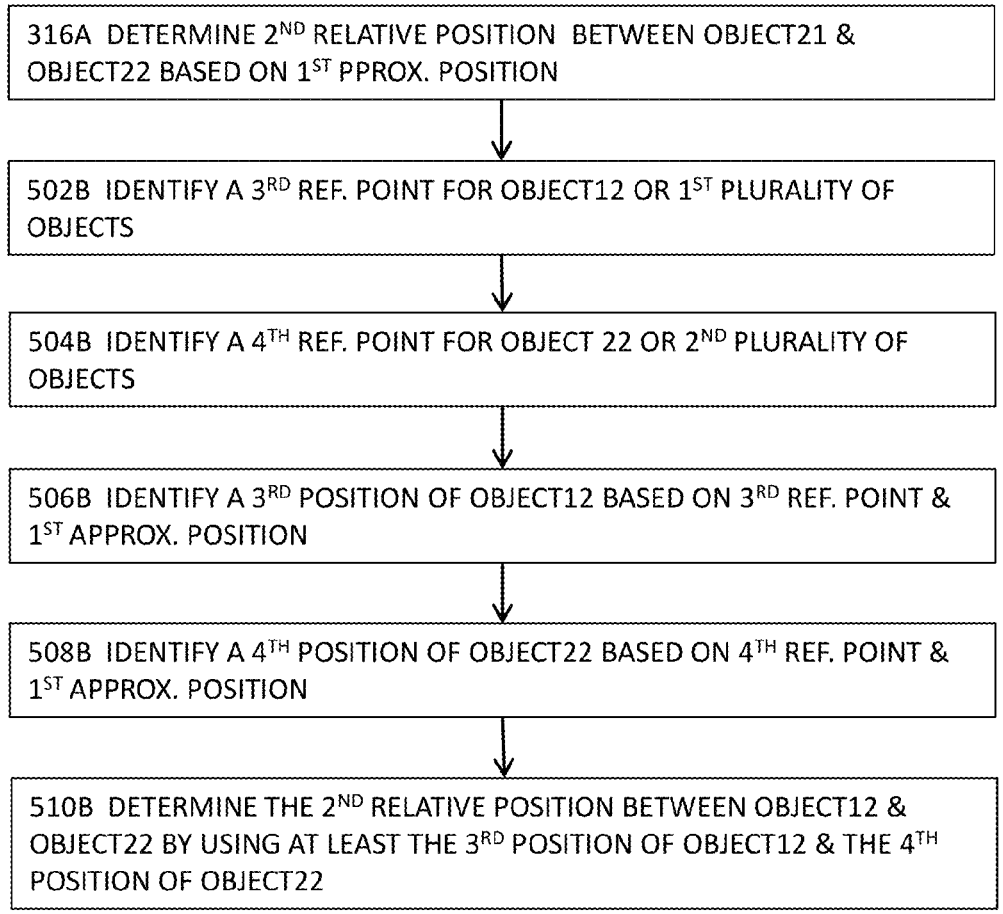
FIG. 5B illustrates more details about the process or module 316A illustrated in FIG. 3A in some embodiments.

FIG. 5B illustrates more details about the process or module 316A illustrated in FIG. 3A in some embodiments. In some embodiments, the process or module 316A may comprise the respective process or module 502B of identifying a third reference point for Object12 or for the first plurality of objects. In some embodiments, the method or the system uses the third reference point together with an approximate location of the first plurality of objects to determine the position of objects in the first plurality of objects where the objects are defined relative to the first plurality of objects in a local space defined by the first plurality of objects. A reference point may include, for example but not limited to, the geometric center of the plurality of objects or any points in space that may be used to discern the actual location or orientation of each of the plurality of objects.

In some embodiments where the objects in the first plurality of objects are defined with absolute coordinates in the global space, the method or system may use the absolute coordinates in the global space for each object and thus skip 502B entirely. In some embodiments, the process or module 316A may comprise the respective process or module 504B of identifying a fourth reference point for Object22 or for the second plurality of objects. The same about the relative and absolute coordinates for the third reference point and the first plurality of objects also applies to the fourth reference point and the second plurality of objects. In some embodiments, the process or module 316A may comprise the respective process or module 506B of identifying a third position of Object12 based on the third reference point and the first approximate position or based on the global coordinates of Object12.

In some embodiments, the process or module 316A may comprise the respective process or module 508B of identifying a fourth position of Object22 based on the fourth reference point and the first approximate position or based on the absolute coordinates of Object22. In some embodiments where only the first plurality of objects is subject to a modification process, and the second plurality of objects remain static in the layout, the method or the system needs only identify the position of Object22 once. In some embodiments, the process or module 316A may comprise the respective process or module 510B of determining the first relative position between Object12 and Object22 on the second layer by using at least the third position of Object12 and the fourth position of Object22.

Figure 6:
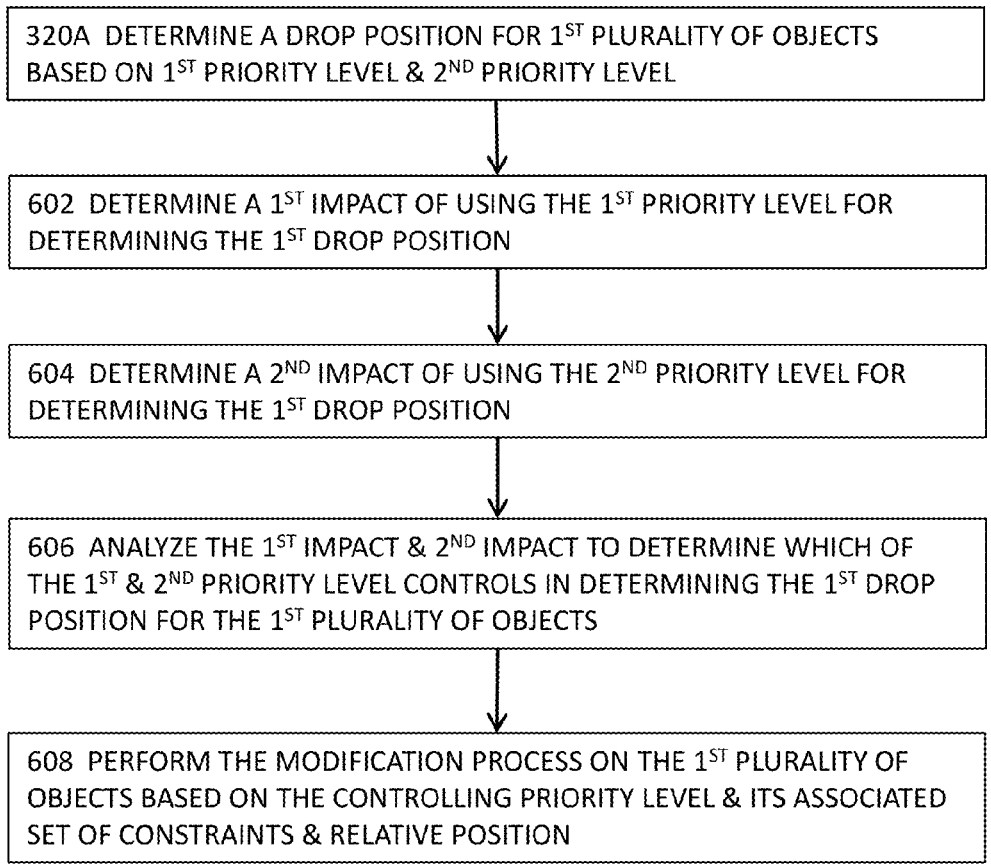
FIG. 6 more details about the process or module 320A illustrated in FIG. 3A in some embodiments.

FIG. 6 more details about the process or module 320A illustrated in FIG. 3A in some embodiments. In some embodiments, the process or module 320A may comprise the respective process or module 602 of determining a first impact of assigning a higher priority to the first priority level than the second priority level for determining the first drop position. In some embodiments, the method or the system may further identify a cost function or an objective function based at least in part upon, for example, a performance aspect, electrical effects (e.g., coupling capacitance, electro-migration, etc.), parasitic effects, or yield, etc. to determine the first impact at 602. In some embodiments, the process or module 320A may comprise the respective process or module 604 of determining a second impact of assigning a higher priority to the second priority level than the first priority level for determining the first drop position.

In some of these embodiments, the method or the system may similarly identify a cost function or an objective function based at least in part upon, for example, a performance aspect, electrical effects (e.g., coupling capacitance, electro-migration, etc.), parasitic effects, or yield, etc. to determine the first impact at 604. In some embodiments, the process or module 320A may comprise the respective process or module 606 of analyzing the first impact and the second impact to determine which priority level of the first and the second priority level is to be used in determining the first drop location for the first plurality of objects.

For example, if the method or system determines that assigning a higher priority to the first priority level results in lower costs or less negative impact or gives rise to greater positive impact on the electronic design, the method or the system may assign a higher priority level to the first priority level and relies solely on or associates a greater weight the first priority level to determine the first drop position. In some embodiments, the process or module 320A may comprise the respective process or module 608 of performing the modification process on the first plurality of objects based at least in part upon the priority level with higher priority and its associated set of one or more constraints. In some embodiments, the method or system may perform the modification process based at least in part upon the priority level with higher priority even at the expense of violating one or more constraints or causing some negative impact with the other priority level. In some embodiments, the method or the system may perform the modification process further based at least in part upon the corresponding relative position associated with the determined priority level.

Figure 7:
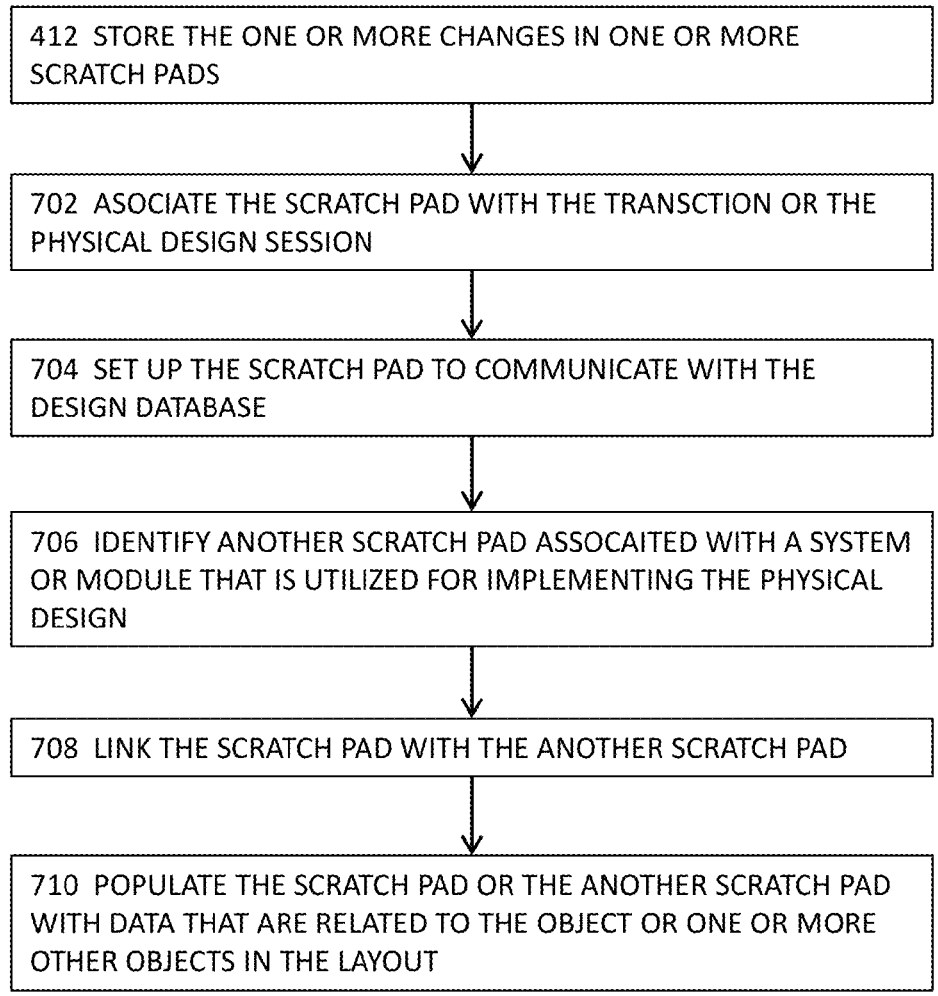
FIG. 7 illustrates more details about the process or module 412 illustrated in FIG. 4 for storing one or more changes in one or more scratch pads in some embodiments.

FIG. 7 illustrates more details about the process or module 412 illustrated in FIG. 4 for storing one or more changes in one or more scratch pads in some embodiments. In some embodiments, the process or module 412 for identifying or creating a scratch pad for the modification process or transaction may comprise the respective sub-process or sub-module 702 of associating the one or more scratch pads with the transaction or the layout view or a part thereof. In some embodiments, the association may include the use of a flag, link, pointer, or bitmap value to indicate which scratch pad is associated with which transaction or layout view of a part thereof.

In some embodiments, the process or module 412 for identifying or creating a scratch pad for the modification process or transaction may comprise the respective sub-process or sub-module 704 of setting up the one or more scratch pads to communicate with the design database so the method or the system may read data or information from the design database and populate the data or information into the one or more scratch pads as well as write the data or information in the one or more scratch pads into the design database. In some embodiments, the process or module 412 for identifying or creating a scratch pad for the modification process or transaction may optionally comprise the respective sub-process or sub-module 706 of identifying another scratch pad that is associated with a specific process, module, or design tool and is utilized to perform various functions described herein. As disclosed in the preceding paragraphs, some process, module, or design tool may have its own scratch pads in some embodiments.

The process or module 706 identifies such scratch pads in these embodiments. In some embodiments, the process or module 412 for identifying or creating a scratch pad for the modification process or transaction may comprise the respective sub-process or sub-module 708 of linking the one or more scratch pads with the another scratch pad identified at 706 so these scratch pads communicate with each other to jointly perform various functions described here. In some embodiments, the process or module 412 for identifying or creating a scratch pad for the modification process or transaction may comprise the respective sub-process or sub-module 710 of populating the one or more scratch pads or the another scratch pad with data or information that is related to the object or to one or more objects (e.g., one or more target objects) in the layout.

Figure 8:
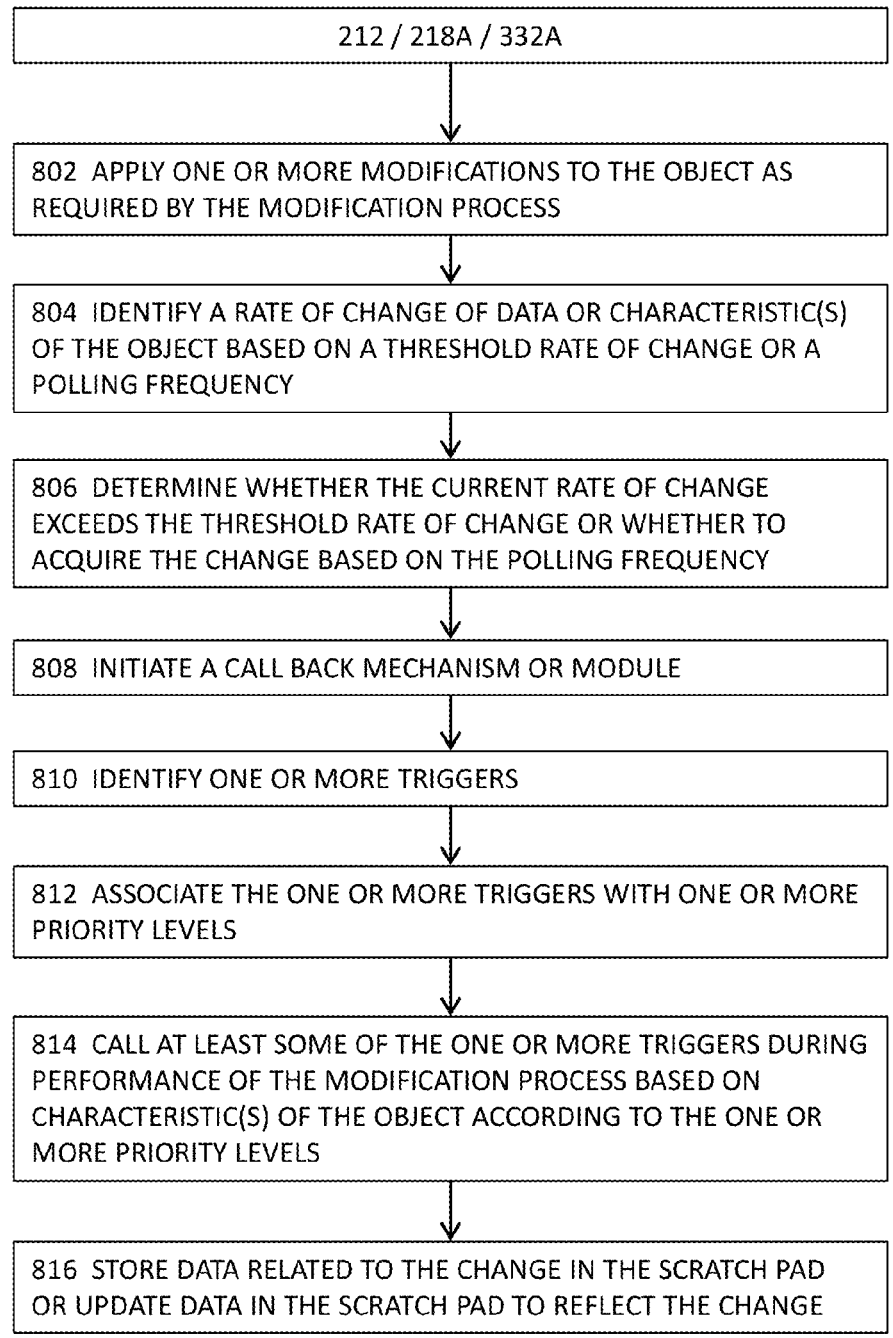
FIG. 8 illustrates more details about the process or module 212 or 332A respectively illustrated in FIGS. 2 and 3A in some embodiments.

FIG. 8 illustrates more details about the process or module 212 illustrated in FIG. 2, 218A illustrated in FIG. 2A, or 332A illustrated in FIG. 3A in some embodiments. In some embodiments, the process or module (212, 218A, or 332A) for performing the modification process may comprise the respective sub-process or sub-module 802 of applying one or more modifications to the object as required or defined by the modification process. In some embodiments, the process or module (212, 218A, or 332A) for performing the modification process on the object to generate a change may comprise the respective sub-process or sub-module 804 of identifying a rate of change of the data or one or more characteristics of the object. In some embodiments, the method or the system identifies the rate of change based at least in part upon a threshold rate of change or a polling or sampling frequency.

In some embodiments, the process or module (212, 218A, or 332A) for performing the modification process on the object to generate a change may comprise the respective sub-process or sub-module 806 of determining whether the current rate of change exceeds the threshold rate of change, or whether or not the method or system is to acquire data or information resulting from the modification process according to the polling or sampling frequency. For example, the sub-process or sub-module 606 may, for example, acquire data every fixed period of time based on the sampling or polling frequency in some embodiments. In some embodiments, the sub-process or sub-module 806 ignores all the locations when the rate of change of the object exceeds the threshold rate of change.

In the previous example, the sub-process or sub-module 806 may ignore all the locations of the object when the object is being moved if the threshold rate of change is set to zero. If the threshold rate of change comprises a non-zero value, the sub-process or sub-module 806 may ignore all the locations of the object when the object is being moved at a speed higher than the threshold rate of change. In these embodiments, the method or system may determine whether and how the changes arising from the modification process is to be captured and thus may analyze the electronic design based on the captured changes to provide an interactive or nearly real-time feedback to, for example, a designer via, for example, a user interface. In some embodiments, the process or module (212, 218A, or 332A) for performing the modification process may comprise the respective sub-process or sub-module 808 of initiating a callback mechanism or module.

In some embodiments, the process or module (212, 218A, or 332A) for performing the modification process may comprise the respective sub-process or sub-module 810 of identifying one or more triggers. More details about the callback mechanism or module and the one or more triggers are described in the U.S. patent application Ser. No. 13/445,860 entitled "METHODS, SYSTEMS, AND ARTICLES OF MANUFACTURE OF IMPLEMENTING INTERACTIVE, REAL-TIME CHECKING OR VERIFICATION OF COMPLEX CONSTRAINTS" and filed concurrently, the content of which is hereby incorporated by reference in its entirety for all purposes. In some embodiments, the process or module (212, 218A, or 332A) for performing the modification process may comprise the respective sub-process or sub-module 812 of associating the one or more triggers with one or more priority levels.

In some embodiments, the process or module (212, 218A, or 332A) for performing the modification process may comprise the respective sub-process or sub-module 814 of calling or invoking at least some of the one or more triggers. In some embodiments, the method or system calls or invokes the at least some of the one or more triggers during the performance of the modification process such that the method or system may provide interactive or nearly real-time feedback for the electronic design in response to one or more operations of the modification process. In some embodiments, the process or module (212, 218A, or 332A) for performing the modification process may comprise the respective sub-process or sub-module 816 of storing data or information, which is related to the one or more changes resulting from the modification process, in at least one of the one or more scratch pads or the another scratch pads to reflect the one or more changes. In some embodiments, the method or system may update the data or information in at least some of the one or more scratch pads or the another scratch pad to reflect the one or more changes arising out of the modification process. In these embodiments, the method or system does not yet commit the one or more changes or data or information related to the one or more changes.

Figure 9:
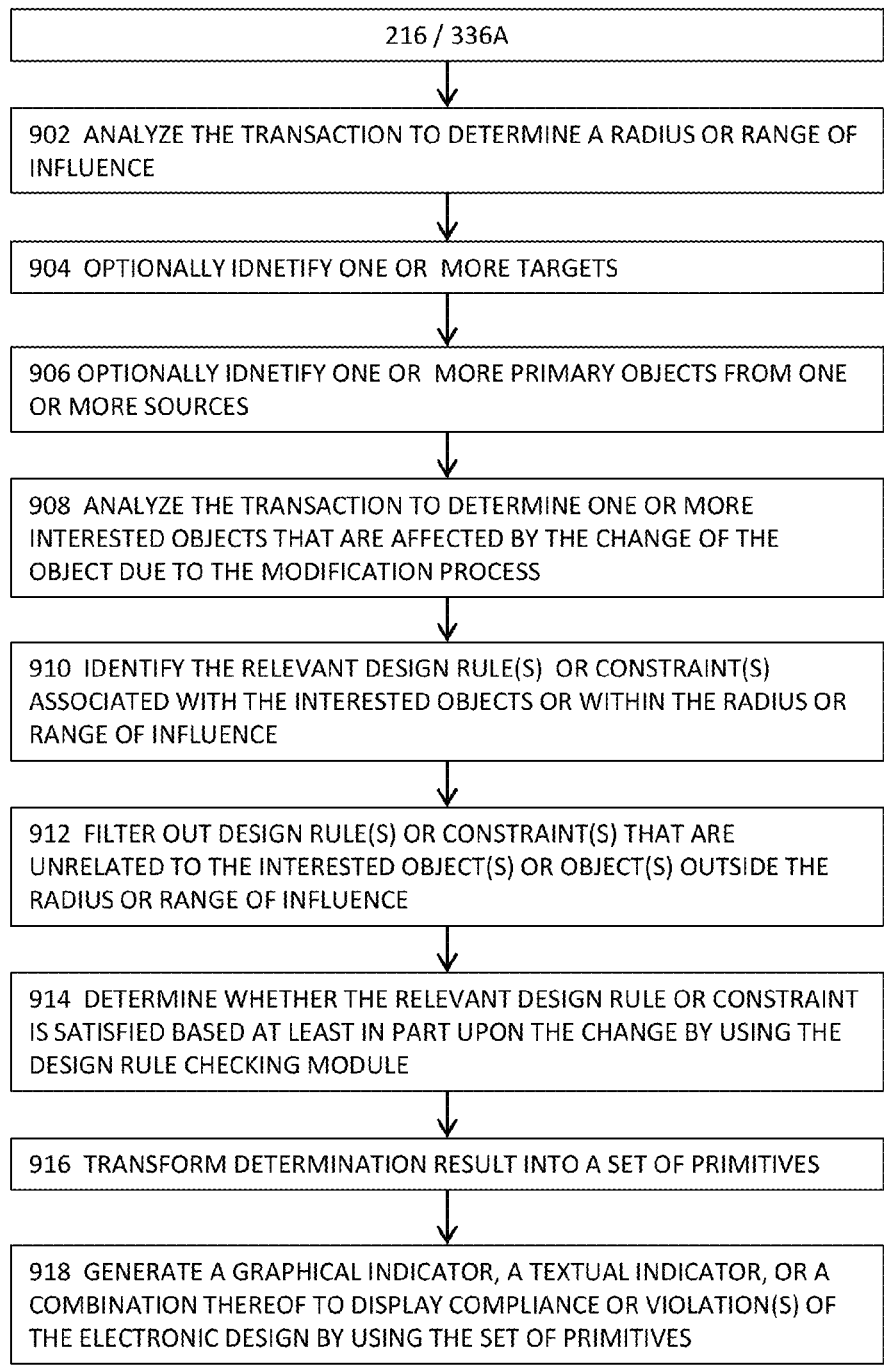
FIG. 9 illustrates more details about the process or module 216 or 336A respectively illustrated in FIGS. 2 and 3A in some embodiments.

FIG. 9 illustrates more details about the process or module 216 illustrated in FIG. 2 or 336A illustrated in FIG. 3A in some embodiments. In some embodiments, the process or module (216 or 336A) for determining whether a relevant constraint is satisfied may comprise the process or module 902 of analyzing a database transaction, which is implemented for the modification process, to determine a radius or range of influence. In some embodiments, the method or system analyzes the database transaction to determine the range or radius of influence by examining, for example, the connectivity information associated with one or more objects (e.g., the object), the current location of the object in relation to one or more other objects, one or more constraints, one or more electrical requirements (e.g., requirements for avoiding cross-talk, requirements for coupled capacitance, etc.), any constraints involving multiple objects, or any objects (e.g., the object of interest, one or more neighboring objects of the object, or one or more objects the object of interest may interact with or influence upon, etc.) that the database transaction may have some effects on, etc.

In some embodiments, the method or the system may determine the range or radius of influence to be the current view of the electronic design. In some embodiments where the determined range or radius of influence does not match the current view of the electronic design, the method or the system may adjust the current view of the electronic design (e.g., zoom in or zoom out) to display the range or radius of influence accordingly. In some embodiments, the process or module (216 or 336A) for determining whether a relevant constraint is satisfied may optionally comprise the process or module 904 of optionally identifying one or more targets. In some embodiments, a target may be identified or designated at any time in some embodiments.

For example, the method or system allows a designer to designate any object as a target at any time by using, for example but not limited to, a point device, a menu command, a hot key or a combination of key strokes, a bind key, etc. A designer may even identify or designate one or more objects as targets when one or more constraints are being checked in some embodiments. In some embodiments, the process or module (216 or 336A) for determining whether a relevant constraint is satisfied may optionally comprise the process or module 906 of optionally identifying one or more primary objects from one or more sources that are subject to the modification process. In some embodiments, a primary object may be identified or designated at any time in some embodiments. For example, the method or system allows a designer to designate any object as a primary object at any time by using, for example but not limited to, a point device, a menu command, a hot key or a combination of key strokes, a bind key, etc. A designer may even identify or designate one or more objects as primary objects when one or more constraints are being checked in some embodiments.

In some embodiments, the process or module (216 or 336A) for determining whether a relevant constraint is satisfied may comprise the process or module 908 of analyzing the database transaction to determine one or more interested objects that may be affected by the one or more changes to the object arising out of the modification process on the object. In some embodiments, the method or the system may identify one or more target objects or at least some or all of the objects in the range or radius of influence at 908.

In some embodiments, the process or module (216 or 336A) for determining whether a relevant constraint is satisfied may comprise the process or module 910 of identifying one or more relevant constraints that are associated with the one or more interested objects that may be affected by the one or more changes to the object. In some embodiments, the method or system may identify the one or more relevant constraints by using at least the connectivity information which includes data or information of the association of an object with its net. In these embodiments, the method or system may identify a plurality of sets of one or more constraints that may be applied to the object of interest in an electronic design. Rather than running through all the constraints in the plurality of sets, the method or system identifies one or more relevant constraints from the plurality of sets and applies only the identified one or more relevant constraints to the object.

In some embodiments where an electronic design comprises a first net associated with one or more first sets of constraints and a second net associated with one or more second sets of constraints, the disclosed method or system may identify one a subset of one or more constraints from the one or more first sets and the one or more second sets and apply only the subset of one or more constraints to the first net and the second net for constraint checking purposes.

For example, if the layout includes a first net (whether complete or incomplete) associated with one or more first sets of voltage-based constraints that impose different spacing requirements between the first net and other net(s) based on the operating voltages in the first net and a second net (whether complete or incomplete) associated with one or more second sets of voltage-based constraints that also impose different spacing requirements between the second net and other net(s) based on the operating voltages in the second net, the method may identify, for example, a first constraint from the one or more first sets that represents the worst-case scenario for the first net and a second constraint from the one or more second sets that also represents the worst-case scenario for the second net. The method may then apply only the first constraint and the second constraint to the first net and the second net and determine whether the first net and the second net as currently designed satisfy these two constraints and provide the constraint checking results to the designer in an interactive, nearly real-time manner. In these embodiments, the method or system need not extract the corresponding objects to rebuild these nets of interest in the physical design to further identify the connectivity information for the constraint checking. Rather, the connectivity information for all the objects belonging to these nets of interest has been identified at the time(s) when these objects were created in the physical design for the first time. Therefore, the method or system may perform constraint checks by using whatever information or data, which already exists in one or more design databases, without performing the processes of identifying a list of objects for a net, extracting the objects, and rebuilding the net for constraint checking purposes.

In some embodiments, the method or system allows a user to identify a smaller subset of constraints from one or more larger sets of constraints that may apply to an object in the design and applies only the smaller subset of constraints to the object during constraint checking without having to running through all the constraints in the one or more larger sets of constraints. In these embodiments, a user may overload the system by specifying which constraints to use, for example, at a given point in time on any object in the electronic design, and the method or system checks the object of interest against such specified constraints. In some embodiments, the process or module (216 or 336A) for determining whether a relevant constraint is satisfied may comprise the process or module 912 of filtering out one or more constraints that are unrelated to or undesired for the one or more interested objects or for one or more objects that reside outside the radius or range of influence.

In some embodiments, the process or module (216 or 336A) for determining whether a relevant constraint is satisfied may comprise the process or module 914 of determining whether the relevant constraint is satisfied based at least in part upon the one or more changes arising from the modification process by using, for example, the checker 118. In some embodiments, the process or module (216 or 336A) for determining whether a relevant constraint is satisfied may comprise the process or module 916 of transforming the determination results of 914 into a set of primitives. In some embodiments, the set of primitives may comprise, for example, one or more line segments, one or more types of arrowheads, certain texts, certain variables whose values may be determined by the one or more relevant constraints, one or more graphical symbols to indicate various types of violations or compliance, etc.

In some embodiments, the process or module (216 or 336A) for determining whether a relevant constraint is satisfied may comprise the process or module 918 of generating one or more indicators to display the compliance with or violation of the one or more relevant constraints. In some embodiments, the method or the system generates the one or more indicators by using at least the set of primitives. In these embodiments, the method or system constructs the one or more indicators by putting together one or more primitives according to what is to be displayed to identify compliance or violation. In some embodiments, the one or more indicators may comprise, for example but not limited to, one or more graphical symbols, one or more textual representations, or a combination thereof.

Figure 9A:
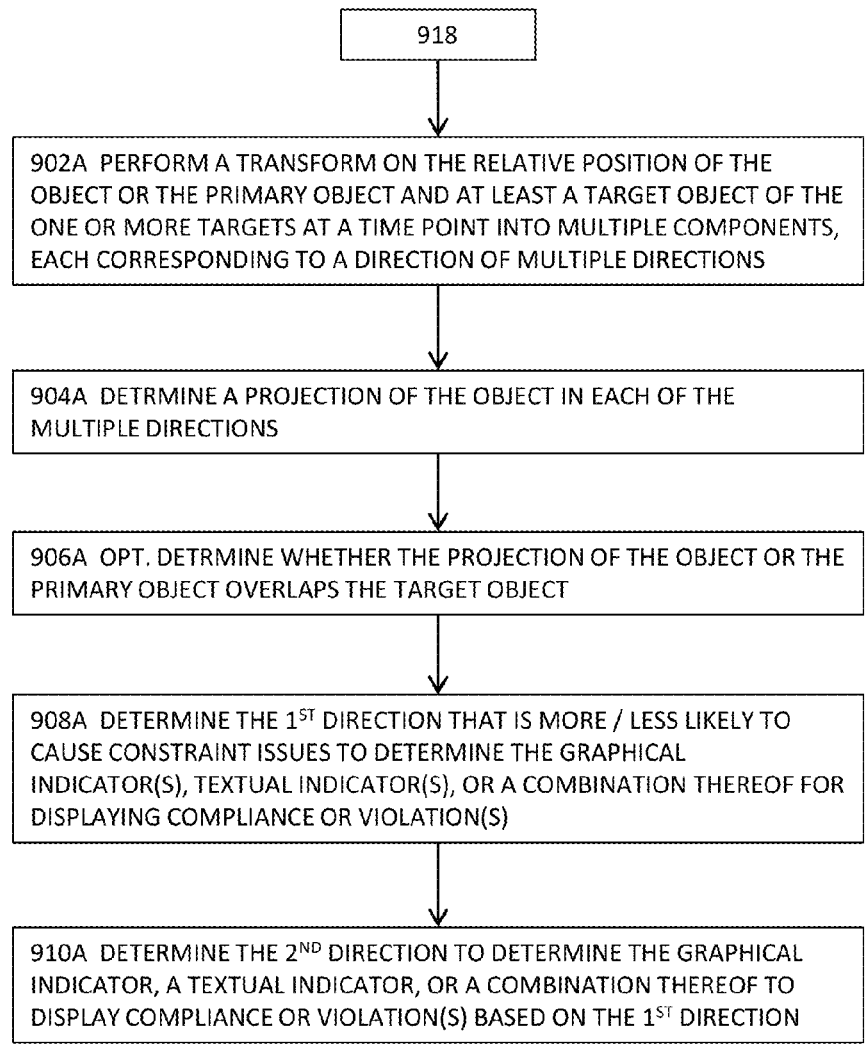
FIG. 9A illustrate more details about the process or module 918 illustrated in FIG. 9 in some embodiments.

FIG. 9A illustrate more details about the process or module 918 illustrated in FIG. 9 in some embodiments. In some embodiments, the process or module 918 for generating a graphical indicator, a textual indicator, or a combination thereof may comprise the respective process or module 902A of performing a transform on the relative position of the object or that of the primary object into multiple components, each of which corresponds to a direction of multiple directions at one or more time points. In some embodiments, the method or the system performs the transform on the relative position of the object or the primary object and each of the one or more target objects. The relative position of the object or the primary object is determined for the object in relation to at least one target of the one or more target objects.

In various embodiments, a position of an object may comprise a location of the object, an orientation or direction of the object, or a combination thereof. A relative position between a first object and a second object is thus determined by examining the relative orientation or relative location between the first object and the second object in some embodiments. A relative position between two objects may be determined by using, for example, a reference point (e.g., a geometric center or any point in the layout) or a reference direction (e.g., a horizontal direction or a vertical direction in a two-dimensional orthogonal coordinate system) in some embodiments. In some embodiments, the method or the system may capture a plurality of relative positions between the object and the at least one target or between the at least one primary object and the at least one target during the performance of the modification process by using the data capturing or acquisition process described with reference to FIG. 4.

In some embodiments, the process or module 918 for generating a graphical indicator, a textual indicator, or a combination thereof may comprise the respective process or module 904A of determining a projection of the object along each of the multiple directions. In some embodiments, the process or module 918 for generating a graphical indicator, a textual indicator, or a combination thereof may optionally comprise the respective process or module 906A of determining whether the projection of the object or that of the at least one primary object overlaps the at least one target object. In some embodiments, the process or module 918 for generating a graphical indicator, a textual indicator, or a combination thereof may comprise the respective process or module 908A of determining the first direction in which the object is more likely or less likely than in the other directions to cause a violation of a constraint to determine the graphical indicator(s), the textual indicator(s), or a combination thereof.

In some embodiments, the method or the system determines the first direction by using at least the projections of the object in each of the multiple directions and examines the proximity of each of the projections to the at least one target. In some embodiments, the process or module 918 for generating a graphical indicator, a textual indicator, or a combination thereof may comprise the respective process or module 910A of determining a second direction that is to be used to determine the graphical indicator(s), the textual indicator(s), or a combination thereof based at least in part upon the first direction.

Figure 9B:
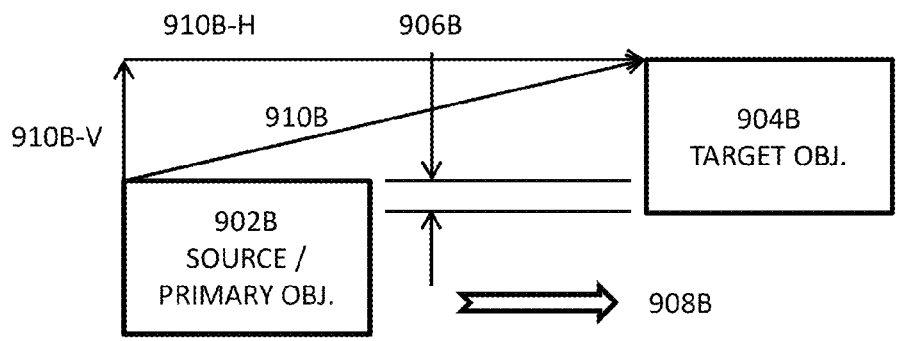
FIG. 9B illustrates an example of the process or module illustrated in FIG. 9.

FIG. 9B illustrates an example of the process or module illustrated in FIG. 9. It shall be noted that FIG. 9B illustrates a two-dimensional example in a Cartesian coordinate system for the ease of explanation and illustration. Nonetheless, FIG. 9B is not intended to limit the scope of various other embodiments that employ other types of coordinates with different dimensionality or to limit the scope of the claims, unless otherwise specifically recited in those claims. More specifically, FIG. 9B illustrates a target object 904B and a dynamic object or a primary object 902B (in embodiments including multiple scenarios), which is subject to a modification process, at a particular instant of time during a modification process to, for example, place the object 902B around the object 904B as indicated by the arrow 908B. In some embodiments including multiple targets 904B, the method or system may generate a scenario between the source or the primary object 902B and each of the target object 904B.

In this example, the horizontal edges of the object 902B and 904B are assumed to be aligned with the horizontal axis of an orthogonal coordinate system for the ease of explanation. The relative position between object 902B and object 904B is illustrated by 910B which uses the upper left-hand corner of each of the two objects 902B and 904B. The method or the system may determine the horizontal projection of the relative position 910B to be 910B-H and the vertical projection of the relative position 910B to be 910B-V. The method or the system may then determine the horizontal projection of the object 902B in the direction 910B-H and the vertical projection of the object 902B in the direction 910B-V and identifies or determines the overlap in the vertical direction as indicated by 906B.

As it may be seen from FIG. 9B, the method or the system may determine that the horizontal projection of the object 902B overlaps the object 904B. In some embodiments, the method or the system may then determine the first direction along which the object is more likely to cause a constraint violation to be the horizontal direction 910B-H due to the closer proximity of the projection of the object 902B to the object 904B. In these embodiments, the method or the system may then use the direction 910B-H as the second direction to generate the graphical indicator(s), the textual indicator(s), or a combination thereof. That is, the method or the system may take the first direction as the second direction in these embodiments.

In some other embodiments, the method or the system may determine the first direction along which the projection of the object 902B is less likely to cause a constraint violation to be the direction 910B-V due to the farther proximity of the projection of the object 902B in the direction 910B-V than that in the direction 910B-H. In these latter embodiments, the method or the system may then determine the second direction to be the direction that is orthogonal to the first direction (910B-V). That is, the method or the system may determine the second direction to be the direction 910B-H to generate the graphical indicator(s), the textual indicator(s), or a combination thereof.

Figure 9C:
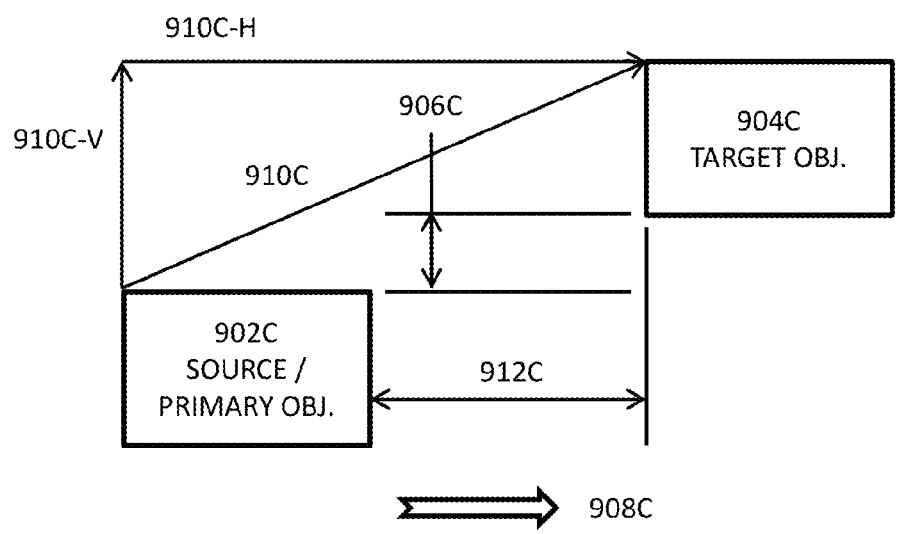
FIG. 9C illustrates another example of the process or module illustrated in FIG. 9.

FIG. 9C illustrates another example of the process or module illustrated in FIG. 9. It shall be noted that FIG. 9C illustrates a two-dimensional example in a Cartesian coordinate system for the ease of explanation and illustration. Nonetheless, FIG. 9C is not intended to limit the scope of various other embodiments that employ other types of coordinates with different dimensionality or to limit the scope of the claims, unless otherwise specifically recited in those claims. More specifically, FIG. 9C illustrates a target object 904C and a dynamic object or primary object (in some embodiments including multiple scenarios that comprise multiple sources, multiple targets, or a combination thereof) 902C, which is subject to a modification process as indicated by the arrow 908C, at a particular instant of time during a modification process to, for example, place the object 902C around the object 904C. In some embodiments including multiple targets 904C, the method or system may generate a scenario between the source or the primary object 902C and each of the target object 904C.

In this example, the horizontal edges of the object 902C and 904C are assumed to be aligned with the horizontal axis of an orthogonal coordinate system for the ease of explanation. The relative position between object 902C and object 904C is illustrated by 910C which uses the upper left-hand corner of each of the two objects 902C and 904C. The method or the system may determine the horizontal projection of the relative position 910C to be 910C-H and the vertical projection of the relative position 910C to be 910C-V. The method or the system may then determine the horizontal projection of the object 902C in the direction 910C-H and the vertical projection of the object 902C in the direction 910C-V. In this example illustrated in FIG. 9C, neither projections in the vertical direction and horizontal direction overlap the object 904C.

Furthermore, the horizontal projection of the object 902C along 901C-H maintains a distance (906C) between the horizontal projection and the object 904C without any overlap. The vertical projection of the object 904C along 910C-V maintains a distance (912C) between the vertical projection and object 904C without any overlap. In some embodiments, the method or the system may then determine the first direction along which the object is more likely to cause a constraint violation to be the horizontal direction 910C-H due to the closer proximity of the horizontal projection of the object 902C to the object 904C. In these embodiments, the method or the system may then use the direction 910C-H as the second direction to generate the graphical indicator(s), the textual indicator(s), or a combination thereof.

In some of these embodiments, the method or the system may determine the second direction as the direction that leaves more real estate space—the direction 910C-H as indicated by 912C. In some other embodiments, the method or the system may determine the first direction along which the projection of the object 902C is less likely to cause a constraint violation to be the direction 910C-V due to the farther proximity of the projection of the object 902C in the direction 910C-V as indicated by 912C than that in the direction 910C-H as indicated by 906C. In these latter embodiments, the method or the system may then determine the second direction to be the direction that is orthogonal to the first direction (910C-V) or as the direction that leaves less real estate space (the direction 910C-H). That is, the method or the system may determine the second direction to be the direction 910C-H to generate the graphical indicator(s), the textual indicator(s), or a combination thereof.

Figure 11:
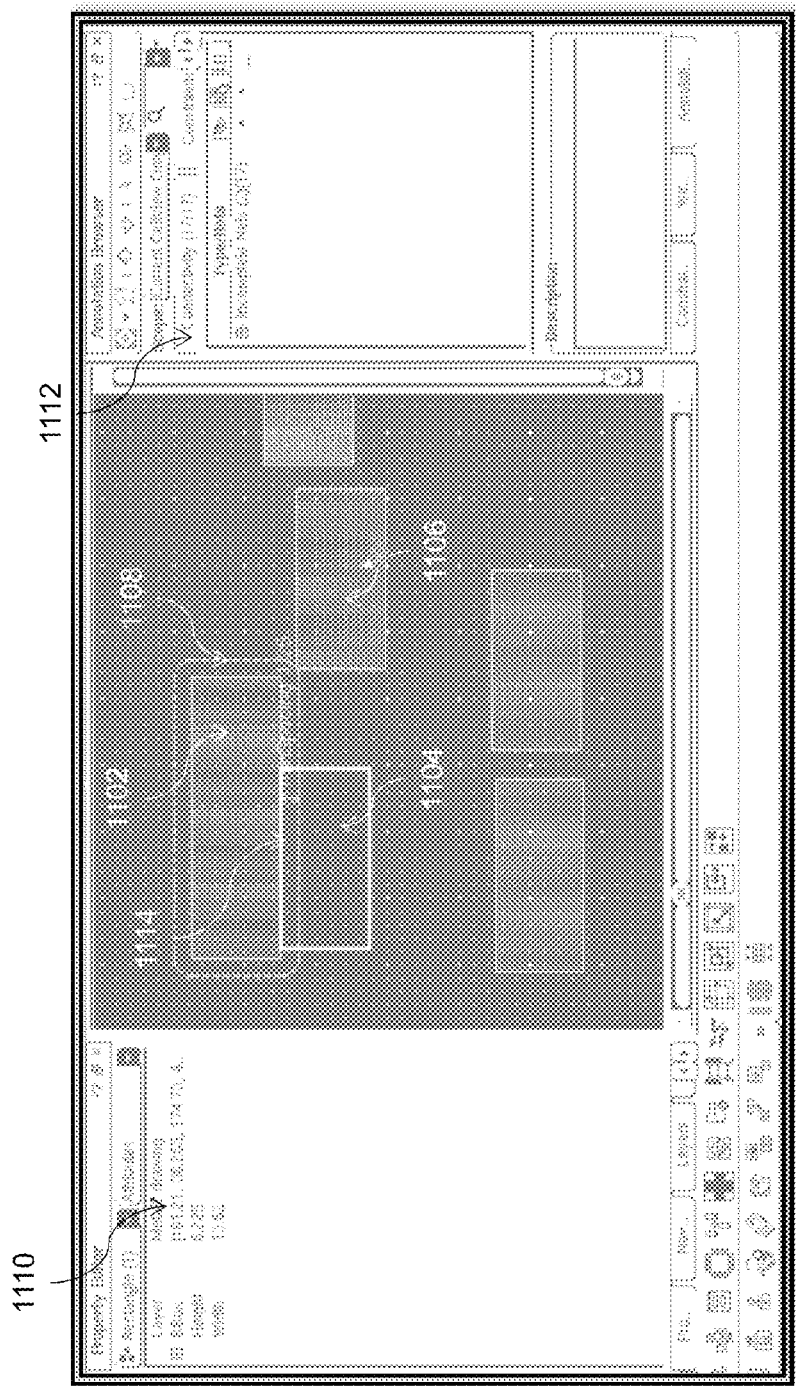
FIG. 11 illustrates an exemplary implementation of the method or a system for implementing a physical design of an electronic circuit with automatic snapping in some embodiments.

FIG. 11 illustrates an exemplary implementation of the method or a system for implementing a physical design of an electronic circuit with automatic snapping in some embodiments. It shall be noted that FIGS. 11-28 represent some exemplary implementations and are not intended to limit the scope of other embodiments or implementations or the scope of the claims by any means, unless any such information in these figures is otherwise specifically recited or disclosed in those other embodiments or implementations or one or more of the claims. FIG. 11 represents an exemplary layout view with a property editor 1110 for editing various properties (e.g., the layer on which an object resides, geometric properties of an object, etc.) of one or more objects (e.g., 1102, 1104, 1106) and a browser to browse through, for example, various nets, objects, etc. in the layout or in the current view window.

Moreover, FIG. 11 shows that a halo 1108 is drawn the object 1102 with some textual indications 1114 to show the requirements of a constraint. In this example, each corner of the halo 1108 is rounded, as opposed to a right-angled corner, to accurately indicate a single-valued spacing value for the object 1102. FIG. 11 also illustrates the snapping of object 1104 to the object 1102 so these two objects share a common edge, where the snapping may violate a spacing constraint as represented by the halo 1108 and the textual indication 1114. FIG. 11 further illustrates the snapping of the object 1106 to the halo 1108 of the object 1102 at the rounded corner to maintain the spacing constraint.

Figure 12:
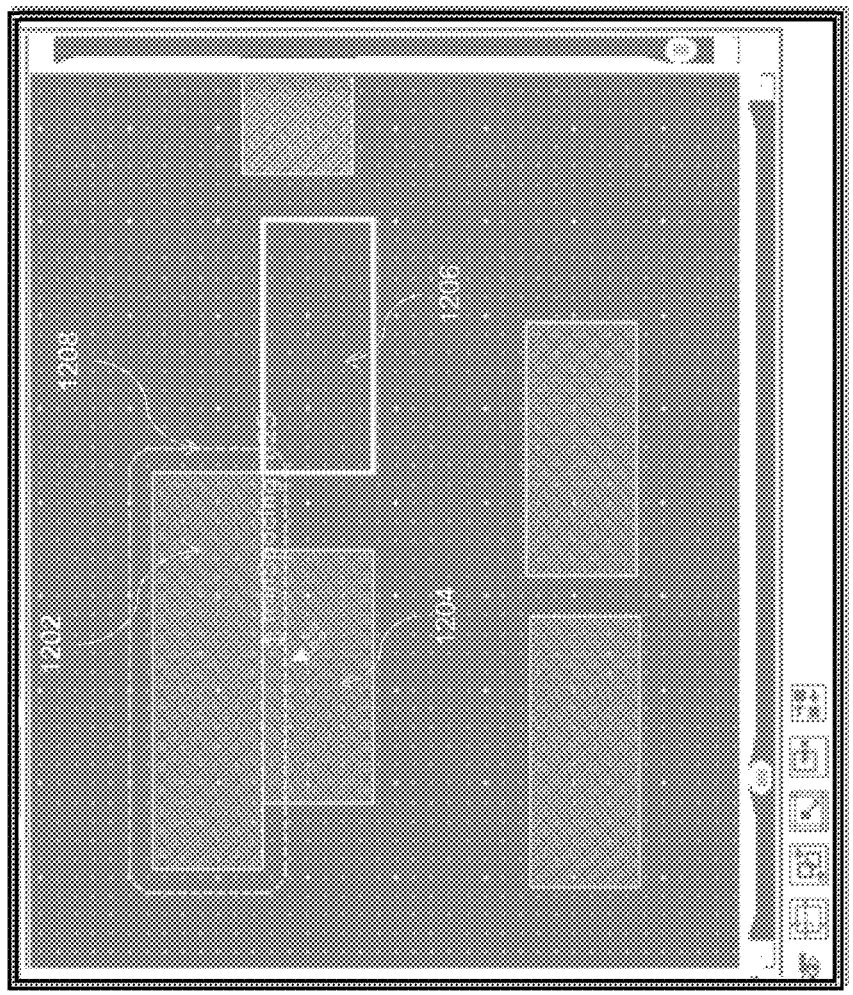
FIG. 12 illustrates an exemplary implementation of the method or a system for implementing a physical design of an electronic circuit with automatic snapping in some embodiments.

FIG. 12 illustrates an exemplary implementation of the method or a system for implementing a physical design of an electronic circuit with automatic snapping in some embodiments. Compared to FIG. 11, FIG. 12 illustrates that the object 1204 is snapped to a location that actually causes the object 1204 and the object 1202 to share a common edge. FIG. 12 further illustrates that the snapping of the object 1206 and the object 1202 where these two objects touch each other by the corner. If the object 1204 is not designed to be connected to the object 1202, the snapping of the object 1204 and the object 1202 by the edge causes a violation of a spacing constraint as indicated by the halo 1208 that is drawn the object 1202. In this example, the object 1202 constitutes a static object, and the objects 1204 and 1206 constitute dynamic objects that are subject to a modification process such as a placement process. In this example, the halo is drawn around the static object 1202. In addition, objects 1204 and 1206 may represent two options of snapping a single object, rather than actually snapping two separate objects to the object 1202.

Figure 13:
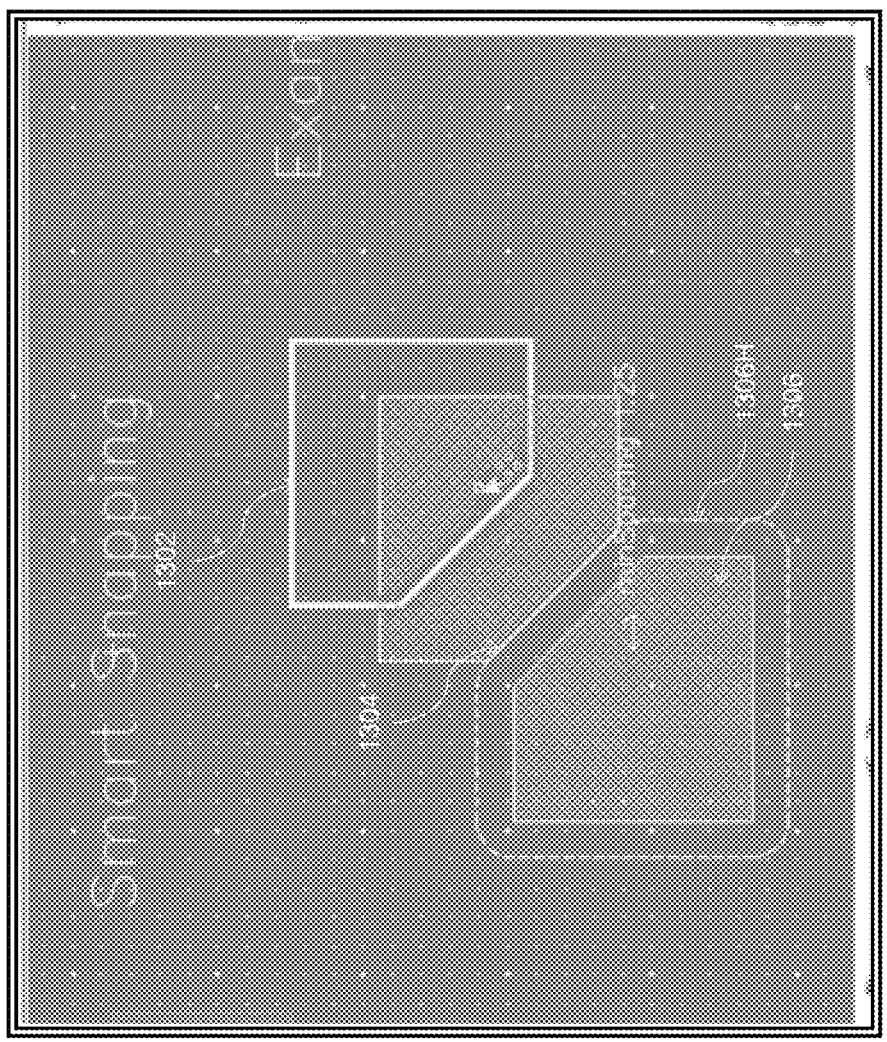
FIG. 13 illustrates an exemplary implementation of the method or a system for implementing a physical design of an electronic circuit with automatic snapping in some embodiments.

FIG. 13 illustrates an exemplary implementation of the method or a system for implementing a physical design of an electronic circuit with automatic snapping in some embodiments. FIG. 13 illustrates snapping the object 1302 to the halo 1306H of the object 1306 by a diagonal edge 1304. In this example, the object 1306 may represent a static object, and the object 1302 may represent a dynamic object that is subject to some modification process such as a placement process. Moreover, the halo 1306H is drawn around the static object 1306. Nonetheless, one or more halos may also be drawn around the dynamic object 1302 in some embodiments.

Figure 14:
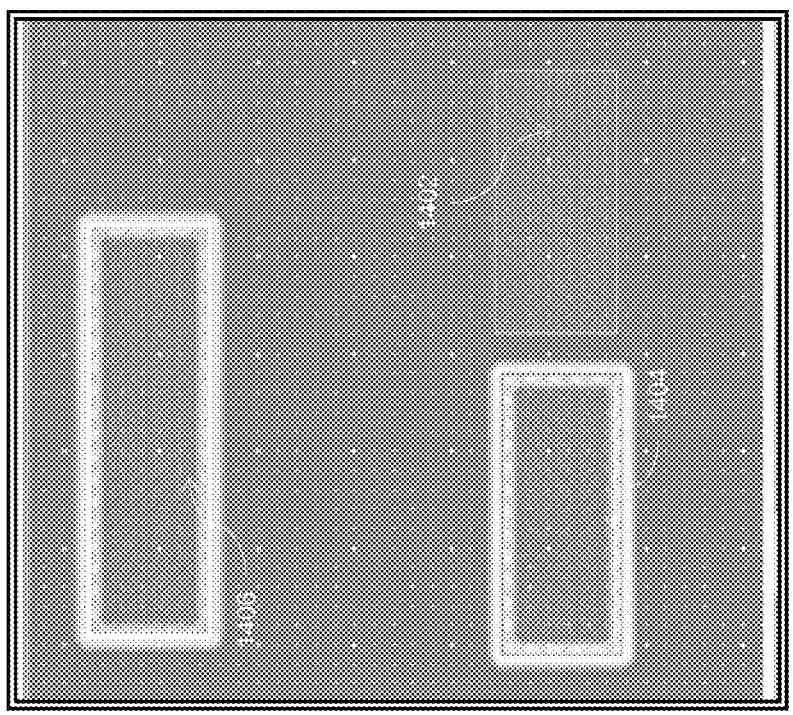
FIG. 14 illustrates an exemplary implementation of the method or a system for implementing a physical design of an electronic circuit with automatic snapping in some embodiments.

FIG. 14 illustrates an exemplary implementation of the method or a system for implementing a physical design of an electronic circuit with automatic snapping in some embodiments. More specifically, FIG. 14 illustrates the identification or designation of object 1406 and object 1404 as two target objects with highlighted edges to distinguish a target object from a general object 1402 such as a dynamic object.

Figure 15:
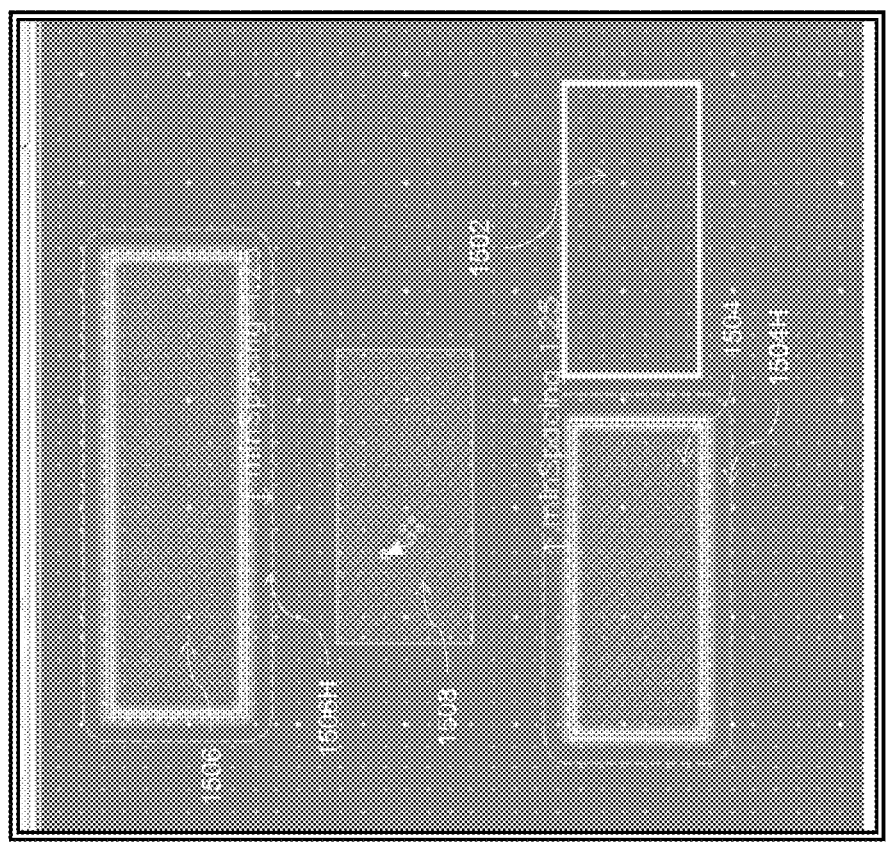
FIG. 15 illustrates an exemplary implementation of the method or a system for implementing a physical design of an electronic circuit with automatic snapping in some embodiments.

FIG. 15 illustrates an exemplary implementation of the method or a system for implementing a physical design of an electronic circuit with automatic snapping in some embodiments. FIG. 15 continues from FIG. 14 and illustrates a modification process that attempts to move the object from 1502 to 1508. The two static objects 1506 and 1504 are not subject to the modification process. These two objects 1504 and 1506 have been identified or designated as two target objects against which some spacing constraints apply. As the modification process moves the object from its first position 1502 to the second position 1504, the method or the system draws a first halo 1506H around the object 1506 to signify legal placement options outside of the area enclosed by the halo 1506. The first halo 1506H is also accompanied by some textual indications to provide the hint of the constraint value (in this example, 1.25 units for minimum spacing.) The method or system also draws a second halo 1504H around object 1504 with the textual indications to provide the hint of the constraint value (in this example, 1.25 units for the minimum spacing.) In embodiments where the governing constraint corresponds to multiple values rather than a single value, multiple halos may be shown around, for example, a target object.

Figure 16:
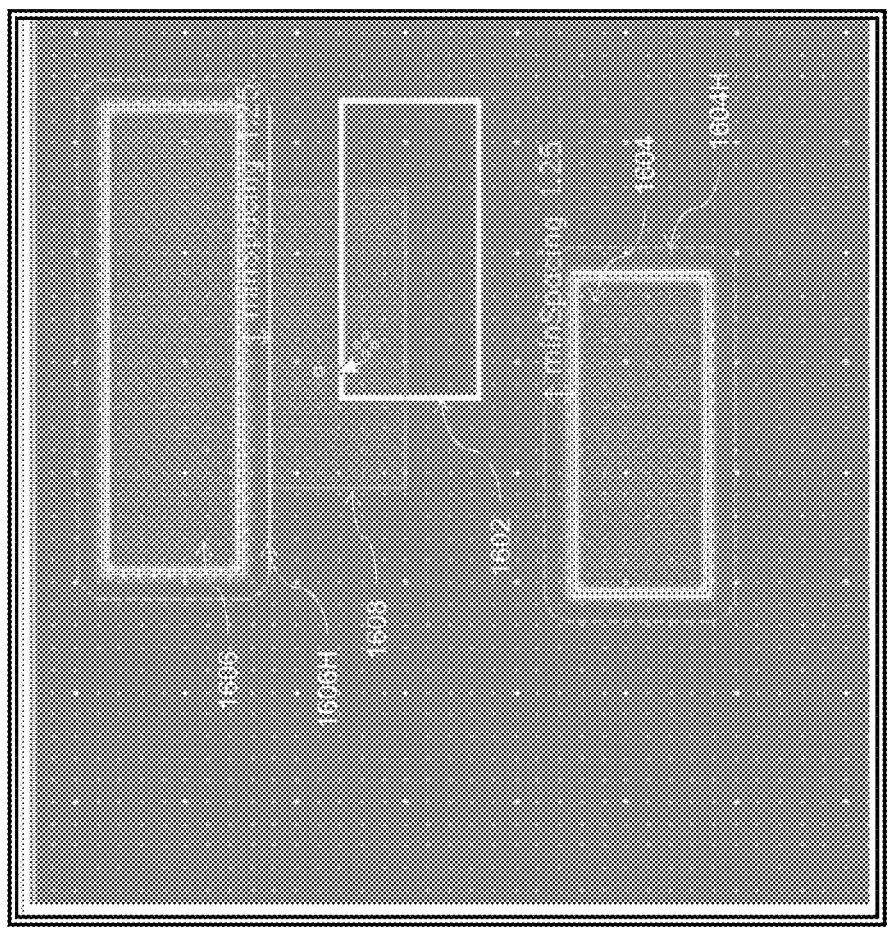
FIG. 16 illustrates an exemplary implementation of the method or a system for implementing a physical design of an electronic circuit with automatic snapping in some embodiments.

FIG. 16 illustrates an exemplary implementation of the method or a system for implementing a physical design of an electronic circuit with automatic snapping in some embodiments. More specifically, FIG. 16 illustrates two designated targets 1606 and 1064 with the respective halos 1606H and 1604H and textual indications that provide textual hint of constraint values. Object (1602) represents the dynamic object in this illustrated example that is subject to a modification attempting to move the object from the first position to the second position as indicated in 1602. The method or the system automatically snaps the object to the position as indicated in 1608 where the dynamic object is spaced apart from the target object 1606 at the minimum spacing. This automatic snapping of the dynamic object preserve the most real estate while satisfying the constraint.

Figure 17:
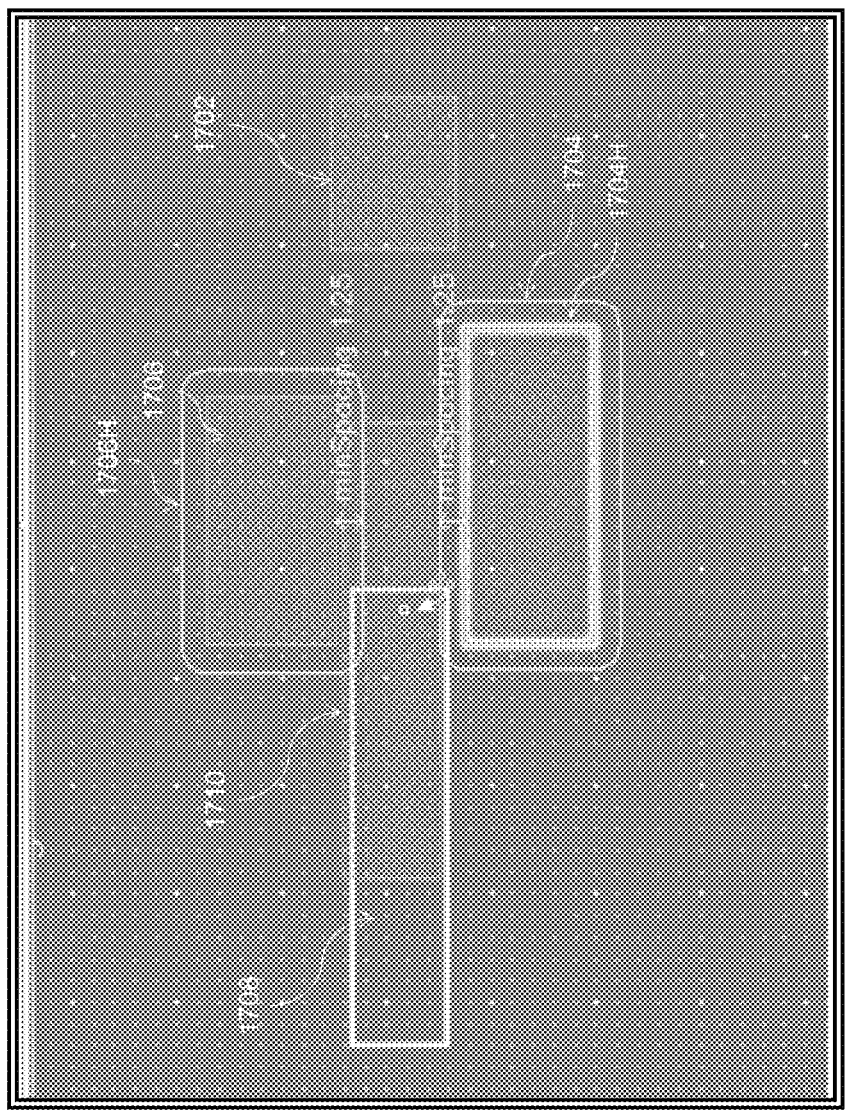
FIG. 17 illustrates an exemplary implementation of the method or a system for implementing a physical design of an electronic circuit with automatic snapping in some embodiments.

FIG. 17 illustrates an exemplary implementation of the method or a system for implementing a physical design of an electronic circuit with automatic snapping in some embodiments. FIG. 17 illustrates that the method or system may enforce one or more constraints for an object, even at the expense of other object(s). More specifically, object 1704 is designated or identified as a target object with highlighted edges and halo 1704H. The layout illustrated in FIG. 17 includes two additional static objects 1702 and 1704. It is noted that object 1702 is not or not yet associated with any halos. Static object 1706 is not designated as a target object but is already showing a halo 1706H because a modification process attempts to move the dynamic object from the first position as indicated in 1708. If the system is configured to enforce a constraint which requires that the an object, such as the dynamic object being moved from the position in 1708, be placed to enforce the constraint (e.g., a minimum spacing constraint in this example), the system may then snap the dynamic object to the second position as shown in 1710.

Nonetheless, the enforcement of the minimum spacing constraint between a target object 1704 and a dynamic object such as the one in position shown in 1710 comes at the expense of another static object 1706 because the placement of the dynamic object in the position 1710 causes a violation of the minimum spacing constraint for the static object 1706. Therefore, the method or system draws a halo 1706H around the object 1706. No halo has been drawn around the static object 1702 in this example. Nonetheless, if the modification continues to move the dynamic object toward the object 1702, the method or system may identify the relevant constraint(s) and draw one or more halos around object 1702 when the dynamic object is sufficiently close to object 1702.

Figure 18:
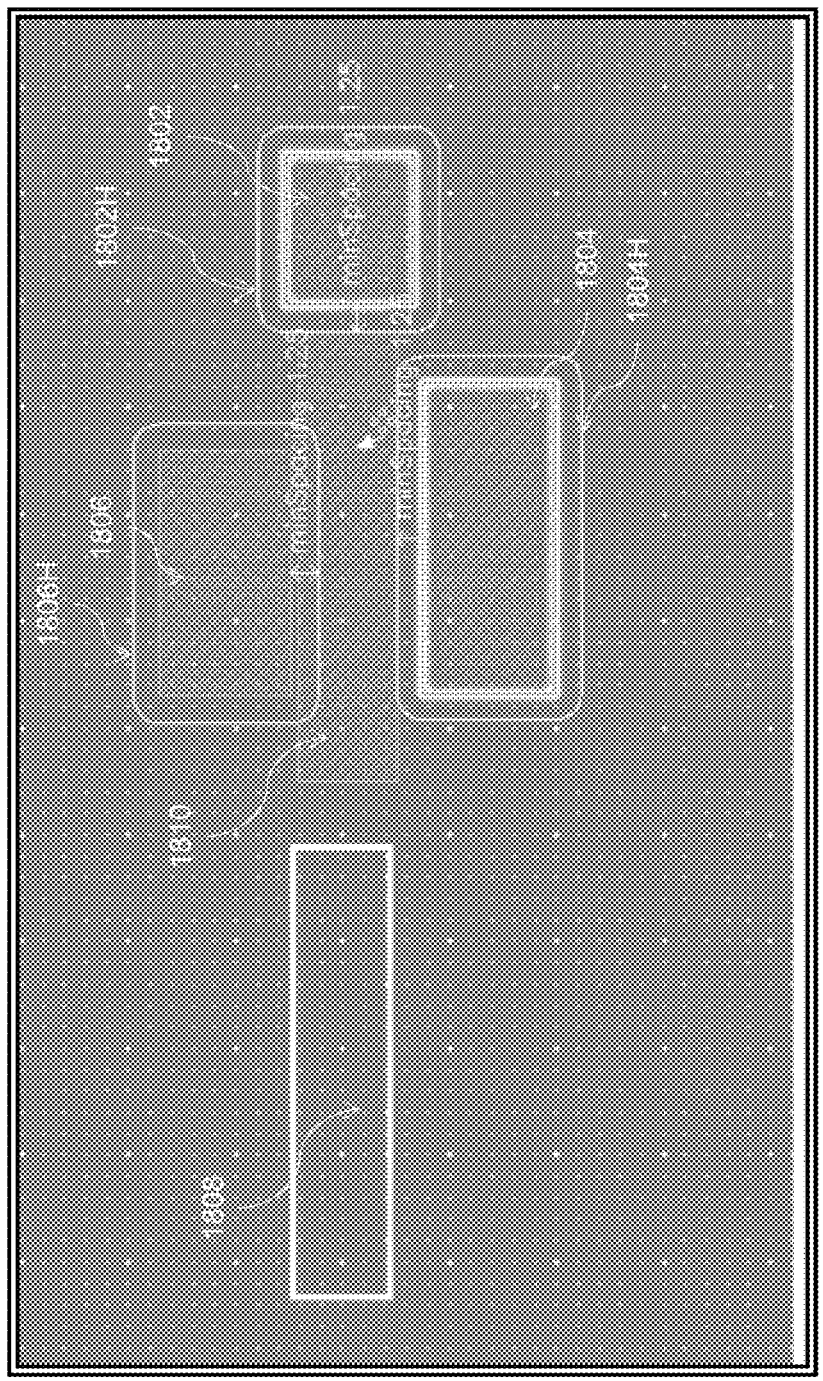
FIG. 18 illustrates an exemplary implementation of the method or a system for implementing a physical design of an electronic circuit with automatic snapping in some embodiments.

FIG. 18 illustrates an exemplary implementation of the method or a system for implementing a physical design of an electronic circuit with automatic snapping in some embodiments. More specifically, FIG. 18 continues from FIG. 17 and illustrates that in addition to object 1804, object 1802 is also designated as a target object, where halos 1804H and 1802H are respectively drawn around target object 1804 and target object 1802. In some embodiments, halos associated with one or more relevant constraints are shown when an object is designated as a target object. The other static object 1806, which is not designated as a target object, does not show highlighted edges as the target objects 1802 and 1804 do.

The method or system may perform a modification process that attempts to move a dynamic object from a first position as indicated in 1808. As disclosed in FIG. 7, the method or the system may identify an instruction to enforce the constraint that requires a dynamic object be snapped to a position that maintains the minimum spacing with target objects, the method may snap the dynamic object to the position 1808 where the bottom edge of the dynamic object coincides with the halo 1804H of the target object 1804 at the top edge of the halo 1804H, and the right edge of the dynamic object coincides with the left edge of the halo 1802H of the target object 1802. This enforcement of the aforementioned constraint then positions the dynamic object in the drop position indicated by 1810, although at the expense of the static object 1806 because the dynamic object actually causes a constraint violation as it may be seen that the dynamic object in position 1810 encroaches upon the area enclosed by the halo, which is established based on the minimum spacing constraint. Therefore, the method or the system also draws a halo 1806H around the object 1806 even though object 1806 is not identified or designated as a target object.

Figure 19:
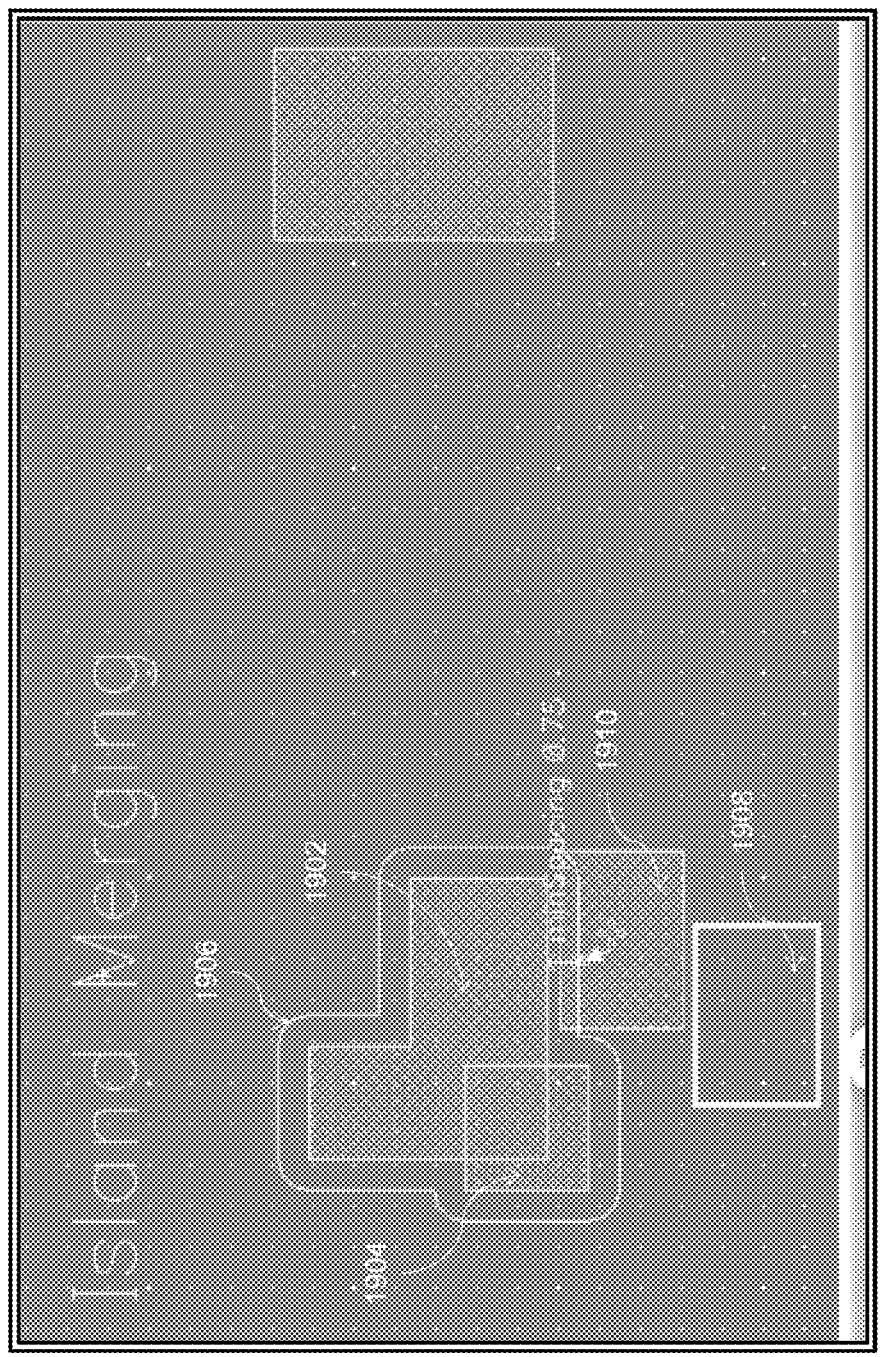
FIG. 19 illustrates an exemplary implementation of the method or a system for implementing a physical design of an electronic circuit with automatic snapping in some embodiments.

FIG. 19 illustrates an exemplary implementation of the method or a system for implementing a physical design of an electronic circuit with automatic snapping in some embodiments. More specifically, FIG. 19 illustrates that the method or the system may perform island merging on multiple objects, such as objects 1920 and 1904, and draw a unified halo around the merged object by showing the respective constraints of each object. In some embodiments, the method or the system performs the island merging process not to actually merge two objects together but to create a unified halo by performing a logical disjunction on the respective halos of these two objects to determine a unified halo. The dynamic object 1908 is subject to a modification process which attempts to move the dynamic object from the first position indicated by 1908 to a second position indicated by 1910. Nonetheless, the positioning of the dynamic object in the position indicated by 1910 creates an actual violation of the, for example, minimum spacing constraint, and the method or system thus show the unified halo around the objects 1902 and 1904. It shall be noted that the unified halo 1906 does not necessarily maintain an equal spacing to the actual boundaries of the objects 1902 and 1904. Rather, the method or the system determines the unified halo by using the respective constraint values.

Figure 20:
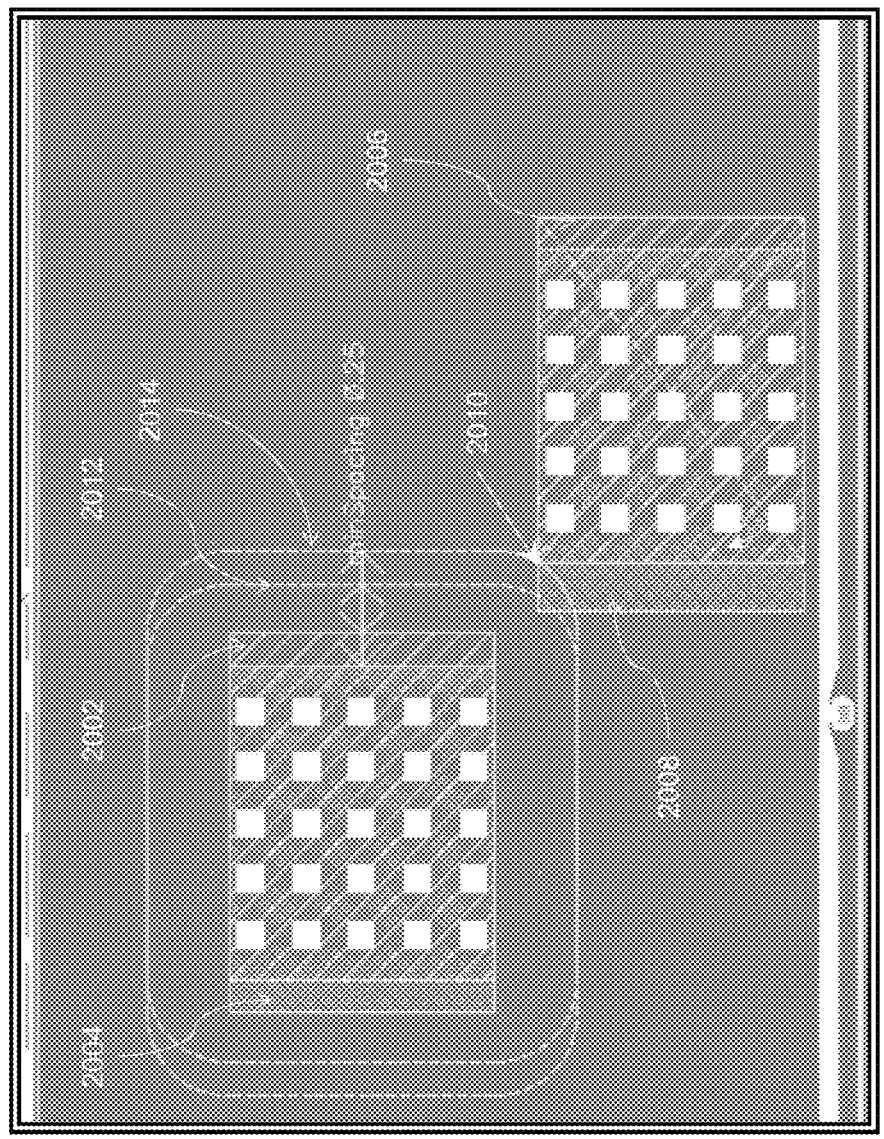
FIG. 20 illustrates an exemplary implementation of the method or a system for implementing a physical design of an electronic circuit with automatic snapping in some embodiments.

FIG. 20 illustrates an exemplary implementation of the method or a system for implementing a physical design of an electronic circuit with automatic snapping in some embodiments. More specifically, FIG. 20 illustrates an exemplary layer-to-layer snapping. The two sets of objects represents two cell instances. The first cell instance includes the objects shown in 2006 on the first layer and the objects shown in 2008 on the second layer. The first cell instance constitutes the dynamic instance that is subject to a modification process attempting to move the first cell instance.

In addition, the second cell instance includes the objects shown in 2002 on the first layer and the objects shown in 2004 on the second layer. The second cell instance constitutes the static instance that is not subject to a modification process. When the modification process attempts to move the first cell instance from the first position as shown by the space occupied by 2006 and 2008, the method or the system may position the first cell instance by snapping the set of objects on the first layer shown in 2006 to the rounded corner of the halo 2014 of the objects on the first layer shown in 2002. As it may be seen in FIG. 20, the snapping of 2006 to a rounded corner 2010 of the halo 2014 comes at the expense of the objects on the second layer (2004 and 2008) because the set of objects 2008 actually causes a violation of the minimum spacing constraint because the objects 2008 encroaches upon the area enclosed by the halo 2012 of the set of objects 2004.

Figure 21:
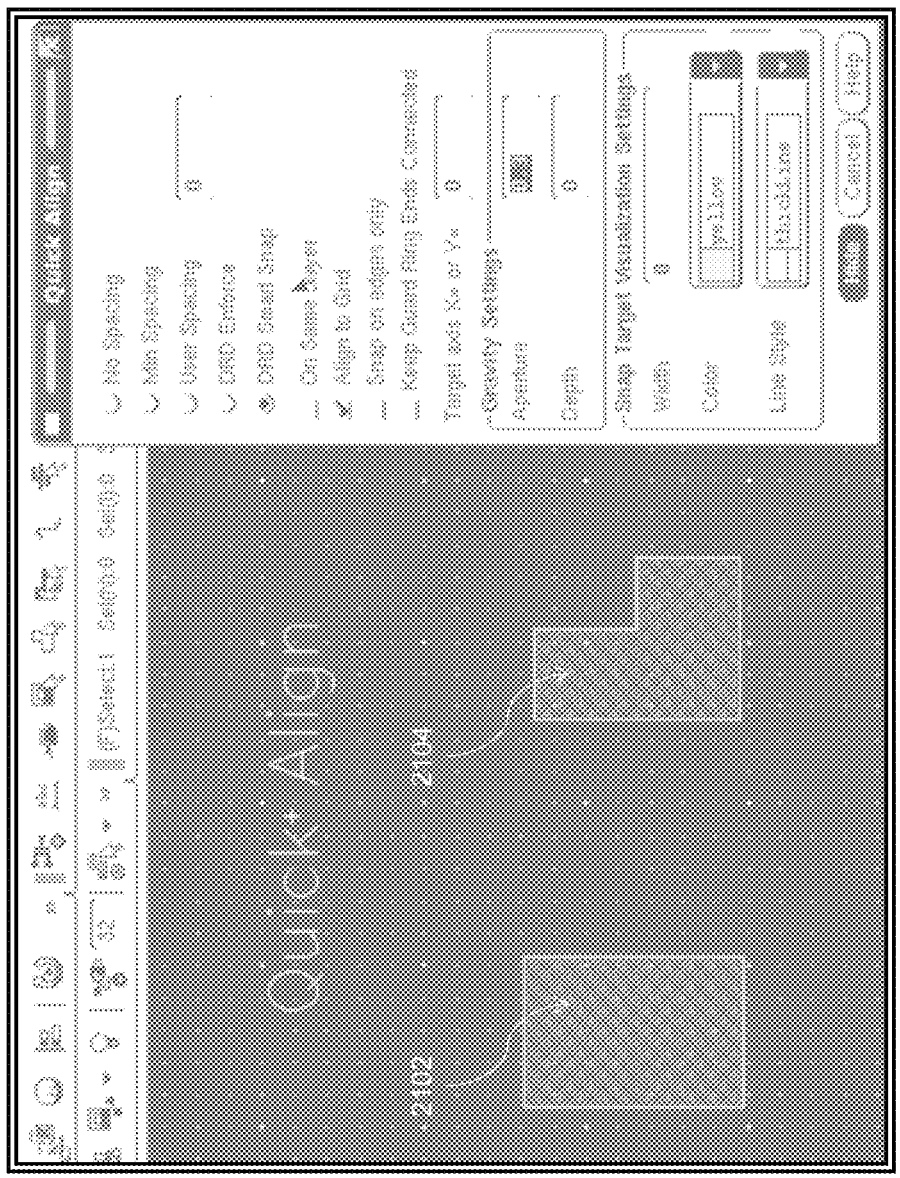
FIG. 21 illustrates an exemplary implementation of the method or a system for implementing a physical design of an electronic circuit with automatic snapping in some embodiments.

FIG. 21 illustrates an exemplary implementation of the method or a system for implementing a physical design of an electronic circuit with automatic snapping in some embodiments. More specifically, FIG. 21 illustrates an example where the method or system aligns a first edge of a first object 2102 with a second edge of a second object 2104.

Figure 22:
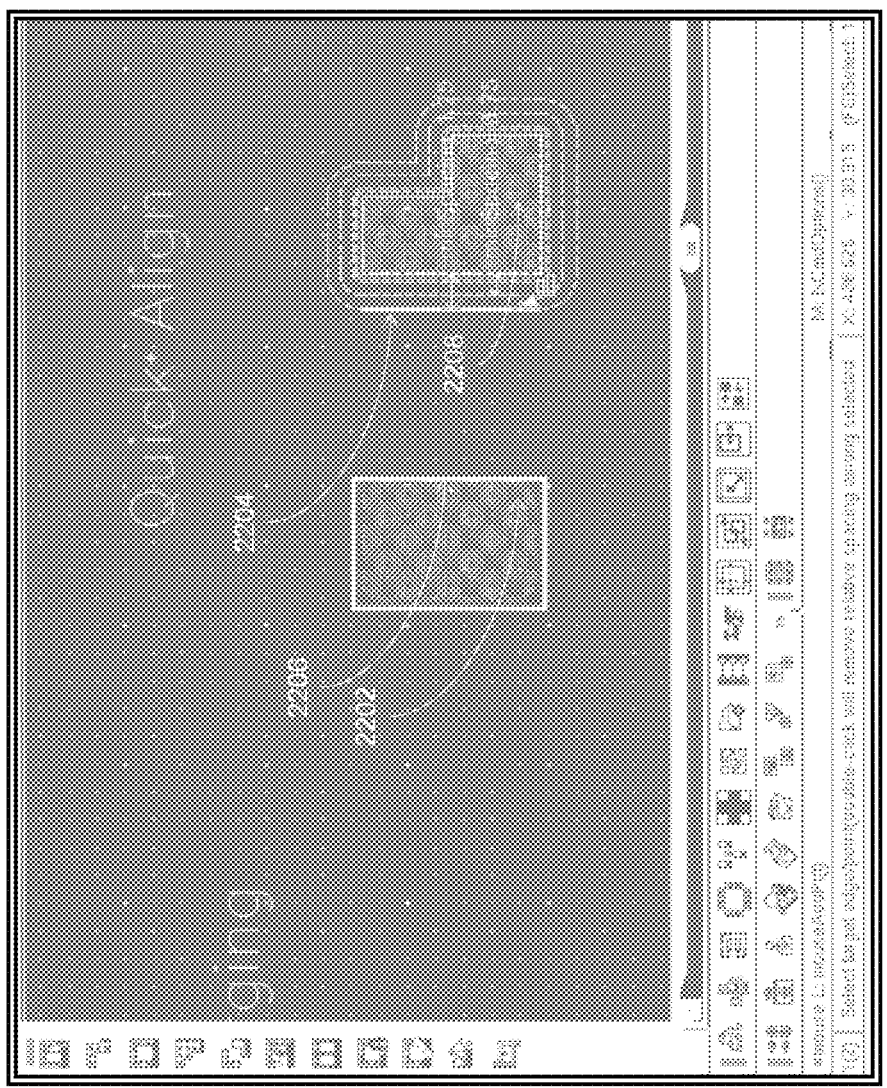
FIG. 22 illustrates an exemplary implementation of the method or a system for implementing a physical design of an electronic circuit with automatic snapping in some embodiments.

FIG. 22 illustrates an exemplary implementation of the method or a system for implementing a physical design of an electronic circuit with automatic snapping in some embodiments. FIG. 22 continues from FIG. 21. The method or system first identifies the second object 2208 as a target object and the first object 2202 as a dynamic object. FIG. 22 also illustrates that the method or system freezes multiple halos as indicated by the boundaries with dashed lines for the target object 2208. The method or system in this example identifies the edge 2206 of the first object 2202 as the source edge and the edge 2204 of a of one halo of the multiple halos of the second object 2208 as the target object for alignment purposes.

Figure 23:
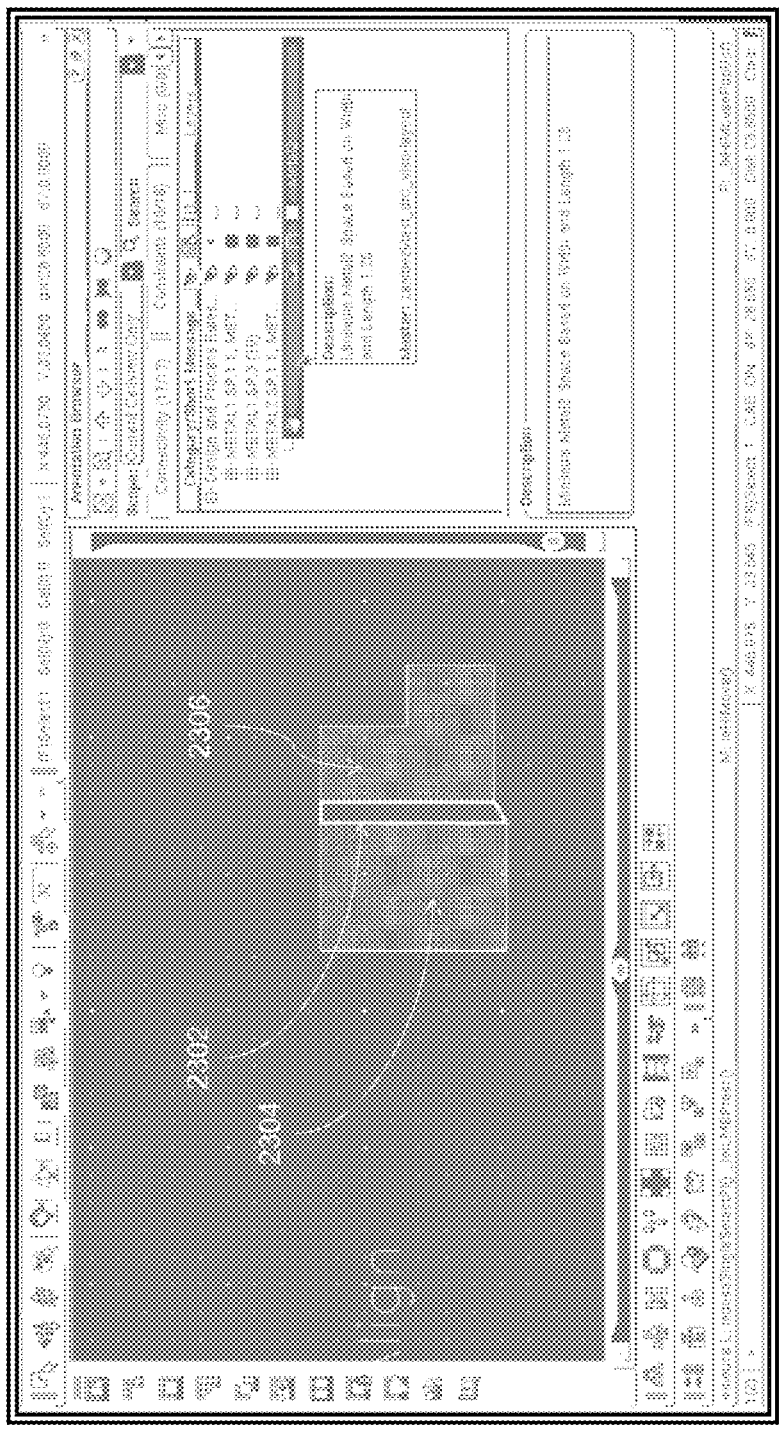
FIG. 23 illustrates an exemplary implementation of the method or a system for implementing a physical design of an electronic circuit with automatic snapping in some embodiments.

FIG. 23 illustrates an exemplary implementation of the method or a system for implementing a physical design of an electronic circuit with automatic snapping in some embodiments. FIG. 23 continues from FIG. 22 and illustrates that the dynamic object 2304 is aligned with or snapped to the target edge (2204 in FIG. 22) of the target object 2306. FIG. 23 further illustrates a spacer marker 2302 to indicate that a same-mask rule (which specifies, for example, the minimum spacing requirement between two objects that may be printed with a single mask.)

Figure 24:
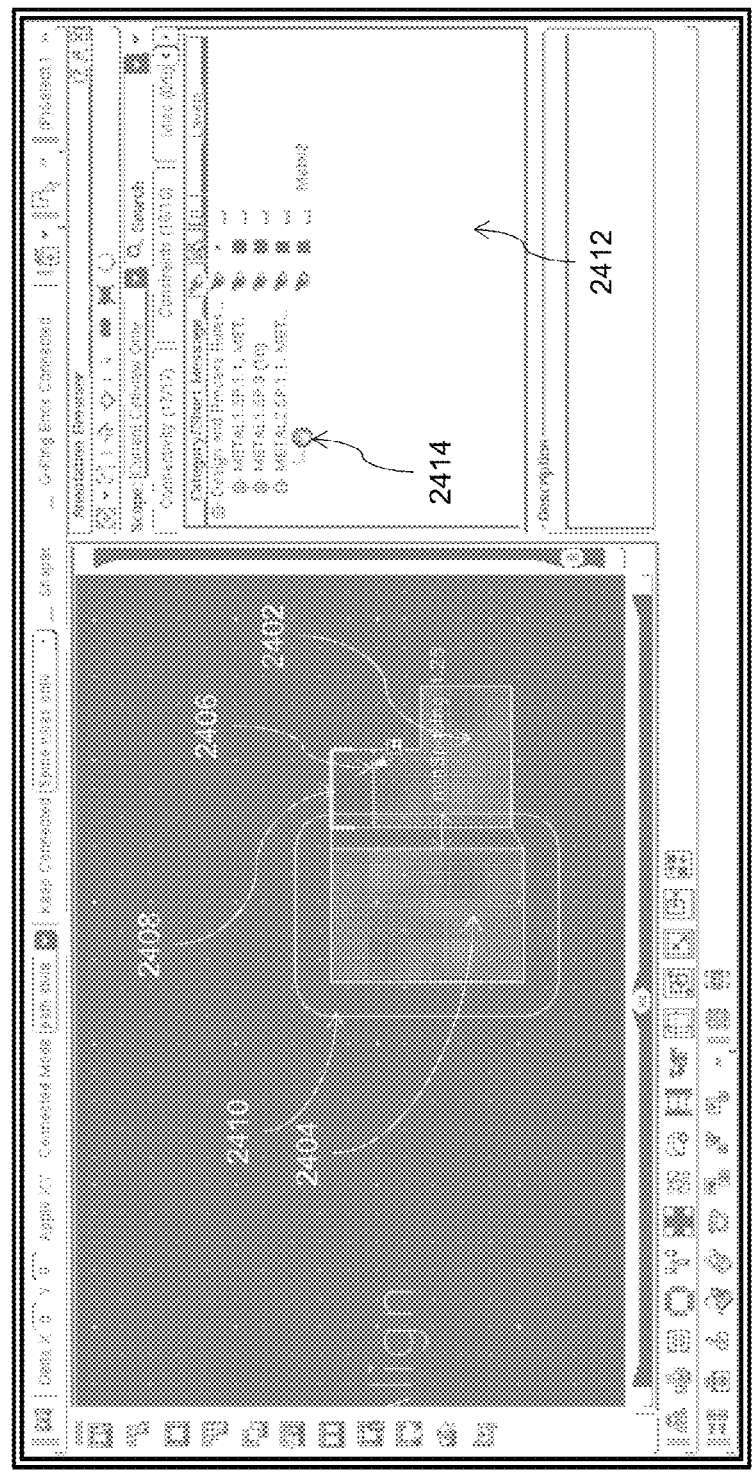
FIG. 24 illustrates an exemplary implementation of the method or a system for implementing a physical design of an electronic circuit with automatic snapping in some embodiments.

FIG. 24 illustrates an exemplary implementation of the method or a system for implementing a physical design of an electronic circuit with automatic snapping in some embodiments. FIG. 24 illustrates the post-editing capability of the method or system in some embodiments. More specifically, FIG. 24 illustrates that the first object 2404 with a halo 2410 indicating a minimum spacing constraint and the second object 2402 are positioned as shown, and that the minimum spacing constraint is violated as the second object 2402 encroaches upon the area enclosed by the halo 2410 of the first object 2404. The spacing constraint as indicated comprises a multi-valued constraint in which the minimum spacing requirement varies with the parallel run-length between the first object 2404 and the second object 2402.

FIG. 24 further illustrates that the second object 2402 originally includes a top edge 2408, and that the method or system selects the adjusts the top edge to the new position 2406. In this example illustrated in FIG. 24, the adjustment of the top edge of the second object 2402 from 2408 to 2406 is not sufficient to cure the violation of the minimum spacing constraint because the second object 2402 still encroaches upon the area enclosed by the halo 2410 of the first object 2404. FIG. 24 further illustrates a browser area 2412 that also includes more textual and graphical information 2414 to indicate the violation of the minimum spacing constraint.

Figure 25:
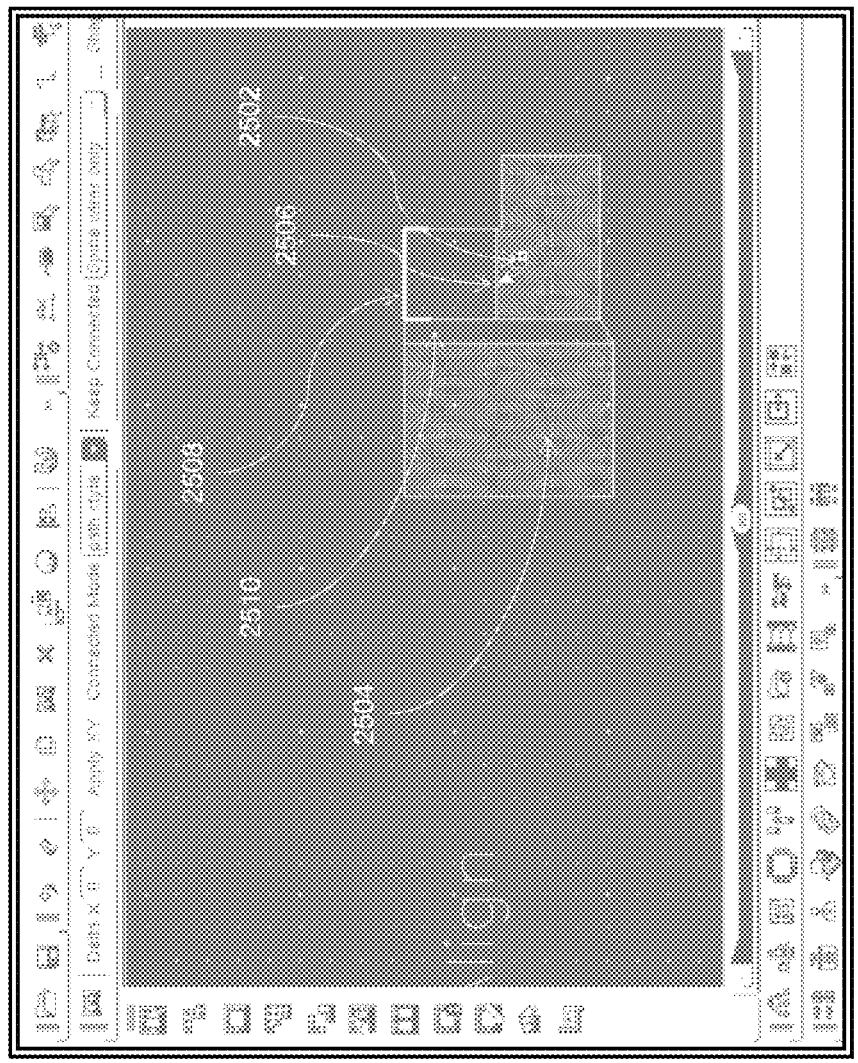
FIG. 25 illustrates an exemplary implementation of the method or a system for implementing a physical design of an electronic circuit with automatic snapping in some embodiments.

FIG. 25 illustrates an exemplary implementation of the method or a system for implementing a physical design of an electronic circuit with automatic snapping in some embodiments. FIG. 25 continues from FIG. 24. In this example, the method or system further adjusts the top edge of the second object 2502 from 2508 to 2506. After the adjustment, the halo 2410 illustrated in FIG. 24 is no longer shown in the layout window. In this example, the absence of the halo around the first object 2504 indicates that the minimum spacing constraint is satisfied with the positioning of the first object 2504 and the second object 2502 with the adjustment to the object of the second object 2502. FIG. 25 further demonstrates the ability of the method or system to consider multi-valued constraints in some embodiments. In this example, the minimum spacing constraint varies with the parallel run-length between the first object 2504 and the second object 2502. Nonetheless, FIG. 25 illustrates the spacer marker 2510 which indicates that the same-mask rule or constraint, which imposes a minimum spacing requirement between two objects if these two objects are to be printed with the same mask, is violated with the current positioning of the first object 2504 and the second object 2502.

Figure 26:
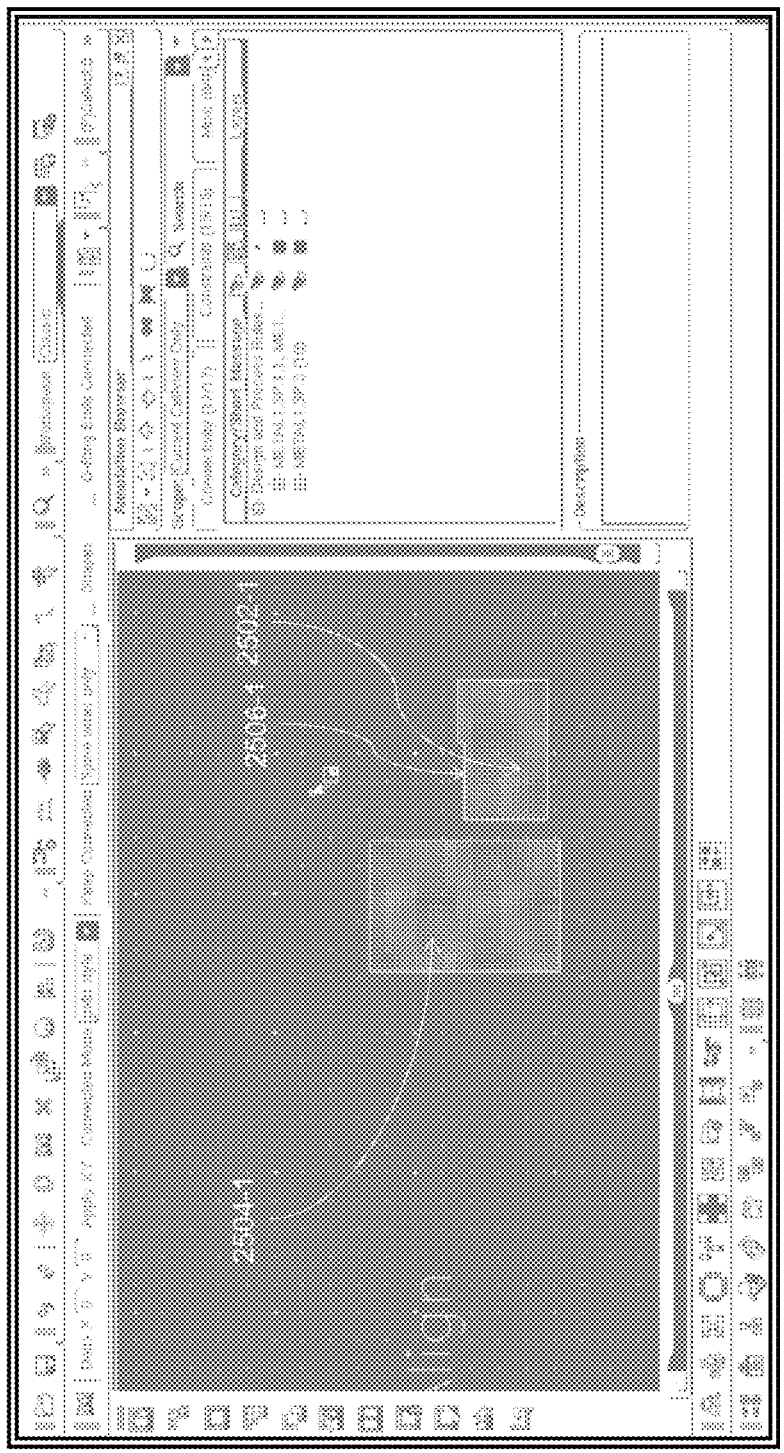
FIG. 26 illustrates an exemplary implementation of the method or a system for implementing a physical design of an electronic circuit with automatic snapping in some embodiments.

FIG. 26 illustrates an exemplary implementation of the method or a system for implementing a physical design of an electronic circuit with automatic snapping in some embodiments. FIG. 26 continues from FIG. 25 and illustrates the further adjustment of the top edge 2506-1 of the second object 2502-1 in some embodiments. This further adjustment reduces the parallel run-length between the first object 2504-1 and the second object 2502-1. This reduction in the parallel run-length also reduces the minimum spacing requirement between these two objects. In this example illustrated in FIG. 26, the same mask constraint violation is cured due to the reduction of the minimum spacing requirement due to the reduction of the parallel run-length by the adjustment of the object of the second object 2502-1.

Figure 26A:
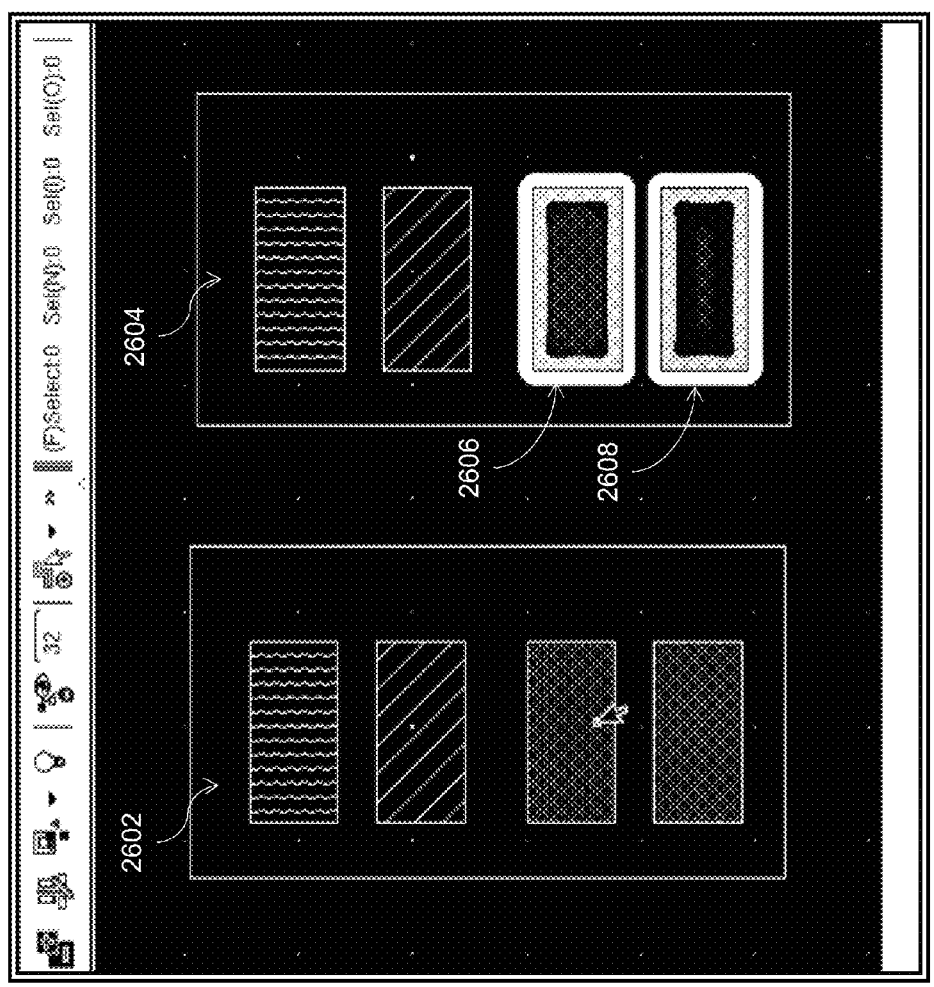
FIG. 26A illustrates an exemplary implementation of the method or a system for implementing a physical design of an electronic circuit with automatic snapping in some embodiments.

FIG. 26A illustrates an exemplary implementation of the method or a system for implementing a physical design of an electronic circuit with automatic snapping in some embodiments. More specifically, FIG. 26A illustrates two identical cell instances 2602 and 2604 in a layout window. Moreover, FIG. 26A illustrates that the method or the system may identify or designate or may allow the designer to identify or designate any individual object in a cell instance as a target object. In this example illustrated in FIG. 26A, object 2606 and object 2608 are identified or designated as target objects in some embodiments. In some other embodiments, the method or the system may identify or designate or may allow the designer to identify or designate the entire cell instance (e.g., 2602 or 2604) as a target object.

Figure 27:
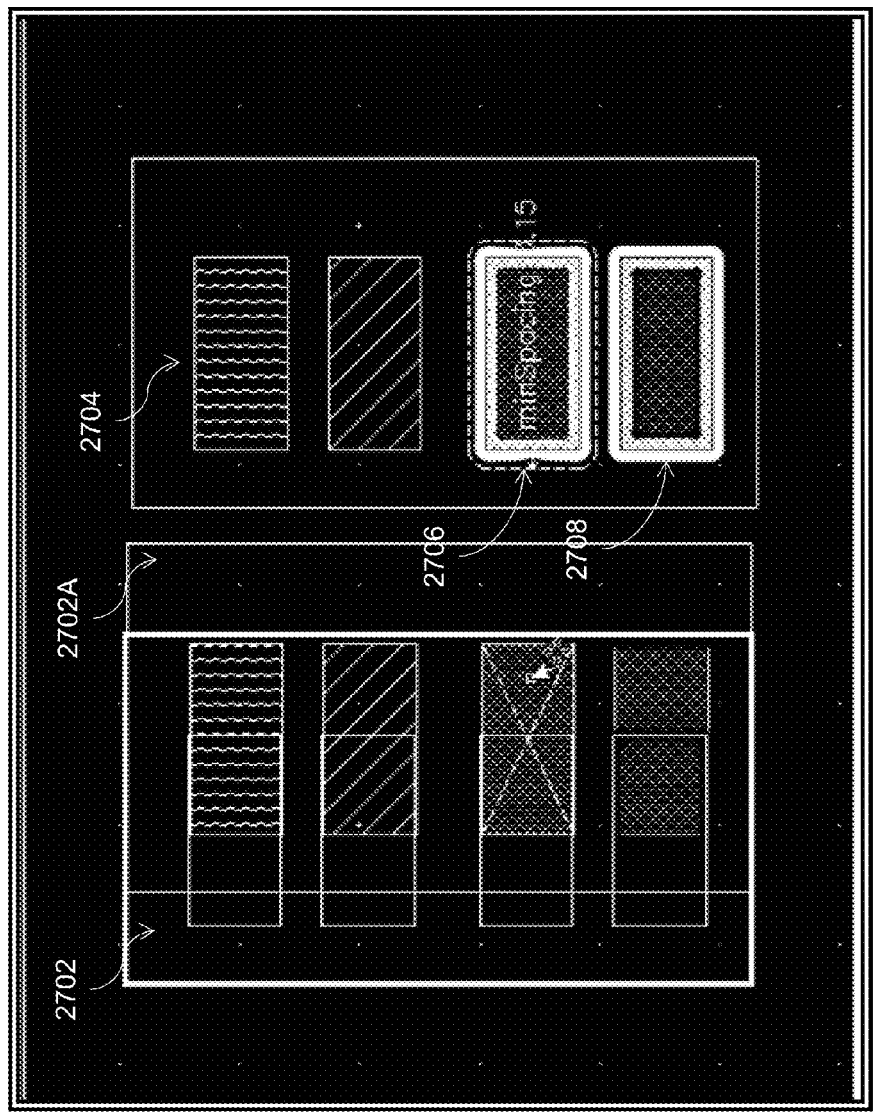
FIG. 27 illustrates an exemplary implementation of the method or a system for implementing a physical design of an electronic circuit with automatic snapping in some embodiments.

FIG. 27 illustrates an exemplary implementation of the method or a system for implementing a physical design of an electronic circuit with automatic snapping in some embodiments. FIG. 27 continues from FIG. 26 and illustrates two identical cell instances 2702 and 2704. FIG. 27 further illustrates that the method or the system identifies or designates or allows the designer to identify or designate object 2706 and object 2708 as two target objects as indicated by the highlighted edges of these two objects. In this example, object 2706 has been identified or designated as a primary object. In addition, FIG. 27 further illustrates that the method or the system has frozen the halo around object 2706 to indicate that object 2706 serves as a primary object and a tie-breaker in a situation where the two target objects, 2706 and 2708, compete for the satisfaction of their respective constraint(s) in some embodiments including multiple scenarios that comprises multiple targets, multiple sources, or a combination thereof. In some of these embodiments, the method or system generates at least one scenario for each target. Moreover, FIG. 27 illustrates the method or system identifies or selects the entire instance 2702 as a dynamic object and performs a modification process to move instance 2702 to a second position (2702A). In this example, the method or system may snap one cell instance (e.g., 2702) to another cell instance (e.g., 2704) in some embodiments.

Figure 28:
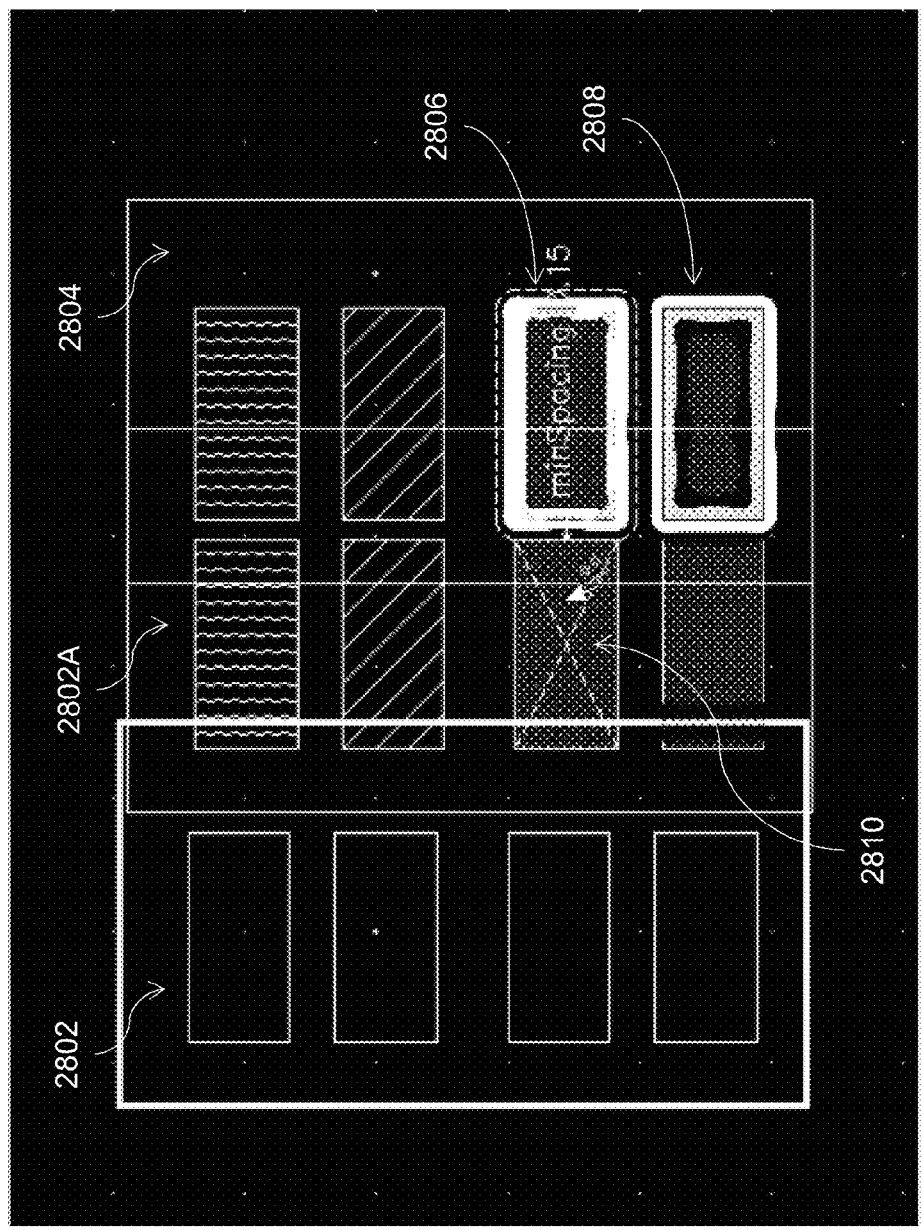
FIG. 28 illustrates a computerized system on which a method for implementing a physical design of an electronic circuit with automatic snapping can be implemented.

FIG. 28 illustrates an exemplary implementation of the method or a system for implementing a physical design of an electronic circuit with automatic snapping in some embodiments. FIG. 28 continues from FIG. 27 and illustrates two identical cell instances 2802 and 2804. FIG. 28 further illustrates that the method or system identifies or designates or allows the designer to identify or designate object 2806 and 2808 as two target objects as indicated by the highlighted edges around object 2806 and 2808. Of the two target objects 2806 and 2808, object 2806 has been identified or designated as a primary object as indicated by the halo, which has been frozen by the method or system to stay permanently in the layout window to provide visual aids for one or more constraints that may be associated with or applied to object 2806. In addition, FIG. 28 illustrates that the method or system snaps the instance 2802 (as indicated by 2802A after snapping) to the instance 2804 by snapping the object 2810, which corresponds to the primary object 2806, to the halo of the primary object 2806 both to preserve the utilization of real estate in the layout and to maintain compliance with the controlling constraint (the minimum spacing constraint in this example).

System Architecture Overview

Figure 10:
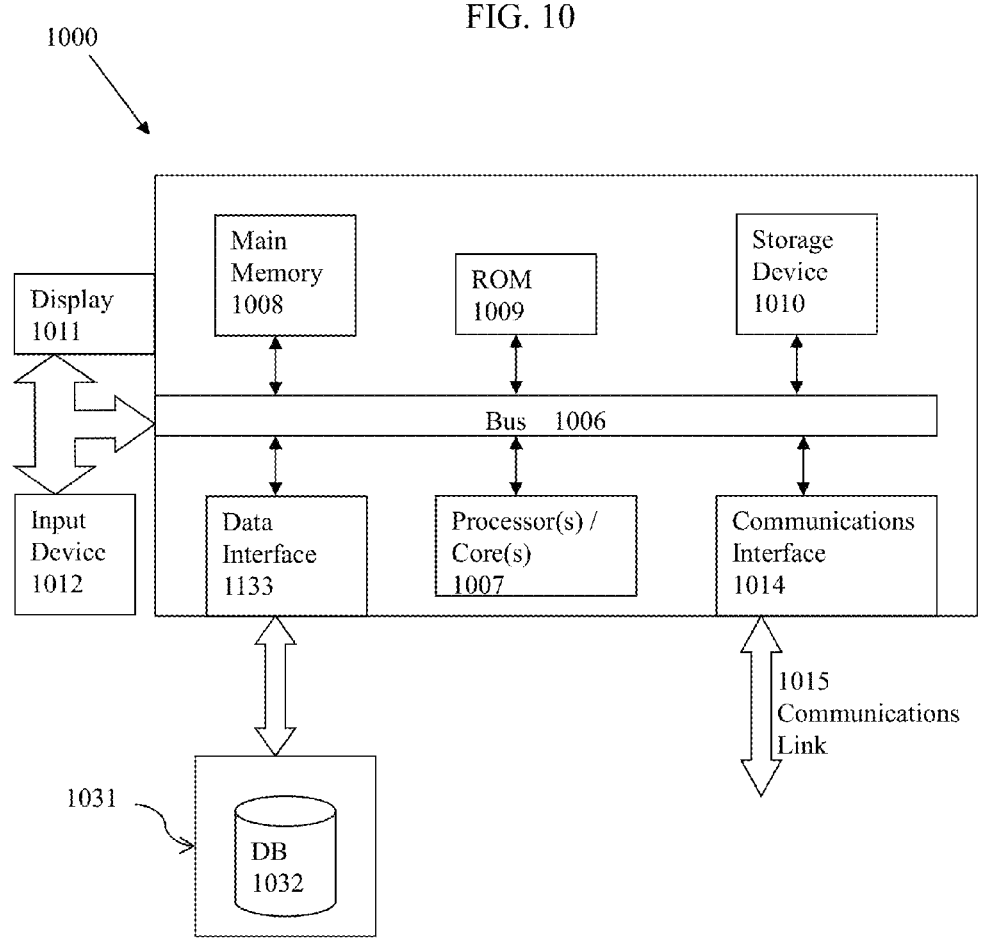
FIG. 10 illustrates a high level flow diagram for evaluating layout dependent effects in an electronic design by using multi-scenario physically-aware design methodology in some embodiments.

FIG. 10 illustrates a block diagram of an illustrative computing system 1000 suitable for implementing some embodiments of the method or system for implementing electronic circuit designs with electro-migration awareness as described in the preceding paragraphs with reference to various figures. Computer system 1000 includes a bus 1006 or other communication mechanism for communicating information, which interconnects subsystems and devices, such as processor 1007, system memory 1008 (e.g., RAM), static storage device 1009 (e.g., ROM), disk drive 1010 (e.g., magnetic or optical), communication interface 1014 (e.g., modem or Ethernet card), display 1011 (e.g., CRT or LCD), input device 1012 (e.g., keyboard), and cursor control (not shown).

According to one embodiment, computer system 1000 performs specific operations by one or more processor or processor cores 1007 executing one or more sequences of one or more instructions contained in system memory 1008. Such instructions may be read into system memory 1008 from another computer readable/usable storage medium, such as static storage device 1009 or disk drive 1010. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

Various actions or processes as described in the preceding paragraphs may be performed by using one or more processors, one or more processor cores, or combination thereof 1007, where the one or more processors, one or more processor cores, or combination thereof executes one or more threads. For example, the act of specifying various net or terminal sets or the act or module of performing verification or simulation, etc. may be performed by one or more processors, one or more processor cores, or combination thereof. In one embodiment, the parasitic extraction, current solving, current density computation and current or current density verification is done in memory as layout objects or nets are created or modified.

The term "computer readable storage medium" or "computer usable storage medium" as used herein refers to any medium that participates in providing instructions to processor 1007 for execution. Such a medium may take many forms, including but not limited to, non-volatile media and volatile media. Non-volatile media includes, for example, optical or magnetic disks, such as disk drive 1010. Volatile media includes dynamic memory, such as system memory 1008.

Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), magnetic tape, any other magnetic or magneto-optical medium, CD-ROM, any other optical medium, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1000. According to other embodiments of the invention, two or more computer systems 1000 coupled by communication link 1015 (e.g., LAN, PTSN, or wireless network) may perform the sequence of instructions required to practice the invention in coordination with one another.

Computer system 1000 may transmit and receive messages, data, and instructions, including program, i.e., application code, through communication link 1015 and communication interface 1014. Received program code may be executed by processor 1007 as it is received, and/or stored in disk drive 1010, or other non-volatile storage for later execution. In an embodiment, the computer system 1000 operates in conjunction with a data storage system 1031, e.g., a data storage system 1031 that contains a database 1032 that is readily accessible by the computer system 1000. The computer system 1000 communicates with the data storage system 1031 through a data interface 1033. A data interface 1033, which is coupled to the bus 1006, transmits and receives electrical, electromagnetic or optical signals that include data streams representing various types of signal information, e.g., instructions, messages and data. In embodiments of the invention, the functions of the data interface 1033 may be performed by the communication interface 1014.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

We claim:

1. A computer implemented method for implementing a physical design of an electronic circuit with automatic snapping, comprising:
   using at least one processor or at least one processor core to perform a process the process comprising:
   identifying a first object in a layout for a modification process that is to modify the first object in the layout;
   identifying a first set of one or more constraints for the first object;
   identifying a first approximate position of the first object in the layout;
   determining a drop position for the first object in the layout based at least in part upon the first approximate position and one or more relevant constraints in the first set of one or more constraints; and
   determining whether or not the one or more relevant constraints are satisfied during and before completion of the modification process.

2. The computer implemented method of claim 1, the process further comprising:
   identifying the layout, in which the layout comprises at least a partial, incomplete physical design of the electronic circuit; and
   performing the modification process on the first object.

3. The computer implemented method of claim 1, in which the modification process comprises at least one of:
   translating the first object to a different location in the layout;
   rotating the first object to a different orientation;
   mirroring the first object in the layout;
   resizing the first object;
   altering a shape of the first object; and
   altering a configuration of the first object.

4. The computer implemented method of claim 1, the process further comprising:
   identifying a first part of the first object;
   identifying a second part of a second object in the layout; and
   aligning the first part of the first object with the second part of the second object with a spacing between the first part and the second part.

5. The computer implemented method of claim 1, the process further comprising:
   identifying one or more target objects in the layout;
   determining whether a result of the modification process satisfies a constraint, wherein the constraint comprises at least one of the first set of one or more constraints or at least one of one or more other constraints by using at least the one or more target objects; and displaying a result of the action of determining whether the result of the modification process satisfies the constraint before a performance of the modification process on the object.

6. The computer implemented method of claim 5, the process further comprising:
identifying a primary object from a plurality of dynamic objects including the first object, in which the action of determining whether the result of the modification process satisfies the constraint is performed by further using the primary object.

7. The computer implemented method of claim 5, in which the action of determining whether the result of the modification process satisfies the constraint is performed before the performance of the modification process.

8. The computer implemented method of claim 1, the process further comprising:
determining a mask identification for the first object, in which at least a part of the layout is subject to a multiple-patterning lithography process that is to be used to manufacture the electronic circuit.

9. The computer implemented method of claim 1, in which the first set of one or more constraints comprises at least one of a net-based constraint, a multi-valued constraint, a net-based constraint, a voltage-based constraint, and a constraint imposing multiple requirements on multiple geometric characteristics of the first object.

10. The computer implemented method of claim 1, the process further comprising:
determining whether the first set of one or more constraints are satisfied during performance of the modification process and before the modification process is complete; and
displaying the result of the act of determining whether the relevant constraint is satisfied during the performance of the modification process and before the modification process is complete.

11. A computer implemented method for implementing a physical design of an electronic circuit with automatic snapping, comprising:
using at least one processor or at least one processor core to perform a process the process comprising:
identifying a first plurality of objects including a first object on a first layer and a second object on a second layer in a layout, wherein the first layer is situated above or below the second layer in the physical design of the electronic circuit;
identifying a second plurality of objects including a third object on the first layer and a fourth object on the second layer;
identifying a first approximate position for the first plurality of objects arising from a modification process performed on the first plurality of objects; and
determining a drop location for the first plurality of objects based at least in part upon the first approximate position by referencing at least one of the first layer or the second layer.

12. The computer implemented method of claim 11, the process further comprising:
performing the modification process on the first plurality of objects based at least in part upon the drop position, in which the modification process operates on the first plurality of objects as a whole without operating on the first object or the second object individually.

13. The computer implemented method of claim 12, the process further comprising:
determining a first relative position between the first object and the third object on the first layer;
determining a second relative position between the second object and the fourth object on the second layer;
associating a first priority level with the first relative position and a second priority level with the second relative position; and
determining whether the first priority level or the second priority level is to be used for the action of determining the drop location.

14. The computer implemented method of claim 13, the action of determining the first relative position comprising:
identifying a first position or a first reference point of the first object and a third position or a third reference point of the third object in the layout, wherein
the first reference point is used to determine the first position of the first object in the layout, and
the third reference point is used to determine the third position of the third object in the layout; and
determining the first relative position between the first object and the third object based at least in part upon the first position and the third position.

15. The computer implemented method of claim 13, the action of determining the second relative position comprising:
identifying a second position or a second reference point of the second object and a fourth position or a fourth reference point of the fourth object in the layout, wherein
the second reference point is used to determine the second position of the second object in the layout, and
the fourth reference point is used to determine the fourth position of the fourth object in the layout; and
determining the second relative position between the second object and the fourth object based at least in part upon the second position and the fourth position.

16. The computer implemented method of claim 13, the action of identifying the first approximate position comprising:
identifying a data capturing process;
identifying a data capturing criterion;
identifying a characteristic of the modification process; and
identifying a position of the first plurality of objects in the layout as the first approximate position based at least in part upon the data capturing criterion and the characteristic of the modification process.

17. The computer implemented method of claim 13, the action of determining whether the first priority level or the second priority level is to be used comprising:
identifying or determining a first metric comprising at least one of a first cost, a first objective function, and a first impact of the first priority level;
identifying or determining a second metric comprising at least one of a second cost, a second objective function, or a second impact of the second priority level;
analyzing the first metric and the second metric to improve one or more aspects of the layout; and
determining whether the first priority level or the second priority level is to be used in determining the drop location based at least in part on a result of the act of analyzing the first metric and the second metric.

18. The computer implemented method of claim 12, the action of performing the modification process comprising:
applying one or more operations from the modification process to the first plurality of objects;

identifying one or more triggers from a call-back mechanism;

associating the one or more triggers with one or more priority levels;

invoking at least some of the one or more triggers during a performance of the modification process based at least in part upon the one or more priority levels; and storing a result of the modification process in a scratch pad.

19. The computer implemented method of claim 12, the process further comprising:

determining whether a constraint is satisfied before completion of a performance of the modification process; and presenting a result of the act of determining whether the constraint is satisfied before the completion of the performance of the modification process.

20. An article of manufacture comprising a non-transitory computer readable storage medium having a sequence of instructions stored thereupon which, when executed by at least one processor or at least one processor core, causes the at least one processor or the at least one processor core to perform a method for implementing a physical design of an electronic circuit with automatic snapping, the method comprising:

using at least one processor or at least one processor core to perform a process, the process comprising:

identifying a first object in a layout for a modification process that is to modify the first object in the layout;

identifying a first set of one or more constraints for the first object;

identifying a first approximate position of the first object in the layout;

determining a drop position for the first object in the layout based at least in part upon the first approximate position and one or more relevant constraints in the first set of one or more constraints; and determining whether or not the one or more relevant constraints are satisfied during and before completion of the modification process.

21. The article of manufacture of claim 20, the process further comprising:

identifying the layout, in which the layout comprises at least a partial, incomplete physical design of the electronic circuit; and performing the modification process on the first object.

22. The article of manufacture of claim 20, the process further comprising:

identifying a first part of the first object;

identifying a second part of a second object in the layout; and aligning the first part of the first object with the second part of the second object with a spacing between the first part and the second part.

23. The article of manufacture of claim 20, the process further comprising:

identifying one or more target objects in the layout;

determining whether a result of the modification process satisfies a constraint, wherein the constraint comprises at least one of the first set of one or more constraints or at least one of one or more other constraints by using at least the one or more target objects; and displaying a result of the action of determining whether the result of the modification process satisfies the constraint before a performance of the modification process on the object.

24. The article of manufacture of claim 23, the process further comprising:

identifying a primary object from a plurality of dynamic objects including the first object, in which the action of determining whether the result of the modification process satisfies the constraint is performed by further using the primary object.

25. A system for implementing a physical design of an electronic circuit with automatic snapping, comprising:

at least one processor or at least one processor core that is to:

identify a first object in a layout for a modification process that is to modify the first object in the layout;

identify a first set of one or more constraints for the first object;

identify a first approximate position of the first object in the layout;

determine a drop position for the first object in the layout based at least in part upon the first approximate position and one or more relevant constraints in the first set of one or more constraints; and determining whether or not the one or more relevant constraints are satisfied during and before completion of the modification process.

26. The system of claim 25, the at least one processor or at least one processor core is further to:

identify the layout, in which the layout comprises at least a partial, incomplete physical design of the electronic circuit; and perform the modification process on the first object.

27. The system of claim 25, the at least one processor or at least one processor core is further to:

identify a first part of the first object;

identify a second part of a second object in the layout; and align the first part of the first object with the second part of the second object with a spacing between the first part and the second part.

28. The system of claim 25, the at least one processor or at least one processor core is further to:

identify one or more target objects in the layout;

determine whether a result of the modification process satisfies a constraint, wherein the constraint comprises at least one of the first set of one or more constraints or at least one of one or more other constraints by using at least the one or more target objects; and display a result of the action of determining whether the result of the modification process satisfies the constraint before a performance of the modification process on the object.

29. The system of claim 28, the at least one processor or at least one processor core is further to:

identify a primary object from a plurality of dynamic objects including the first object, in which the action of determining whether the result of the modification process satisfies the constraint is performed by further using the primary object.

30. An article of manufacture comprising a non-transitory computer readable storage medium having a sequence of instructions stored thereupon which, when executed by at least one processor or at least one processor core, causes the at least one processor or the at least one processor core to perform a method for implementing a physical design of an electronic circuit with automatic snapping, the method comprising:

using at least one processor or at least one processor core to perform a process, the process comprising:

identifying a first plurality of objects including a first object on a first layer and a second object on a second layer in a layout, wherein the first layer is situated above or below the second layer in the physical design of the electronic circuit;

identifying a second plurality of objects including a third object on the first layer and a fourth object on the second layer;

identifying a first approximate position for the first plurality of objects arising from a modification process performed on the first plurality of objects; and determining a drop location for the first plurality of objects based at least in part upon the first approximate position by referencing at least one of the first layer or the second layer.

31. The article of manufacture of claim 30, the process further comprising:

performing the modification process on the first plurality of objects based at least in part upon the drop position, in which the modification process operates on the first plurality of objects as a whole without operating on the first object or the second object individually.

32. The article of manufacture of claim 31, the process further comprising:

determining a first relative position between the first object and the third object on the first layer;

determining a second relative position between the second object and the fourth object on the second layer;

associating a first priority level with the first relative position and a second priority level with the second relative position; and determining whether the first priority level or the second priority level is to be used for the action of determining the drop location.

33. A system for implementing a physical design of an electronic circuit with automatic snapping, comprising:

at least one processor or at least one processor core that is to:

identify a first plurality of objects including a first object on a first layer and a second object on a second layer in a layout, wherein the first layer is situated above or below the second layer in the physical design of the electronic circuit;

identify a second plurality of objects including a third object on the first layer and a fourth object on the second layer;

identify a first approximate position for the first plurality of objects arising from a modification process performed on the first plurality of objects; and determine a drop location for the first plurality of objects based at least in part upon the first approximate position by referencing at least one of the first layer or the second layer.

34. The system of claim 33, the at least one processor or at least one processor core is further to:

perform the modification process on the first plurality of objects based at least in part upon the drop position, in which the modification process operates on the first plurality of objects as a whole without operating on the first object or the second object individually.

35. The system of claim 34, the at least one processor or at least one processor core is further to:

determine a first relative position between the first object and the third object on the first layer;

determine a second relative position between the second object and the fourth object on the second layer;

associate a first priority level with the first relative position and a second priority level with the second relative position; and determine whether the first priority level or the second priority level is to be used for the action of determining the drop location.

* * * * *